(12) United States Patent
Turner et al.

(10) Patent No.: US 6,885,620 B2
(45) Date of Patent: Apr. 26, 2005

(54) SYSTEM AND METHOD FOR RECOVERING FROM PERFORMANCE ERRORS IN AN OPTICAL DISC DRIVE

(75) Inventors: Christopher J. Turner, Niwot, CO (US); Charles R. Watt, Longmont, CO (US); Ron J. Kadlec, Longmont, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 650 days.

(21) Appl. No.: 09/951,337

(22) Filed: Sep. 10, 2001

(65) Prior Publication Data

US 2002/0138783 A1 Sep. 26, 2002

Related U.S. Application Data

(60) Provisional application No. 60/264,351, filed on Jan. 25, 2001.

(51) Int. Cl.[7] ................................................. G11B 7/00
(52) U.S. Cl. .................. 369/53.12; 369/53.15; 369/53.21; 369/47.38; 369/44.32
(58) Field of Search ............................ 369/53.12, 53.13, 369/53.14, 47.38, 44.28, 44.27, 53.28, 53.42, 44.32

(56) References Cited

U.S. PATENT DOCUMENTS

| 5,875,158 A | 2/1999 | Schell | 369/44.34 |
| 6,567,358 B1 * | 5/2003 | Komma et al. | 369/53.21 |

* cited by examiner

*Primary Examiner*—Nabil Hindi
(74) *Attorney, Agent, or Firm*—MacPherson Kwok Chen & Heid LLP

(57) ABSTRACT

A system, method, and apparatus for recovering from performance errors in an optical disc drive is provided for optical media with a pitted premastered area that cannot be overwritten and a grooved user-writeable area that can be overwritten. The system includes instructions operable to detect a problem with at least one of: focus control, tracking control, or spin control when accessing the optical media; instructions operable to save the current state of the disc drive; instructions operable to attempt to recover from the problem; and instructions operable to restore the current state of the disc drive after recovering from the problem.

32 Claims, 75 Drawing Sheets

| Address | Name |
|---|---|
| D040/42 | DSPControlReg1 |
| D044/46 | DSPControlReg2 |
| D048/4A | DSPControlReg3 |
| D04C/4E | JumpAccel |
| D050/52 | JumpDecel |
| D054/56 | OscillatorAmpl |
| D058/5A | TESGainOffset |
| D05C/5E | TrackLoopGain |
| D060/62 | TrackGainShift |
| D064/66 | FESGainOffset |
| D068/6A | FocusDACOffset |
| D06C/6E | FocusLoopGain |
| D070/72 | FocusGainShift |
| D074/76 | CrosstalkComp |
| D078/7A | SensorThresholds |
| D07C/7E | SampleIntegrityWin |

Processor Write/DSP Read Mailbox

FIG. 3A

| Bit# | Description |
|---|---|
| 0 | Focus On/Off |
| 1 | Track Int On |
| 2 | Track Int Reset |
| 3 | TES Sample Integrity On |
| 4 | FES Sample Integrity On |
| 5 | Jump + 1 Track |
| 6 | Jump − 1 Track |
| 7 | Track Bad Reset |
| 8 | Reset Jump Status |
| 9 | Focus Bad Reset |
| 10 | Reset Sat Detect Flags |
| 11 | Focus On during Jumps |
| 12 | Tracking Osc On |
| 13 | Focus Osc On |
| 14 | Tracking On/Off |
| 15 | Lock Mailboxes |

DSP Control Register 1

FIG. 3B

| Bit# | Description |
|---|---|
| 0 | Min/Max Signal Address 0 |
| 1 | Min/Max Signal Address 1 |
| 2 | Min/Max Signal Address 2 |
| 3 | Min/Max Signal Address 2 |
| 4 | Min/Max Reset |
| 5 | Trace On/Off |
| 6 | Trace Address 0 |
| 7 | Trace Address 1 |
| 8 | Trace Address 2 |
| 9 | Trace Address 3 |
| 10 | Trace Address 4 |
| 11 | Trace Rate 0 |
| 12 | Trace Rate 1 |
| 13 | Trace Rate 2 |
| 14 | Trace Rate 3 |
| 15 | Unused |

DSP Control Register 2

FIG. 3C

| Bit# | Description |
|---|---|
| 0 | Clear Write Abort |
| 1 | Power On |
| 2 | Seek Reset |
| 3 | Unused |
| 4 | OSC Select |
| 5 | Seek On |
| 6 | TF On/Off |
| 7 | Block Write Gate |
| 8 | Focus Int Enable |
| 9 | GPOut1 Addr0 |
| 10 | GPOut1 Addr1 |
| 11 | GPOut1 Addr2 |
| 12 | Writeable Media |
| 13 | Unused (bit 13) |
| 14 | Unused (bit 14) |
| 15 | Unused (bit 15) |

DSP Control Register 3

| Address | Name |
|---------|------|
| D080/82 | DSPStatusReg1 |
| D084/86 | DSPCtrlRegEcho |
| D088/8A | SignalMax |
| D08C/8E | SignalMin |
| D090/92 | LPF TrackingDAC (also referred to as Tracking Control Effort (TCE)) |
| D094/96 | FES |
| D098/9A | FocusDAC |
| D09C/9E | TES |
| D0A0/A2 | TrackingDAC |
| D0A4/A6 | Trace1 |
| D0A8/AA | Trace2 |
| D0AC/AE | Spare1 |
| D0B0/B2 | Spare2 |
| D0B4/B6 | Spare3 |
| D0B8/BA | SampleCount |
| D0BC/BE | DSPCodeRev |

DSP Write/Processor Read Mailbox

FIG. 3E

| Bit# | Description |
|---|---|
| 0 | Good Jump |
| 1 | Bad Jump |
| 2 | Track OK |
| 3 | Track Bad |
| 4 | Focus OK |
| 5 | Focus Bad |
| 6 | Focus Closed |
| 7 | Track Bad from Fes |
| 8 | Seek Complete |
| 9 | Seek Accel |
| 10 | Seek Flag |
| 11 | Seek Direction |
| 12 | Unused (bit 4) |
| 13 | Unused (bit 5) |
| 14 | Unused (bit 6) |
| 15 | Unused (bit 7) |

DSP Status Register

FIG. 3F

| Bit# | Description |
|---|---|
| 0 | TesSlope at Seek Start |
| 1 | SeekSettle |
| 2 | TryCloseTrack |
| 3 | Unused (bit 4) |
| 4 | Skate Detect Enabled |
| 5 | Track OK via Fes Enabled |
| 6 | Timer Enabled |
| 7 | TzcSignal |
| 8 | Bad Seek |
| 9 | TzcChangedFlag |

DSP Status Register

FIG. 3G

| Function | Command | Parameters | Description |
|---|---|---|---|
| Spindle On | so | 1: RPM | Spindle turned on at desired rpm via param 1. |
| Spindle Stop | ss | None | Stop the spindle |
| Test DAC's | sa | 1: 0=Tracking DAC<br>   1=Focus DAC<br>2: 0=Square Wave<br>   1=Triangular Wave<br>3: Amplitude (hex)<br>4: # of Cycles (hex) | Open Loop servo DAC test. Used to verify DAC functionality and output voltage range. |
| DSP Diagnostics | sc | 1: Mailbox number<br>2: Mailbox data | Requires special DSP code "s_dspdia.c". Multiple modes for pasing signals from adc in to dac out through filters, ... and testing the mailboxes |
| Close Focus | cf | 1: # Retries (opt)<br>2: Delay (ms) ramp inc (opt)<br>3: Min ramp value (opt)<br>4: Max ramp value (opt) | Close focus loop with variable # retries, ramp rate, ramp amplitude and offset. Complete focus acquisition via ramp is performed. |
| Open Focus | of | None | Open Focus Loop |

Servo Commands

FIG. 4A

| Function | Command | Parameters | Description |
|---|---|---|---|
| Tracking On/Off | t | 1: 0=Off<br>1=On<br>2=Integrator On<br>3=Integrator Off<br>4=Reset Integrator<br>5=TES Integrity On<br>6=FES Integrity On<br>7=Trk On, Int On, Integ On<br>8=Enable AutoJumpBack | Turn tracking power amp on, wait 5ms, then turn tracking loop on. |
| Power Amp On/Off | pa | 1: 1=On<br>0=Off | Turn tracking power amp on/off |
| Servo Start-Up | st | 1: Tracking Bias Value<br>2: Engine ID #<br>3: Write to Flash Flag | Positions the tracking VCM radially with Param 1 bias. Engine ID determines default parameters: [0=Demo(default), 1=3-1-11, 2=3-1-7].<br>WriteFlash: 1=Yes (default), 0=No |

Servo Commands (continued)

FIG. 4B

| Function | Command | Parameters | Description |
|---|---|---|---|
| Laser On/Off | l | 1: 1=On<br>0=Off | Turn laser on or off |
| Dump Mailboxes | dm | None | Dumps contents of all 32 mailboxes to serial port |
| Power Amp Bias | pb | 1: Bias Value (-3fff to 3fff)<br>1: 1234 – display current<br>1: 5678 – run bias table cal<br>2: IDTableEntry<br>3: ODTableEntry | ST10 FF Bias control effort<br>Ex>pb 5678 will cal the entire table<br>   pb 5678 400 –2000 will use 400 for table[0]<br>   And use –2000 for table[6]. |
| Seek | sl | 1: # Tracks<br>2: Delay between Jumps (16/50MHz)<br>3: Accel (Amp,Time)<br>4: Decel (Amp,Time) | |

Servo Commands (continued)

FIG. 4C

| Function | Command | Parameters | Description |
|---|---|---|---|
| MinMax | mm | 1: 0=FES<br>1=FES LP<br>2=TES<br>3=TES LP<br>4=Tracking DAC<br>5=LPF(|TES|)<br>6=Unused<br>7=TES at end Accel<br>8=RRO (tracking open)<br>9=Tes Decim0<br>10=Fes Decim1<br>11=Sum Decim3<br>12=TesRawOs<br>13=FesRawOs<br>14= LPF(|FES|)<br>15=Tes Pk Avg<br>2: Number of measurements<br>3: Length of window in milliseconds | Measure the min, max, offset, p-p of the selected signal internal to the DSP. |

Servo Commands (continued)

FIG. 4D

| Function | Command | Parameters | Description |
|---|---|---|---|
| FES Offset | fo | 1: Offset (-3f to 3f) | Fes Offset |
| TES Offset | to | 1: Offset (-3f to 3f) | Tes Offset |
| FES Gain | fg | 1: Gain (-3f to 3f)<br>No Param to see current Offset | Fes Gain |
| TES Gain | tg | 1: Gain (-3f to 3f) | Fes Gain |
| Sensor Cal | cs | 0: Fes Gain<br>1: Fes Offset<br>2: Tes Offset<br>3: Tes Gain<br>4: Fes Offset, Tes Offset, Tes Gain<br>5: All Cal's | Calibrate the fes and tes offsets and gains. |
| Focus Loop Gain | fl | 1: Loop Gain<br>2: Loop Gain Shift | Adjust the Focus Loop Gain |
| Track Loop Gain | tl | 1: Loop Gain<br>2: Loop Gain Shift | Adjust the Tracking Loop Gain |

Servo Commands (continued)

FIG. 4E

| Function | Command | Parameters | Description |
|---|---|---|---|
| FesTes X Talk Comp | ft | 1: Gain (bits 11:4) Delay (bits 3:0) | Tes to Fes Crosstalk compensation<br>The Gain is signed.<br>The Delay is unsigned. |
| Change Engine | ce | 1: Engine ID | Demo=0; Eng 3-1-11 = 1; Eng 3-1-7 = 2; Eng 3-1-12 = 3; Eng 3-1-9 = 4 |
| Calibrate Frontend Offsets | co | 1: 1=laseron, 0=laseroff<br>2: channel gain setting (0-1F) | Calibrates frontend offsets and sets the gain if parameter 2 is less than 20 hex. Parameter 1 determines if the laser is turned on or off for the calibration. The frontend offset registers are left with the calibrated offsets. |
| Reset Sat Detect | sr | None | Resets the DSP Tes, Fes, Sum input sat detection flags |
| Focus On during Jumps | fj | 1: 1=On<br>0=Off | Turns the Focus servo on during jumps with Param=1. The default is Focus off during Jumps. |

Servo Commands (continued)

FIG. 4F

| Function | Command | Parameters | Description |
|---|---|---|---|
| Trace Data | td | 1: 5 bit Variable Address<br>2: # of Samples (def=16K)<br>3: 4 bit Sample Rate (def=1)<br>4: Trigger | Trace DSP Variables<br>Param 1: Bit 5 (msb), when set during autojumpback, will temporarily disable autojumpback during trace data collection.<br>  0 = [Sample #, Fes, Tes, TrkDac, FocDac, FesLp, TesLp]<br>  1 = [Sample #, Fes, Tes, TrkDac, FocDac, lp(abs(Fes)), lp(abs(TesLp))]<br>  2 = [Sample #, Fes, Tes, TrkDac, FocDac, FocNotch, SineWave]<br>  3 = [Sample #, Fes, Tes, TrkDac, FocDac, TrkNotch, SineWave]<br>  4 = [Sample#, Fes, Tes, SpindleCommutation#]<br>  5 = OPU detector trace implemented in DSP but not in ST10<br>Param 2: Number of samples to collect at the param3 sample rate. Max for 7 variable trace = 4000h<br>  Max for 4 variable trace = 7000h<br>Param 3: Param 3=0 will sample every servo sample. Param=1 will sample at every other servo sample, ...<br>Param 4: Reserved |

Servo Commands (continued)

FIG. 4G

| Function | Command | Parameters | Description |
|---|---|---|---|
| Loop Gain Cal | lg | 1: 0 = Focus Loop Gain<br>    1 = Tracking Loop Gain<br>    2 = Focus and Tracking Gain<br>2: # DFT meas to avg (default=48) | Calibrate the tracking and focus loop gains to set the open loop bandwidths to their designed frequencies. |
| Cross-Talk Gain Cal | xt | 1: # DFT meas to avg (default=48) | Calibrate the Tes-to-Fes crosstalk compensator gain to minimize the crosstalk. |
| Align and Go | ag | None | Performs the Align and Go algorithm to start the spindle |
| Write Serial Port | ws | 1: 8 bit register address<br>2: 8 or 16 bit data | Writes to the Spin Chip Serial Port. |

Servo Commands (continued)

FIG. 4H

| Function | Command | Parameters | Description |
|---|---|---|---|
| Read Serial Port | rs | 1: 8 bit register address | Reads the requested Spin Chip register and displays the contents. |
| Trace ST10 Data | ts | 1: mode (0,1,2)<br>2: # of Samples<br>3: use 0<br>4: Desired Spin RPM | Param 1: 0=DSP Data, 1=Spin Data 36/rev, 2=Spin Data 6/rev<br>Param 2: Number of samples to collect<br>Param 3: Unused<br>Param 4: New Spin RPM, no change in RPM if zero |
| RRO Coef. load | rr | 1: cos coef (-63 to 64)<br>2: sin coef (-63 to 64) | Param 1: cosine coef for RRO correction<br>Param 2: sine coef for RRO correction |

Servo Commands (continued)

FIG. 4I

| Function | Command | Parameters | Description |
|---|---|---|---|
| Servo Log | sl | Parameter 1 choices<br>0: display log<br>2: suspend logging (ie, no more log entries are made)<br>3: resume logging<br>86: clear the log | The log contains 6 columns of data:<br>Col 1: index into the log buffer (not too useful)<br>Col 2: timestamp of log entry [msec]<br>Col 3: message indicating type of entry<br>Col 4: message elaborating on entry<br>Col 5: DSPControlReg1<br>Col 6: DSPStatusReg<br><br>Exception: When Col 3 says DATA_ENTRY then<br>Col 5: Upper 16 bits of data<br>Col 6: Lower 16 bits of data |
| Abort Current Cmd | ab | None | |

Servo Commands (continued)

FIG. 4J

| Function | Command | Parameters | Description |
|---|---|---|---|
| Seek | sn | Param1: Target PSA<br>Param2: Current PSA<br>Param3: WriteModeFlag | Performs a coarse seek using calibrated bias value. |
| Open Loops | ol | Param1: bLoopsToOpen | 0x01 STOP_AUTO_JUMPBACK<br>0x02 OPEN_TRACKING_LOOP<br>0x04 OPEN_FOCUS_LOOP<br>0x08 OPEN_SPIN_LOOP |
| Spin Up | su | None | none |
| Spin Down | sd | None | none |
| Load Cartridge | lc | TBD | Loads the cartridge |
| Eject Cartridge | ec | TBD | Ejects the cartridge |
| New Media | nm | TBD | TBD |
| Recal | rc | TBD | TBD |
| Write Mode | wm | TBD | TBD |
| Read Mode | rm | TBD | TBD |

Servo Commands (continued)

FIG. 4K

| Function | Command | Parameters | Description |
|---|---|---|---|
| Recovery Mask | rx | Parameter 1:<br>0x01 ALLOW_FOCUS_RECOV<br>0x02 ALLOW_TRACK_RECOV<br>0x04 ALLOW_SPIN_RECOV<br>0x08 FAIL_ALL_RECOV | Examples:<br>RX 0 will disable all recoveries(also sets bit 0x08)<br>RX 4 will allow spin recovery only<br>RX 7 will allow all recoveries |
| Suspend Servo | dd | Make all 3 params = 0xDEAD | Disables servo mailbox and heartbeat interrupts. Also stubs the servo thread. Intended to be used to bring up circuit boards. |
| Dump Mailboxes | dm | None | Will dump all the DSP mailboxes. |
| Set Laser Power | lp | Param1: Index (0-4)<br>Param2: Read Power(0-3ff)<br>Param3: Write Baseline(0-3ff)<br>Param4: Write Power(0-3ff) | Sets the Laser Power target (Param2) value in Read Power DAC. Also sets the parameters in the laser power structure (index). |
| Write Laser Power to Flash | lx | Param1: 1=display, 3=write<br>Param2: 1=display, 3=write | 1x 1 1 displays the laser flash data<br>1x 3 3 writes laser data structure to flash |
| Set for Laser CAL Fixture | Lw | Param1: 0=off, 1=on<br>Param2: Write DAC setting(0 -ff) | |

Servo Commands (continued)

FIG. 4L

| Function | Command | Parameters | Description |
|---|---|---|---|
| Turn on/off PWM | pw | Param1: 0=off, 1=On | Turns the Diag PWM's On or Off (default in code is off) |
| Display Laser Power | Lm | None | Displays Laser DAC settings and converts to current in mA |
| Transfer Function | tf | Param1: 0=off, 1=On | Will cause the dsp to provide an amplified version of the tes or fes on CTACT for improved plant and cross coupling tf resolution. This command will also disable the tes and fes sample integrity tests during the tf meas. |
| Servo Flash | sf | 1 1<br>2 2<br>3 3<br>4 index, value<br>4 | Display current table values<br>Restore values from flash<br>Write current table values to flash<br>Edit specified table element<br>Deletes Flash content. |
| Dsp Long Seek | sm | #of tracks<br>#of ping/pongs | |

Servo Commands (continued)

FIG. 4M

| Function | Command | Parameters | Description |
|---|---|---|---|
| Servo Probes | sp | Param1:<br>Blank – display bit definition<br>Clear all = 0x00<br>SPIN_INDEX = 0x01<br>INTERRUPT_DURATION = 0x02<br>CMD_DUR = 0x04<br>EVENT_DUR = 0x08<br>MAILBOX_ISR_DUR = 0x10<br>T6_DUR = 0x20<br>SPIN_DUR = 0x40 | Examples:<br>To get a pulse starting at the beginning of the heartbeat and ending at the end of the heartbeat use oo 0x02.<br>To get a pulse during either of the spin interrupts use oo 0x60.<br><br>Spin motor interrupt segments |
| Focus Oscillation | oo | Param1: offset (dflt=fcsoff)<br>Param2: amplitude (dflt=0x32)<br>Param3: phase[1 or -1] (dflt=-1)<br>Param4: delay (dflt=5) | oo 0x1234 displays parameters<br>phase = 1 means start at +peak of sinewave<br>phase = -1 means start at -peak of sinewave |

Servo Commands (continued)

FIG. 4N

| Function | Command | Parameters | Description |
|---|---|---|---|
| Focus Position | fx | Param1: final dac output<br>Param2: delay | fx 0x1234 displays parameters |
| Engineering Development Flag | ed | Param1: s_fEngrDevMode | TRUE or FALSE<br>No param displays current setting. |
| Display Messages | /0 t | | Ex> 0xE000 will show all servo messages. |
| Read Register Byte | /0 r1 | | |
| Read Register Word | /0 r2 | | |
| Read Memory Byte | /0 m1 | | |
| Read Mem Word | /0 m2 | | |
| Dsp Gp Out 1 | gp | Param1:<br>0 = Error Trigger<br>1 = Dsp Duty Cycle | Define Dsp Gp Out 1 signal. |

Servo Commands (continued)

FIG. 40

| Function | Command | Parameters | Description/Notes |
|---|---|---|---|
| Get Bode | gb | Param 1:<br>word 1: starting freq (Hz)<br>word 2: ending freq (Hz)<br>Param 2:<br>Word 1: Switch<br>Bit 0: 1=float math<br>0=fixed math<br>Bit 1: 1=no need track closed<br>0=must keep track closed<br>Bit 2: 1=no auto gain<br>0=auto gain on<br>Bit 3: 1=Quiet mode (no printing)<br>0=non-quiet mode<br>Bit 4: LSB of Sub Sample Amt<br>Bit 5: MSB of Sub Sample Amt | Bit 6: 1=leave notch on<br>0=turn notch off<br>Word 2: Number of DFT's to average<br>Bits 0- 6: 1= Number of DFT's to average<br>Bit 7: Print FFT data<br>Param 3:<br>Byte3: unused<br>Byte2: 0=dist added to focus loop<br>Byte1: numerator<br>Byte0: denominator<br>Param 4: Oscillation Amplitude |
| Calibrate Notch | Cn | See Get Bode (gb) | |

Servo Commands (continued)

FIG. 4P

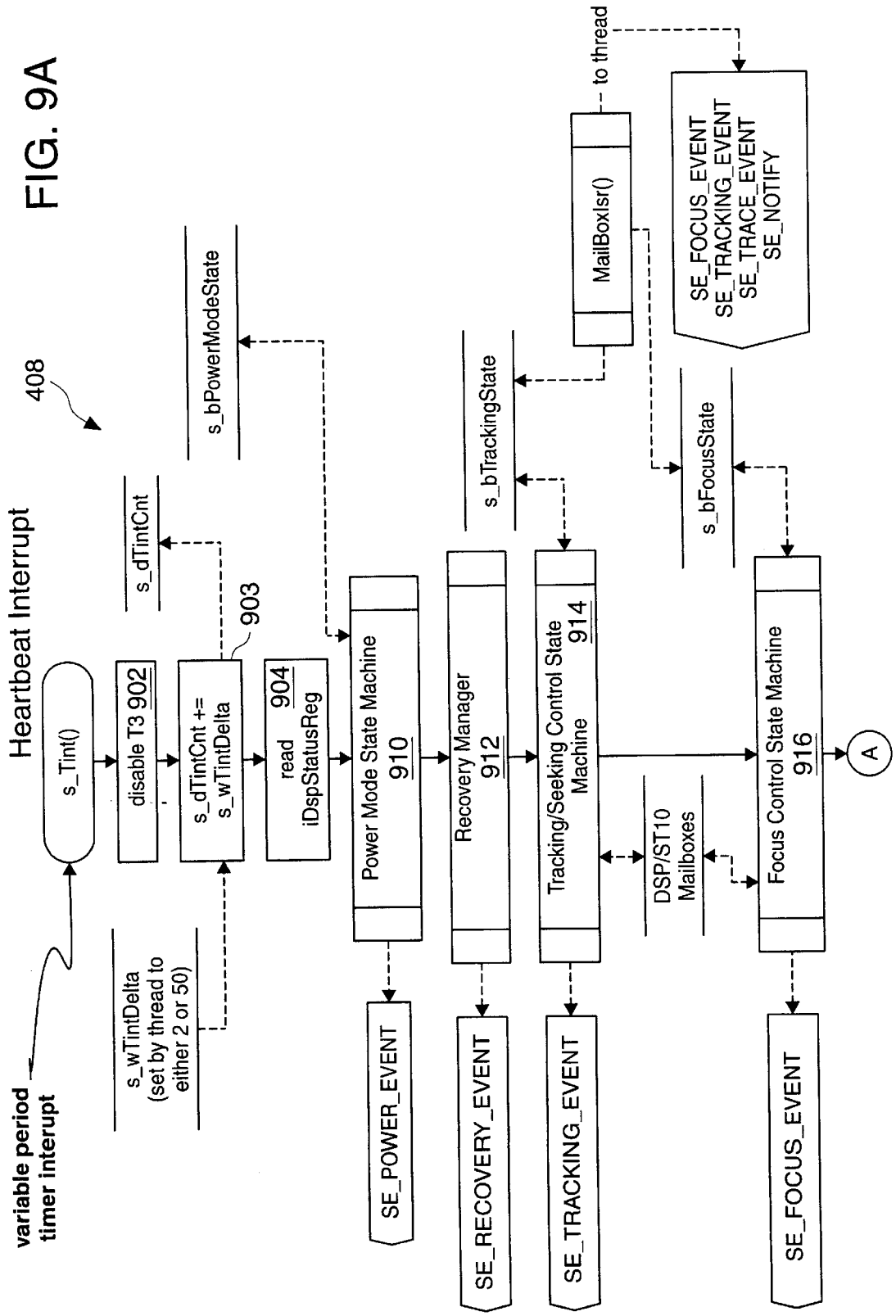

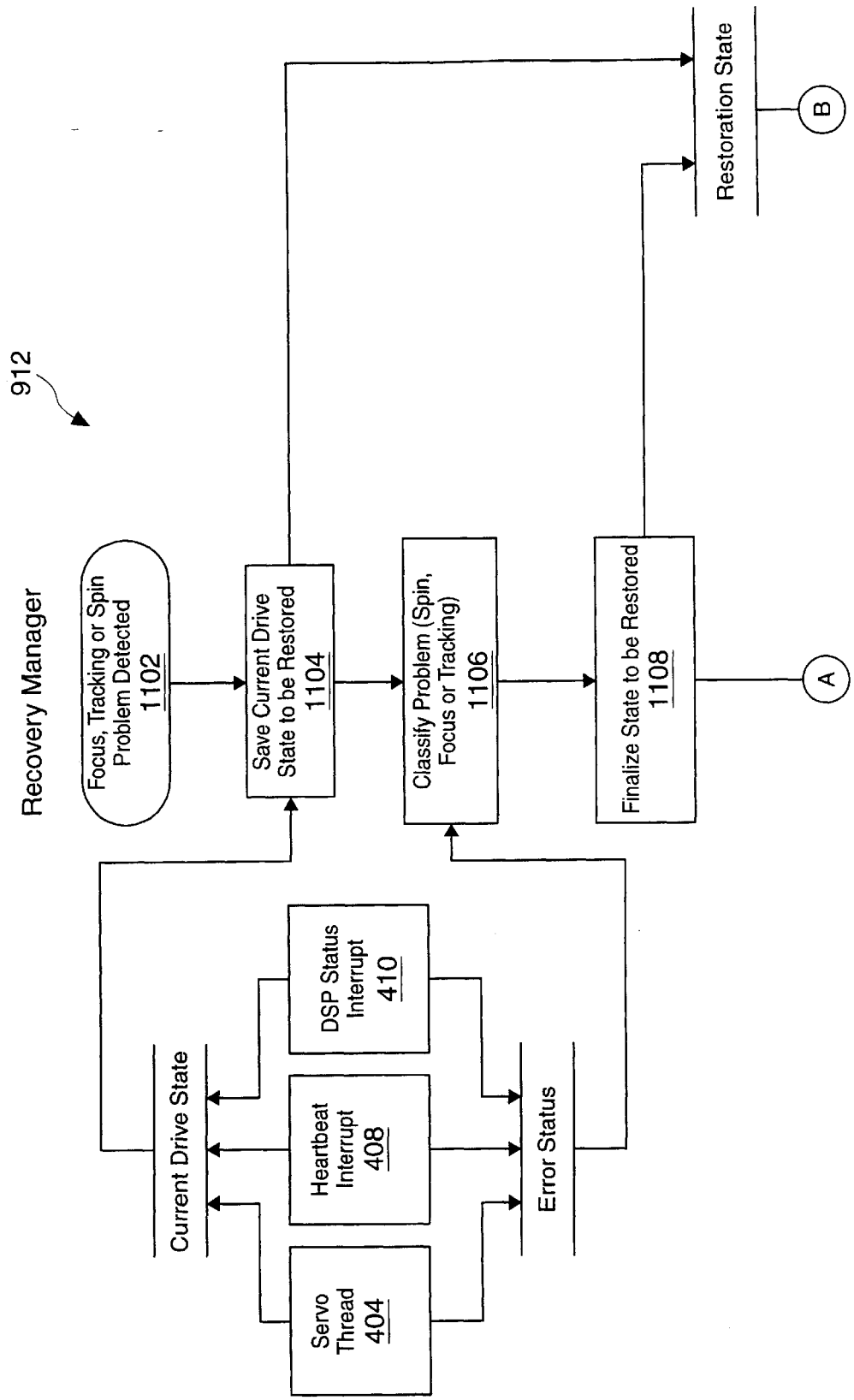

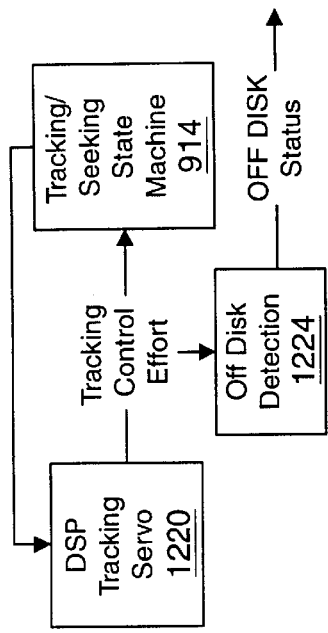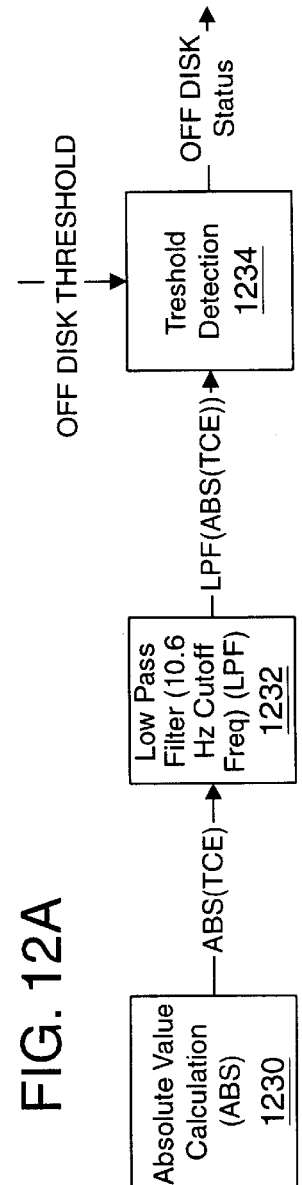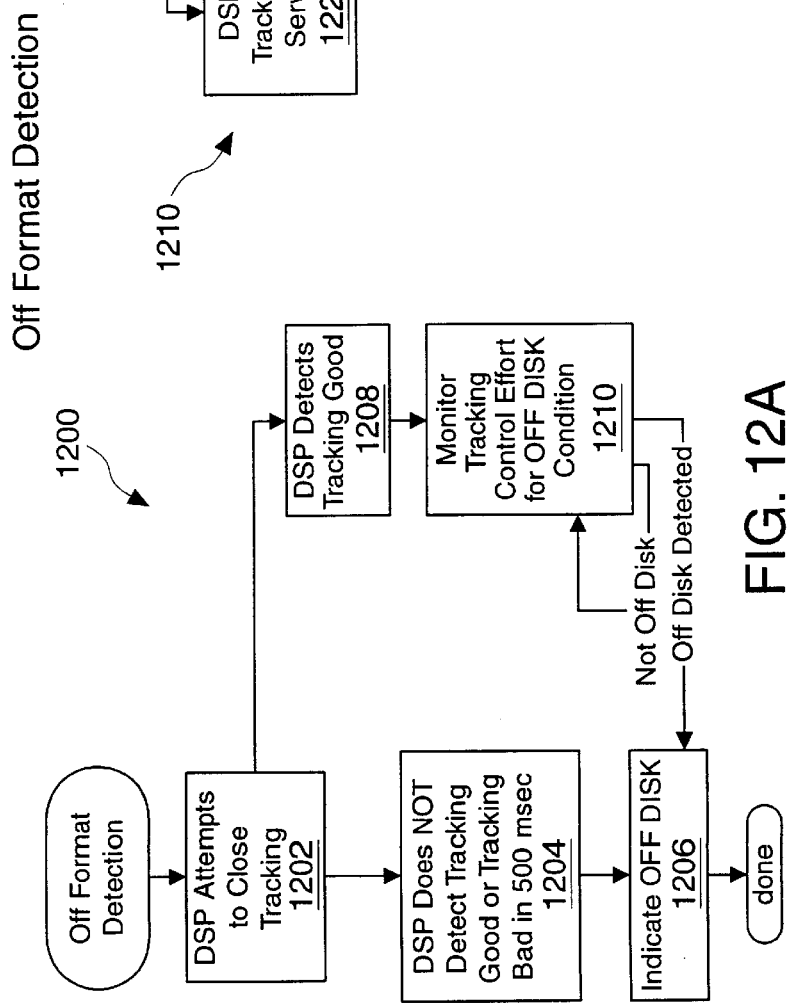
FIG. 12B
FIG. 12C
FIG. 12A

Focus Control

Mailbox Interrupt Service Routine

SYSTEM AND METHOD FOR RECOVERING FROM PERFORMANCE ERRORS IN AN OPTICAL DISC DRIVE

CROSS-REFERENCE TO CO-APPLICATIONS

The present disclosure was co-filed with the following sets of disclosures: the "Tracking and Focus Servo System" disclosures, the "Servo System Calibration" disclosures, the "Spin Motor Servo System" disclosures, and the "System Architecture" disclosures; each of which was filed on the same date and assigned to the same assignee as the present disclosure, and are incorporated by reference herein in their entirety. The Tracking and Focus Servo System disclosures include U.S. Disclosure Ser. Nos. 09/950,329, 09/950,408, 09/950,444, 09/950,394, 09/950,413, 09/950,397, 09/950,914, 09/950,410, 09/950,441, 09/950,373, 09/950,425, 09/950,414, 09/950,378, 09/950,513, 09/950,331, 09/950,395, 09/950,376, 09/950,393, 09/950,432, 09/950,379, 09/950,515, 09/950,411, 09/950,412, 09/950,361, 09/950,540, and 09/950,519. The Servo System Calibration disclosures include U.S. Disclosure Ser. Nos. 09/950,398, 09/950,396, 09/950,360, 09/950,372, 09/950,541, 09/950,409, 09/950,520, 09/950,377, 09/950,367, 09/950,512, 09/950,415, 09/950,548, 09/950,392, and 09/950,514. The Spin Motor Servo System disclosures include U.S. Disclosure Ser. Nos. 09/951,108, 09/951,869, 09/951,330, 09/951,930, 09/951,328, 09/951,325 and 09/951,475. The System Architecture disclosures include U.S. Disclosure Ser. Nos. 09/951 947, 09/951,340, 09/951,339, 09/951,469, 09/951,337, 09/951,329, 09/951,332, 09/951,931, 09/951,850, 09/951, 333, 09/951,331, 09/951,156, and 09/951,940.

CROSS-REFERENCE TO CD-ROM APPENDIX

CD-ROM Appendix A, which is a part of the present disclosure, is a CD-ROM appendix consisting of 22 text files. CD-ROM Appendix A includes a software program executable on a controller as described below. The total number of compact disks including duplicates is two. Appendix B, which is part of the present specification, contains a list of the files contained on the compact disk. The attached CD-ROM Appendix A is formatted for an IBM-PC operating a Windows operating system.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

These and other embodiments are further discussed below.

The present disclosure was also co-filed with the following disclosures U.S. Pat. Disclosure Ser. Nos. 09/950,516, and 09/950,365, each of which was filed on the same date and assigned to the same assignee as the present disclosure, and are incorporated by reference herein in their entirety.

BACKGROUND

There is an ever increasing need for data storage devices having greater storage capacity with smaller form factors for multimedia systems utilizing text, video, and audio information. Further, there is a large demand for highly portable, rugged, and robust systems for use as multimedia entertainment, storage systems for PDAs, cell phones, electronic books, and other systems. One of the more promising technologies for rugged, removable, and portable data storage is WORM (write once read many) optical disk drives.

One of the important factors affecting design of an optical system (such as that utilized in a WORM drive) is the optical components utilized in the system and the control of actuators utilized to control the optical system on the disk. The optical system typically includes a laser or other optical source, focusing lenses, reflectors, optical detectors, and other components. Although a wide variety of systems have been used or proposed, typical previous systems have used optical components that were sufficiently large and/or massive that functions such as focus and/or tracking were performed by moving components of the optical system.

Many early optical disks and other optical storage systems provided relatively large format read/write devices including, for example, devices for use in connection with 12 inch (or larger) diameter disks. As optical storage technologies have developed, however, there has been increasing attention toward providing feasible and practical systems which are relatively smaller in size. Generally, a practical read/write device must accommodate numerous items within its form factor, including the media, media cartridge (if any), media spin motor, power supply and/or conditioning, signal processing, focus, tracking or other servo electronics, and components associated or affecting the laser or light beam optics. Accordingly, in order to facilitate a relatively small form-factor, an optical head occupying small volume is desirable. In particular, it is desirable for a small optical head in the direction perpendicular to the surface of the spinning media.

Additionally, a smaller, more compact, optical head provides numerous specific problems for electronics designed to control the position and focus of the optical head including: the need for extensive drive calibration and periodic drive recalibration, time critical servo state machines to compensate for the flexible focus and tracking actuators, nonlinear and cross-coupled tracking and focus position sensors, dynamic cross-coupling between the multiple servo loops, need for low power consumption to conserve battery life, removable and interchangeable media, robust handling of media defects, presence of both pre-mastered and user writeable areas on the same disk, need to operate in wide range of conditions including various physical orientations, wide range of ambient temperatures and humidity levels, and the presence of shock and vibration.

Therefore, there is a need for an optical head with a small form factor and, in addition, a servo system for controlling the head so that data can be reliably read from and written to the optical media.

SUMMARY

A system, method, and apparatus in accordance with the present invention includes a code architecture that addresses the design challenges for the small form factor optical head. Embodiments of a system and device in accordance with the present invention utilize several unique methods including sharing a general purpose processor between the servo system and other drive systems in the device, using a dedicated high speed processor for time critical servo functions, communicating between the dedicated servo processor and the shared general purpose processor, distributing the servo processing between the general purpose processor and the dedicated servo processor, and distributing the servo processing within the general purpose processor between a main loop process and a background periodic interrupt process.

In one embodiment, a system for recovering from performance errors in an optical disc drive is provided for optical media with a pitted premastered area that cannot be overwritten and a grooved user-writeable area that can be overwritten. The system includes instructions operable to detect a problem with at least one of: focus control, tracking control, or spin control when accessing the optical media; instructions operable to save the current state of the disc drive; instructions operable to attempt to recover from the problem; and instructions operable to restore the current state of the disc drive after recovering from the problem.

In one aspect of this embodiment, the system further includes instructions operable to classify the problem as a spin, focus, or tracking control problem.

In another aspect of this embodiment, the system further includes instructions operable to control the disc drive to a state from which recovery can be attempted.

In another aspect of this embodiment, the system further includes instructions operable to determine whether the recovery attempt was successful.

In another aspect of this embodiment, the system further includes instructions operable to turn off tracking and focus when a problem with spin control is detected.

In another aspect of this embodiment, the system further includes instructions operable to turn off tracking when a problem with focus control is detected.

In another aspect of this embodiment, the system further includes instructions operable to turn off tracking when a problem with tracking control is detected.

In another aspect of this embodiment, the system further includes instructions operable to determine whether a tracking actuator arm is positioned off a formatted portion of an optical disc.

In another aspect of this embodiment, the system further includes instructions operable to position the tracking actuator arm to a predetermined location when the tracking actuator arm is positioned off the formatted portion of the optical disc.

In another aspect of this embodiment, the system further includes instructions operable to determine whether the attempt to recover from the problem is excessive.

In another embodiment, a method for recovering from performance errors in an optical disc drive is provided for optical media with a pitted premastered area that cannot be overwritten and a grooved user-writeable area that can be overwritten. The method includes:
 detecting a problem with at least one of: focus control, tracking control, or spin control when accessing the optical media;
 saving the current state of the disc drive;
 attempting to recover from the problem; and
 restoring the current state of the disc drive after recovering from the problem.

One aspect of this embodiment includes classifying the problem as a spin, focus, or tracking control problem.

Another aspect of this embodiment includes controlling the disc drive to a state from which recovery can be attempted.

Another aspect of this embodiment includes determining whether the recovery attempt was successful.

Another aspect of this embodiment includes turning off tracking and focus when a problem with spin control is detected.

Another aspect of this embodiment includes turning off tracking when a problem with focus control is detected.

Another aspect of this embodiment includes turning off tracking when a problem with tracking control is detected.

Another aspect of this embodiment includes determining whether a tracking actuator arm is positioned off a formatted portion of an optical disc.

Another aspect of this embodiment includes positioning the tracking actuator arm to a predetermined location when the tracking actuator arm is positioned off the formatted portion of the optical disc.

Another aspect of this embodiment includes determining whether the attempt to recover from the problem is excessive.

The methods in accordance with the present invention can be embodied in the form of computer-implemented processes and apparatuses for practicing those processes. The methods can also be embodied in the form of computer program code embodied in tangible media, such as floppy diskettes, CD-ROMS, hard drives, or any other computer-readable storage medium where, when the computer program code is loaded into and executed by a computer, the computer becomes an apparatus for practicing the invention. The method can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The above as well as additional objectives, features, and advantages of embodiments of the present invention will become apparent in the following detailed written description.

SHORT DESCRIPTION OF THE FIGURES

FIGS. 3a through 3g show examples of mailbox messages that can be communicated between components shown in FIG. 3 in accordance with the present invention.

FIGS. 4a through 4p show examples of servo commands that can be implemented in the signal processing system shown in FIGS. 3 and 4.

FIG. 11 shows a block diagram of an embodiment of the recovery manager shown in FIG. 9.

FIG. 12a shows a diagram of an embodiment of an off format detection manager that is executed as part of the classify problem state 1106' in FIG. 11a.

FIG. 12b shows a diagram of components utilized to perform off format detection for the off format detection manager shown in FIG. 12a.

FIG. 12c shows a diagram of an embodiment of logic to perform off format detection for the off format detection manager shown in FIG. 12a.

Figure 9B:
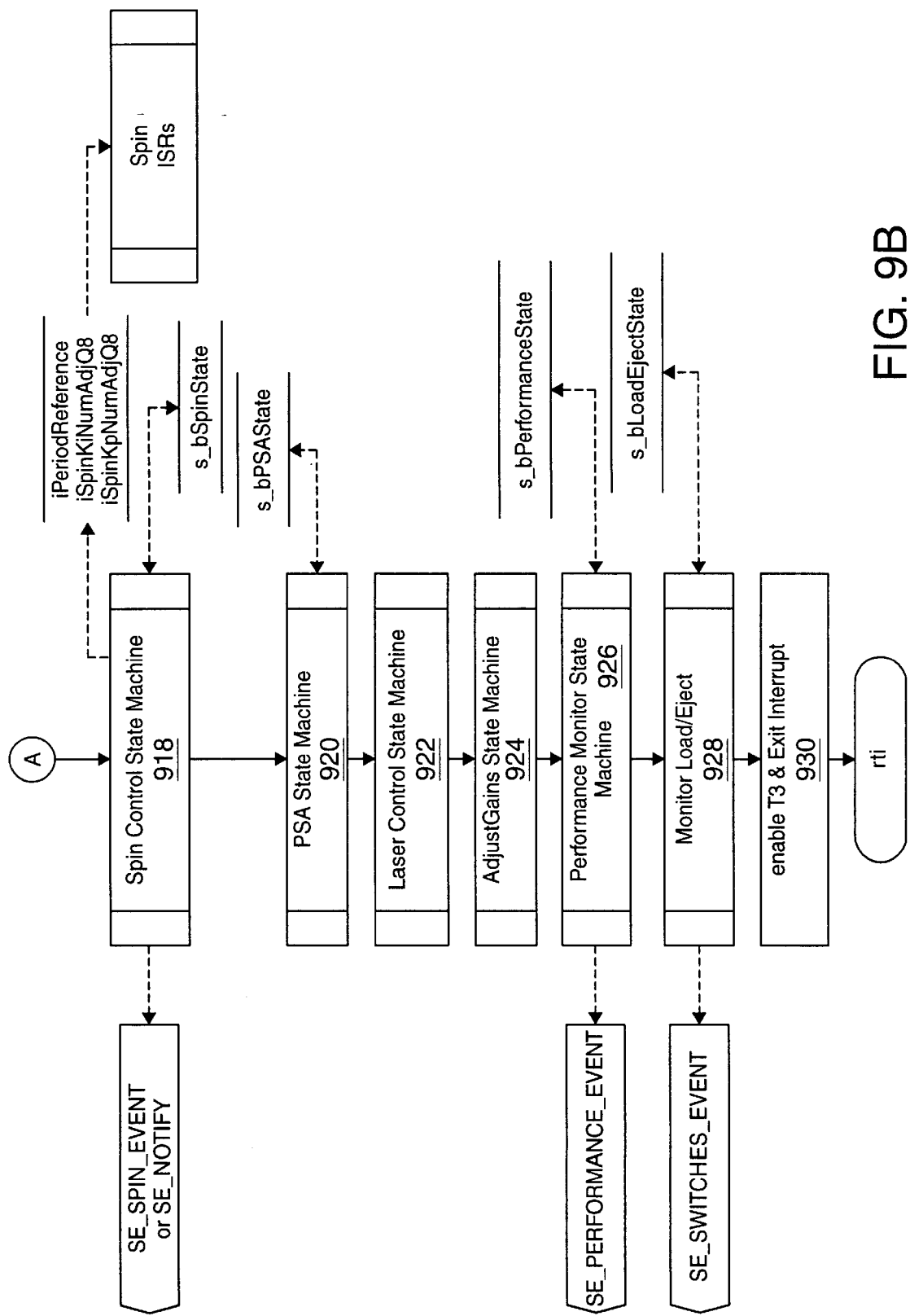
FIG. 9 shows a block diagram of an embodiment of the heartbeat interrupt shown in FIG. 4.
Figures 1, 13A:
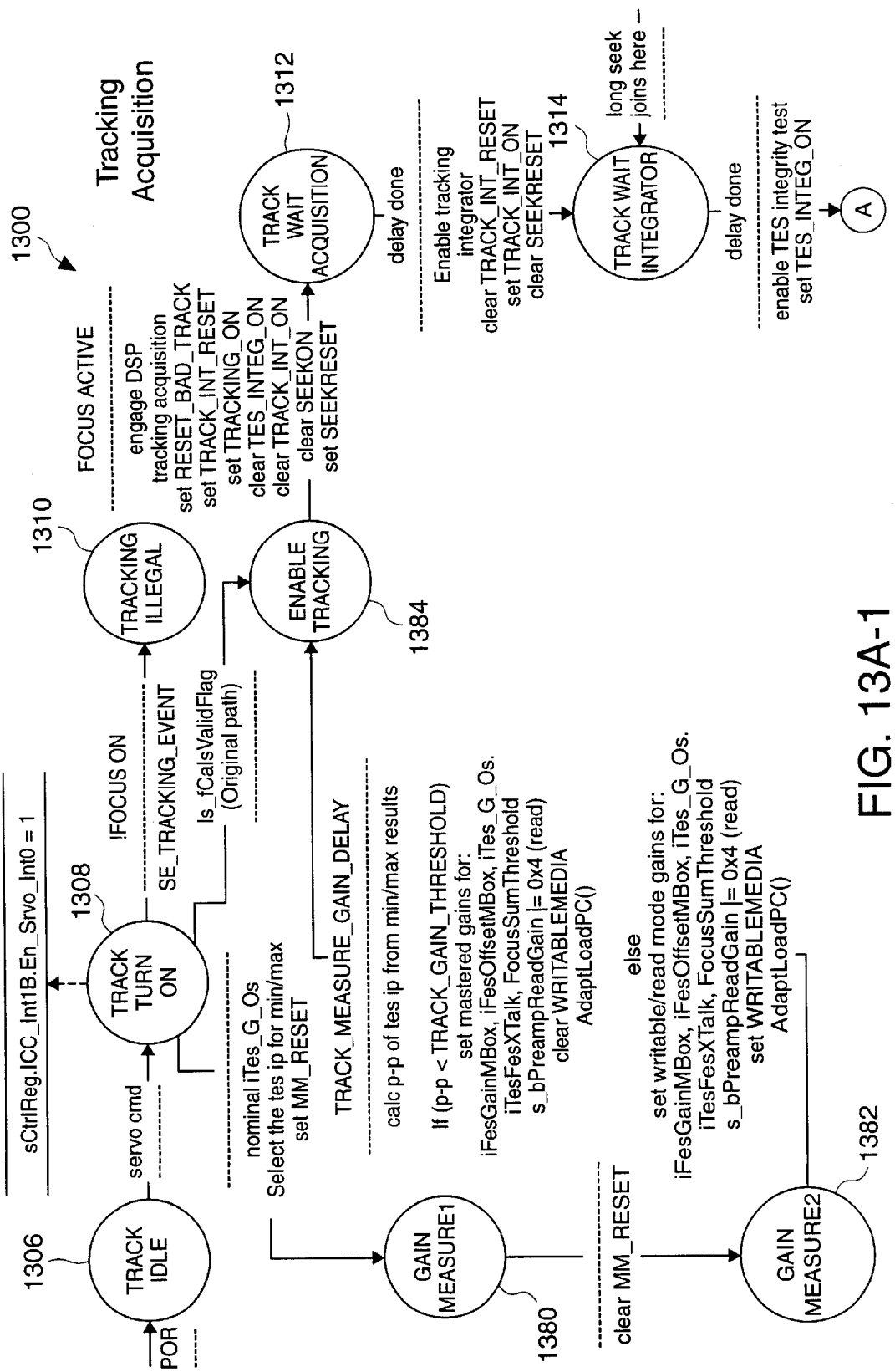
Figures 2, 13A:
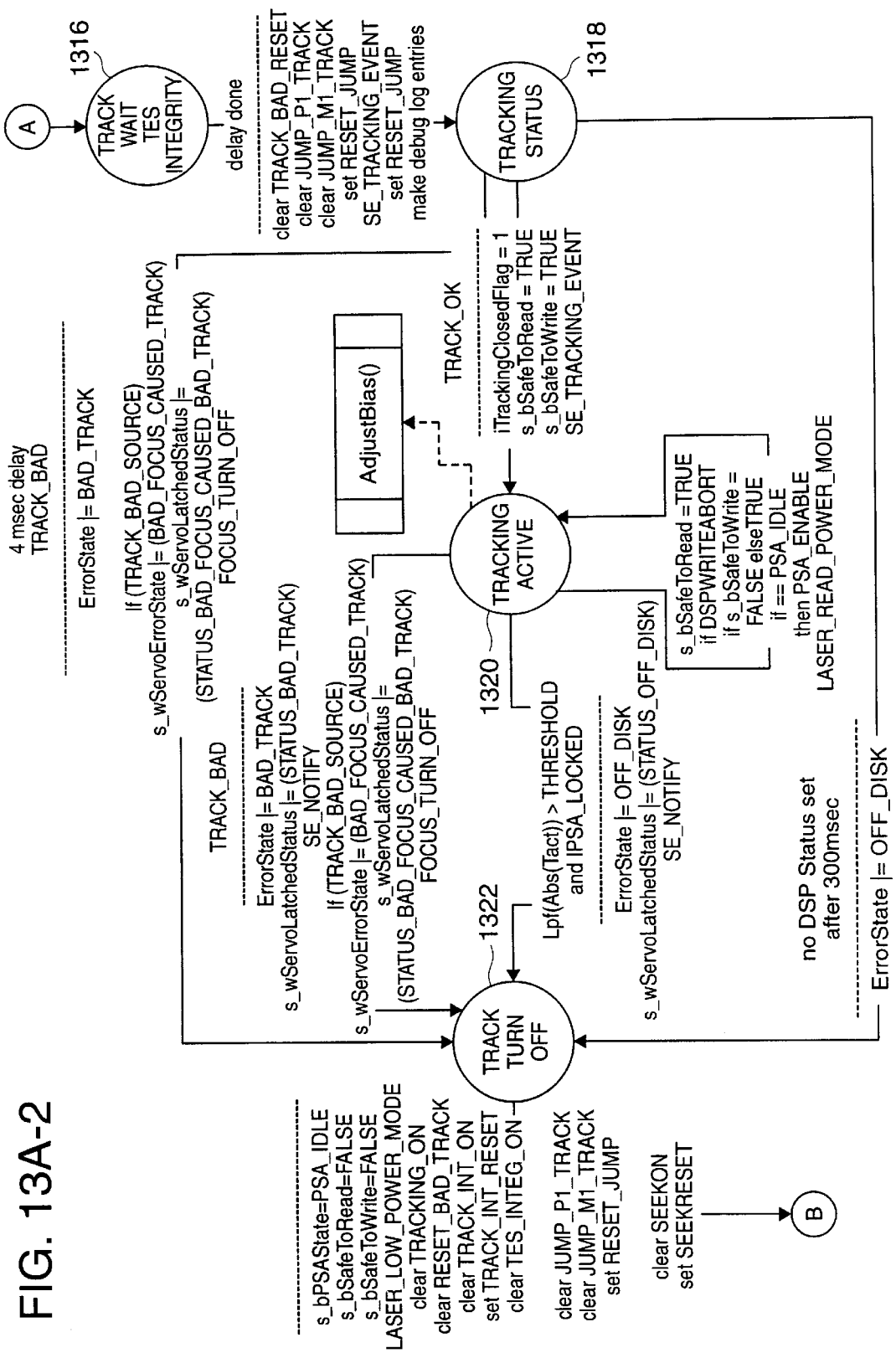
Figures 3, 13A:
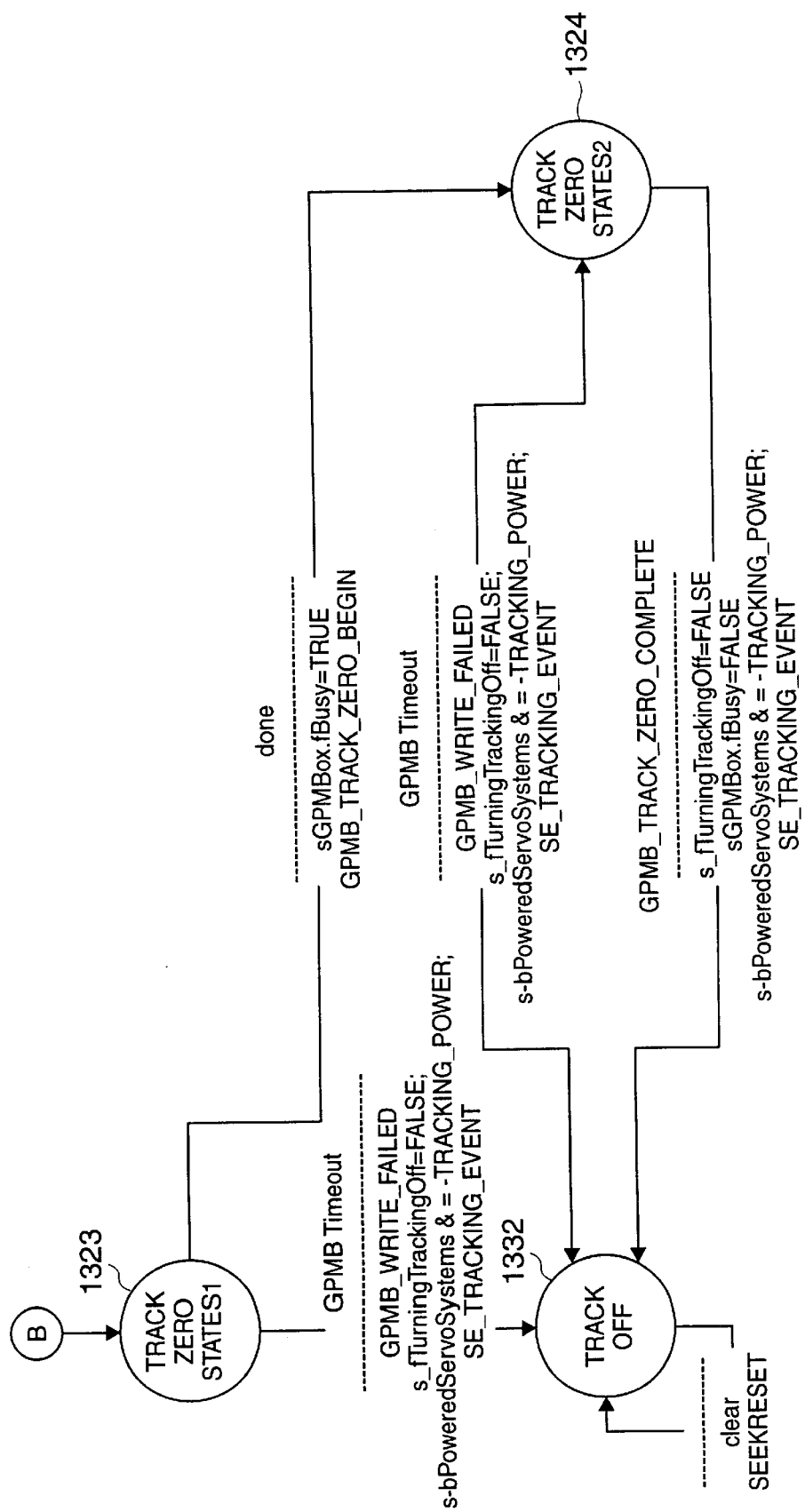
Figures 1, 13B:
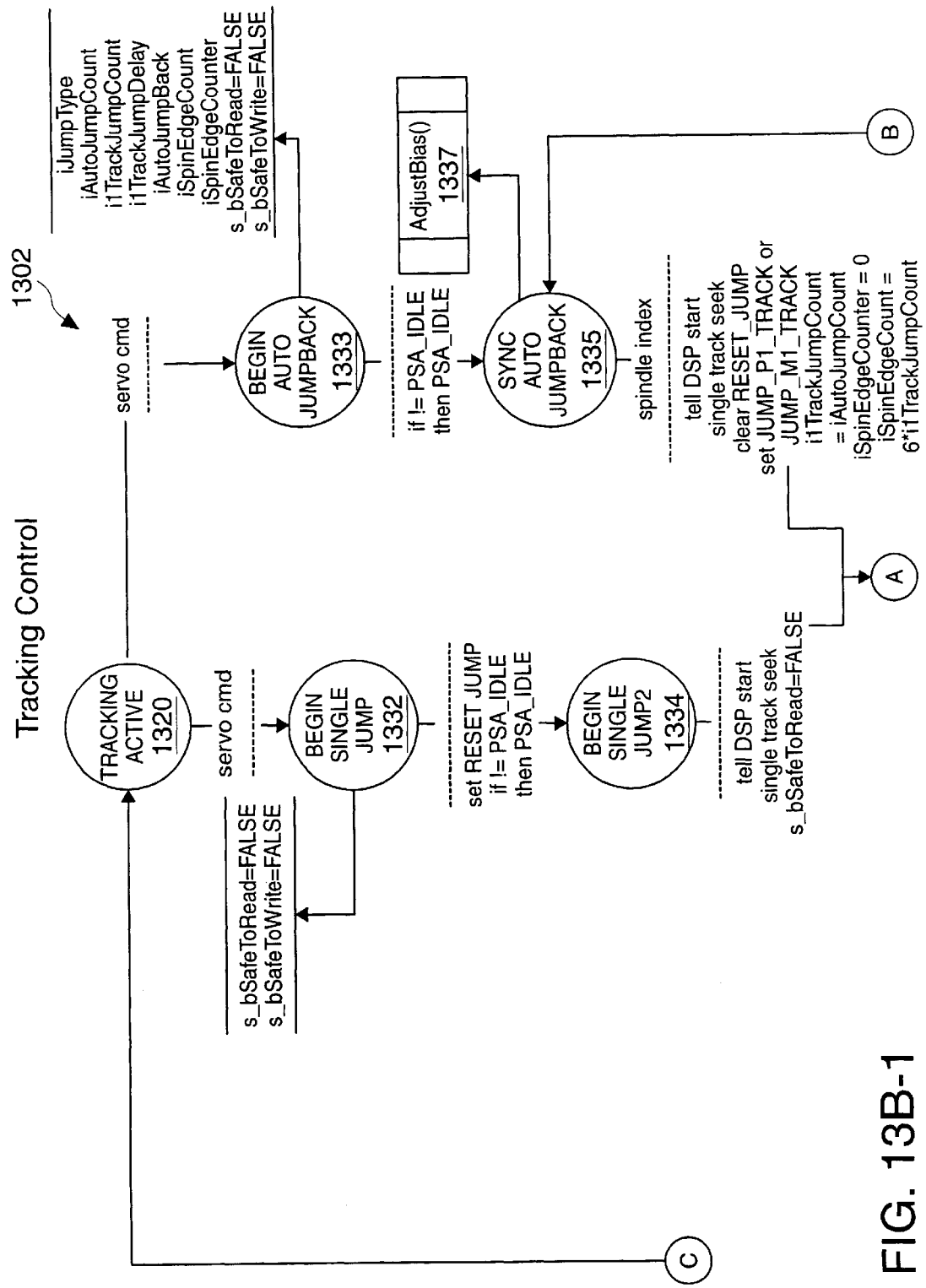
Figures 2, 13B:
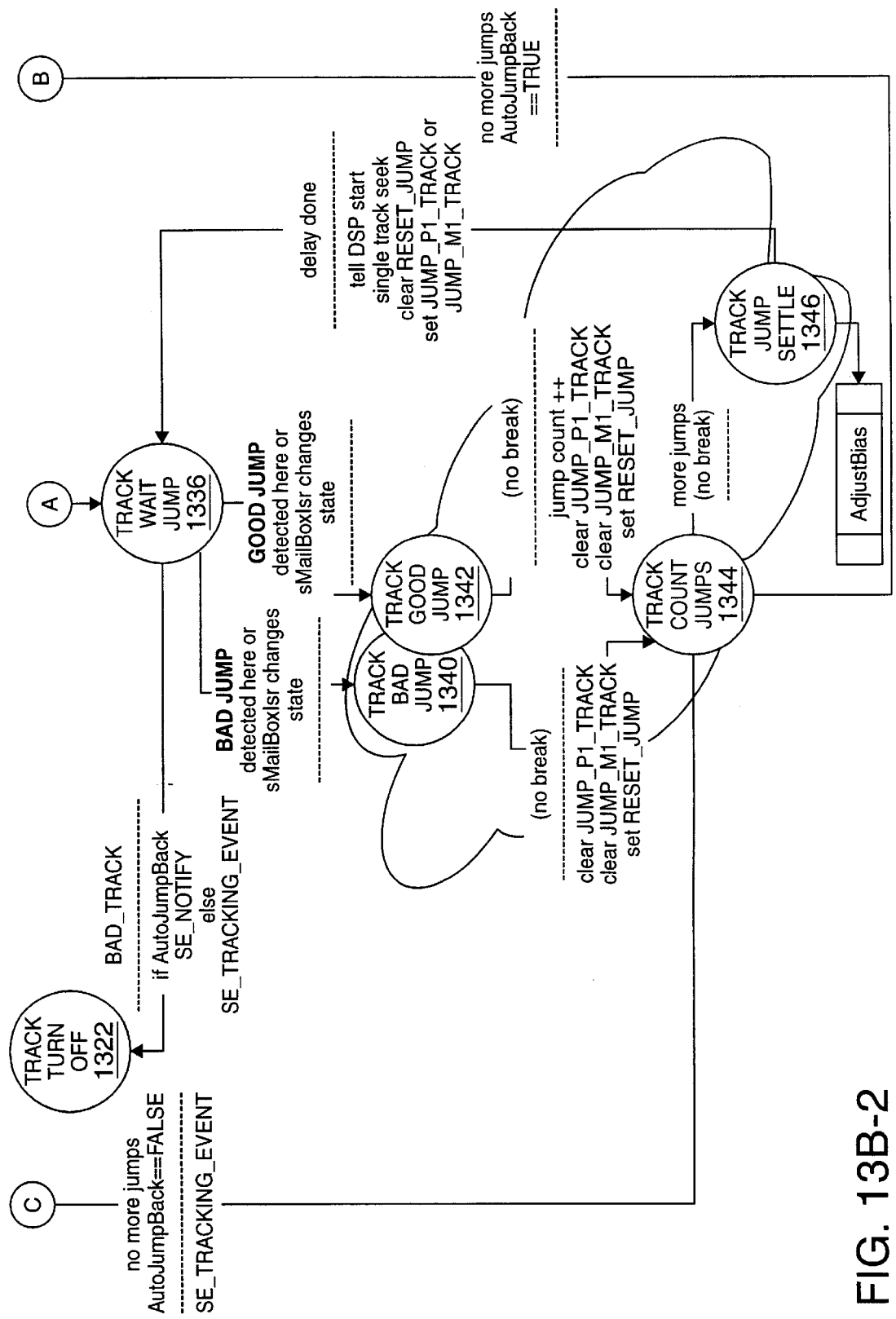
Figures 1, 13C:
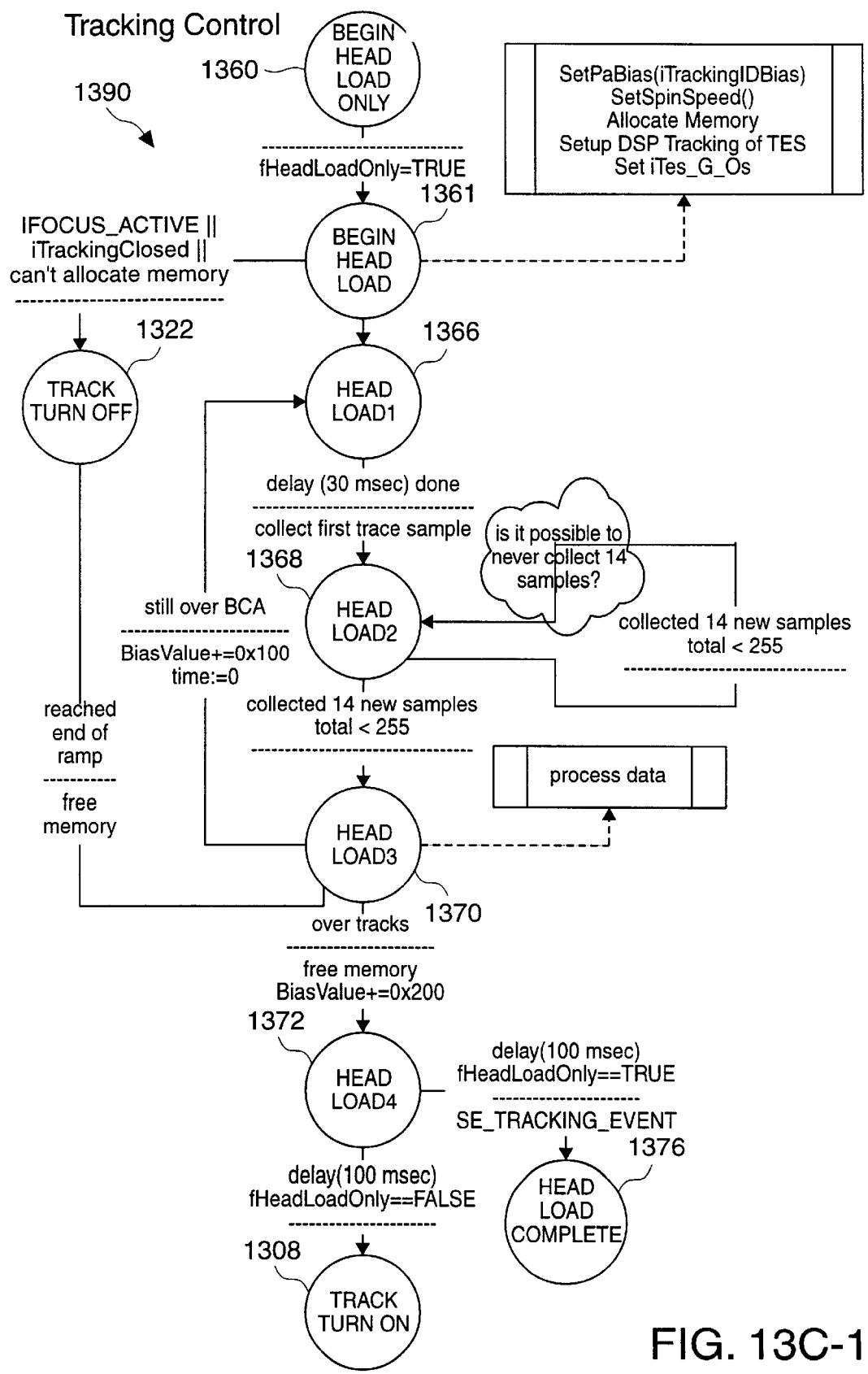
Figures 2, 13C:
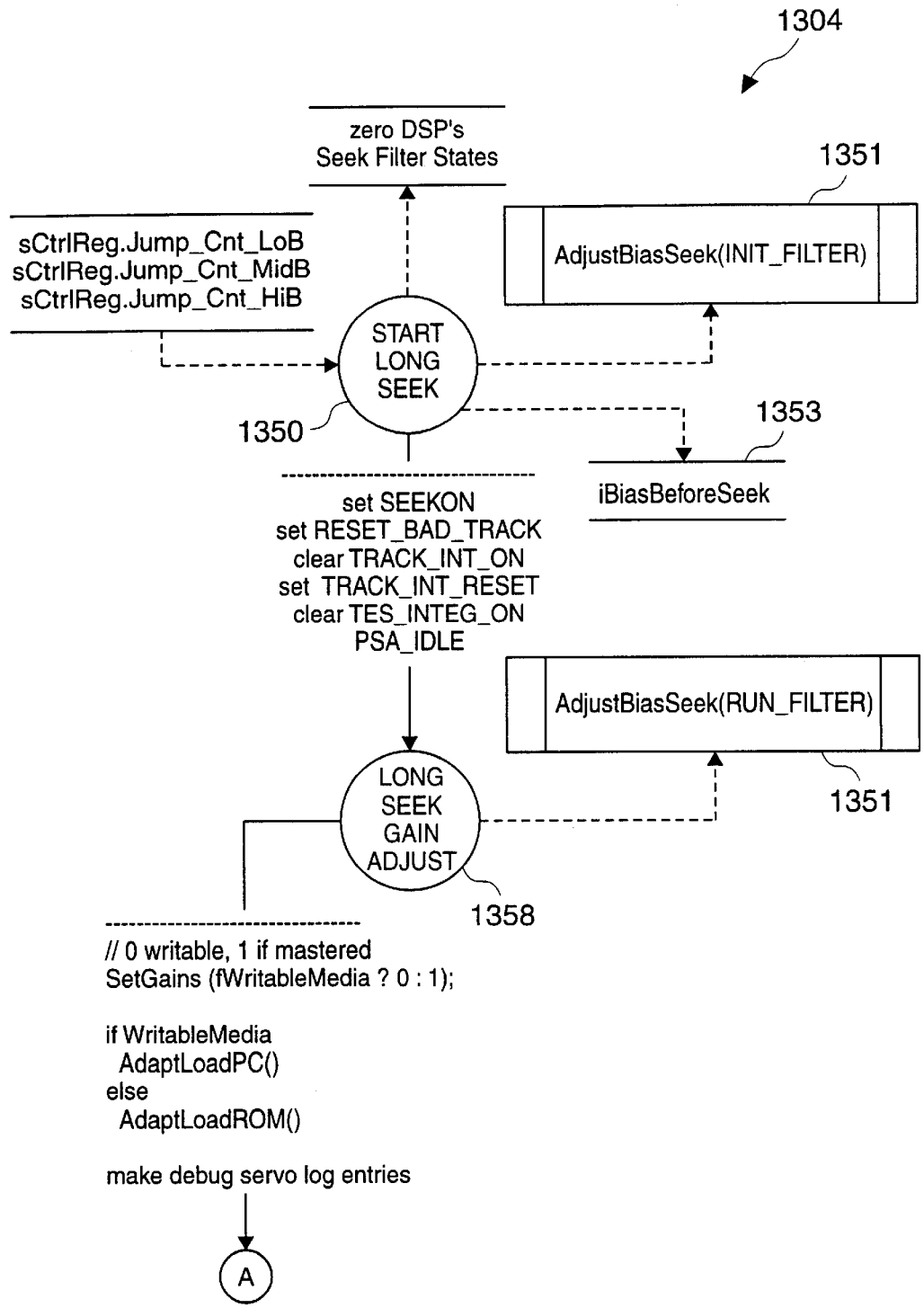
Figures 3, 13C:
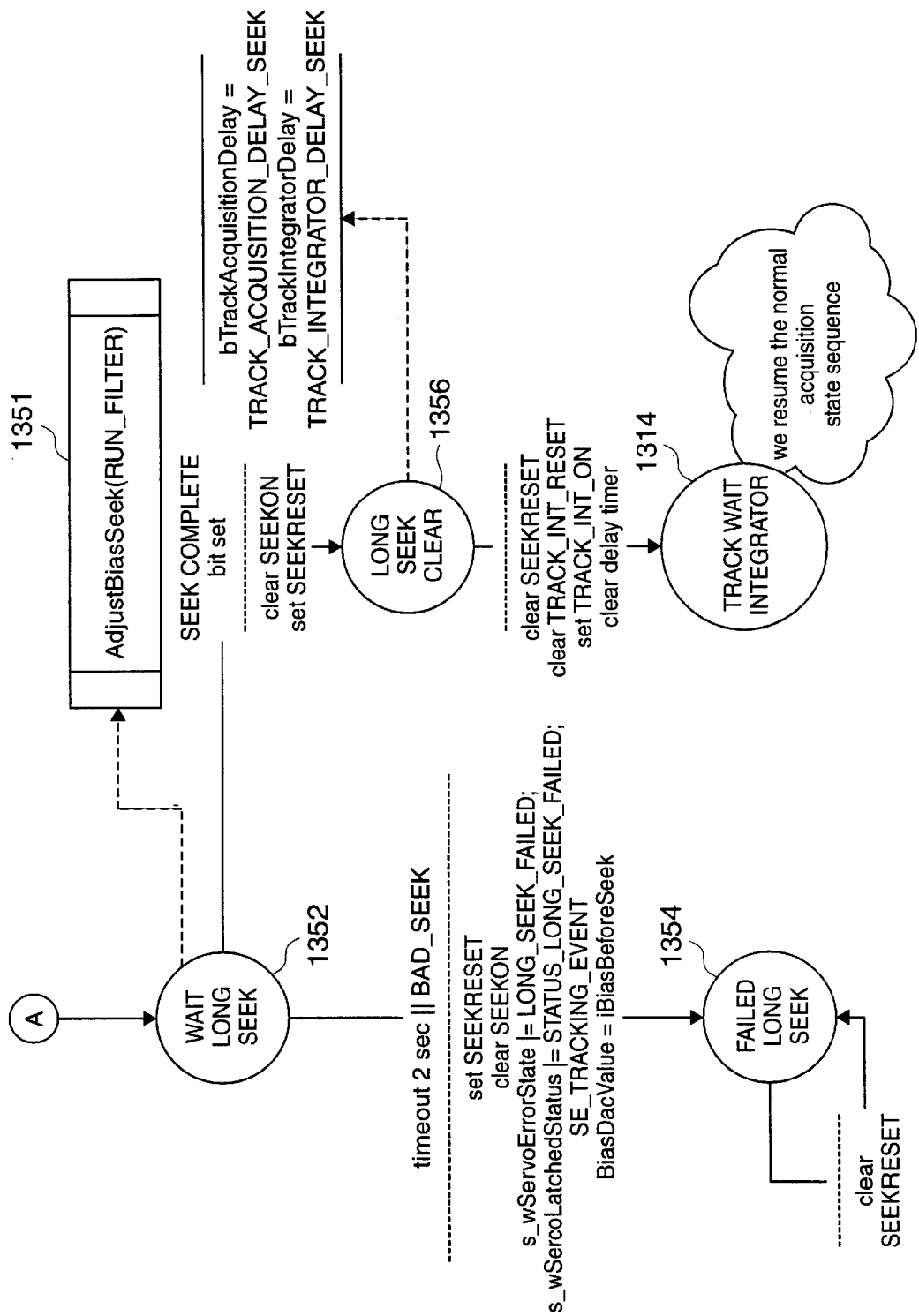

FIGS. 13a, 13b, and 13c show diagrams of aspects of the tracking/seeking control state machine shown in FIG. 9.

Figures 1, 14A:
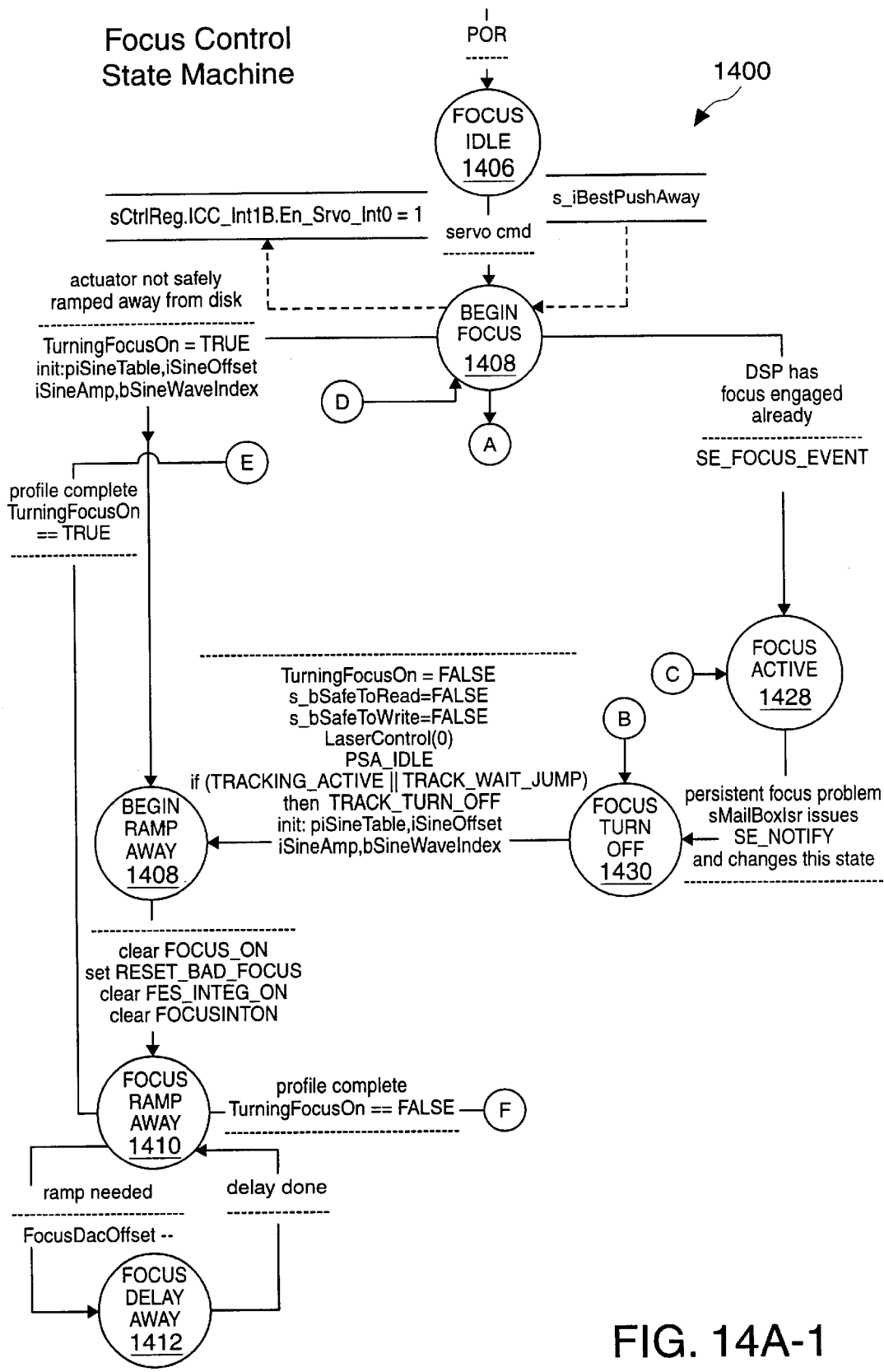
Figures 2, 14A:
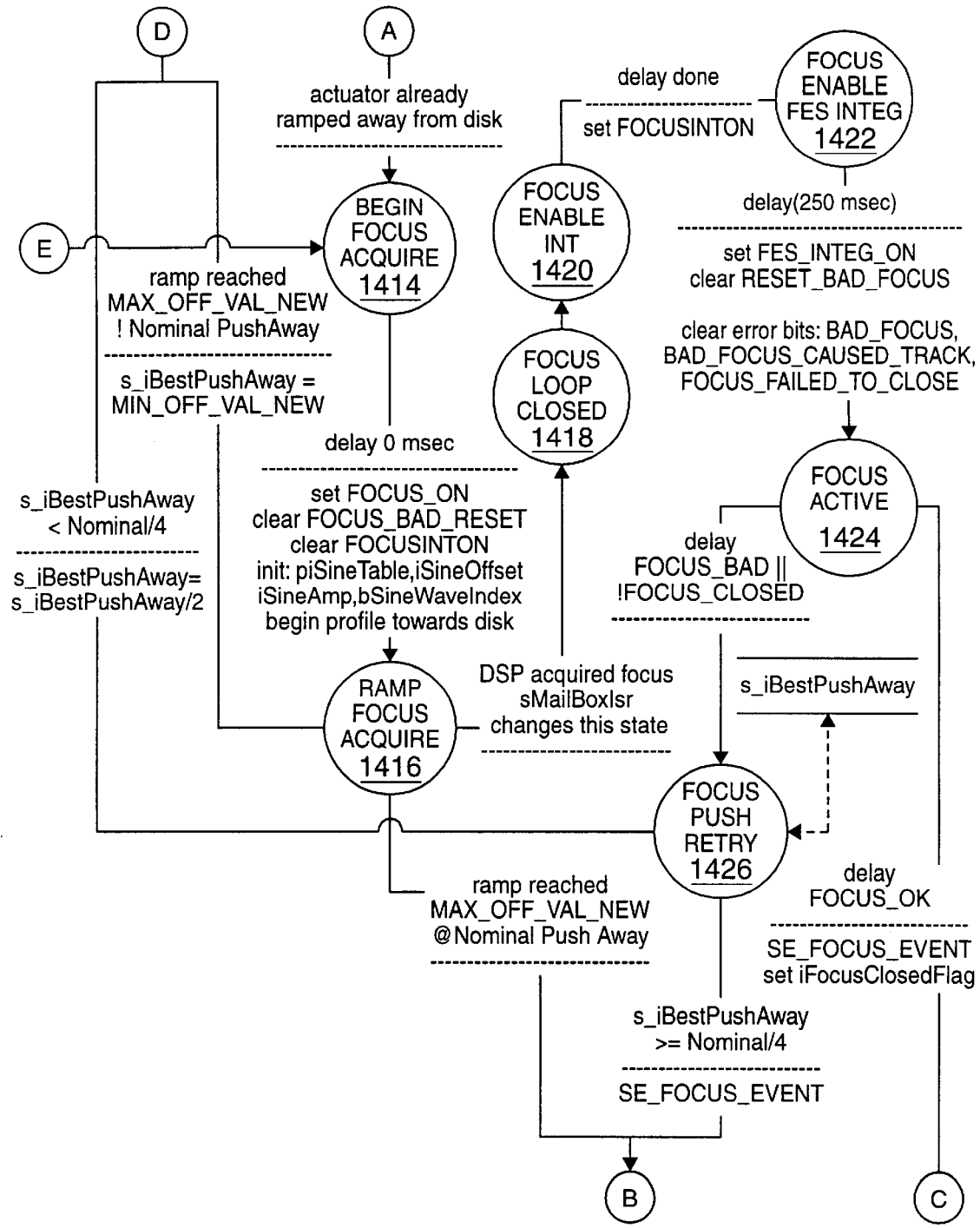
Figures 3, 14A:
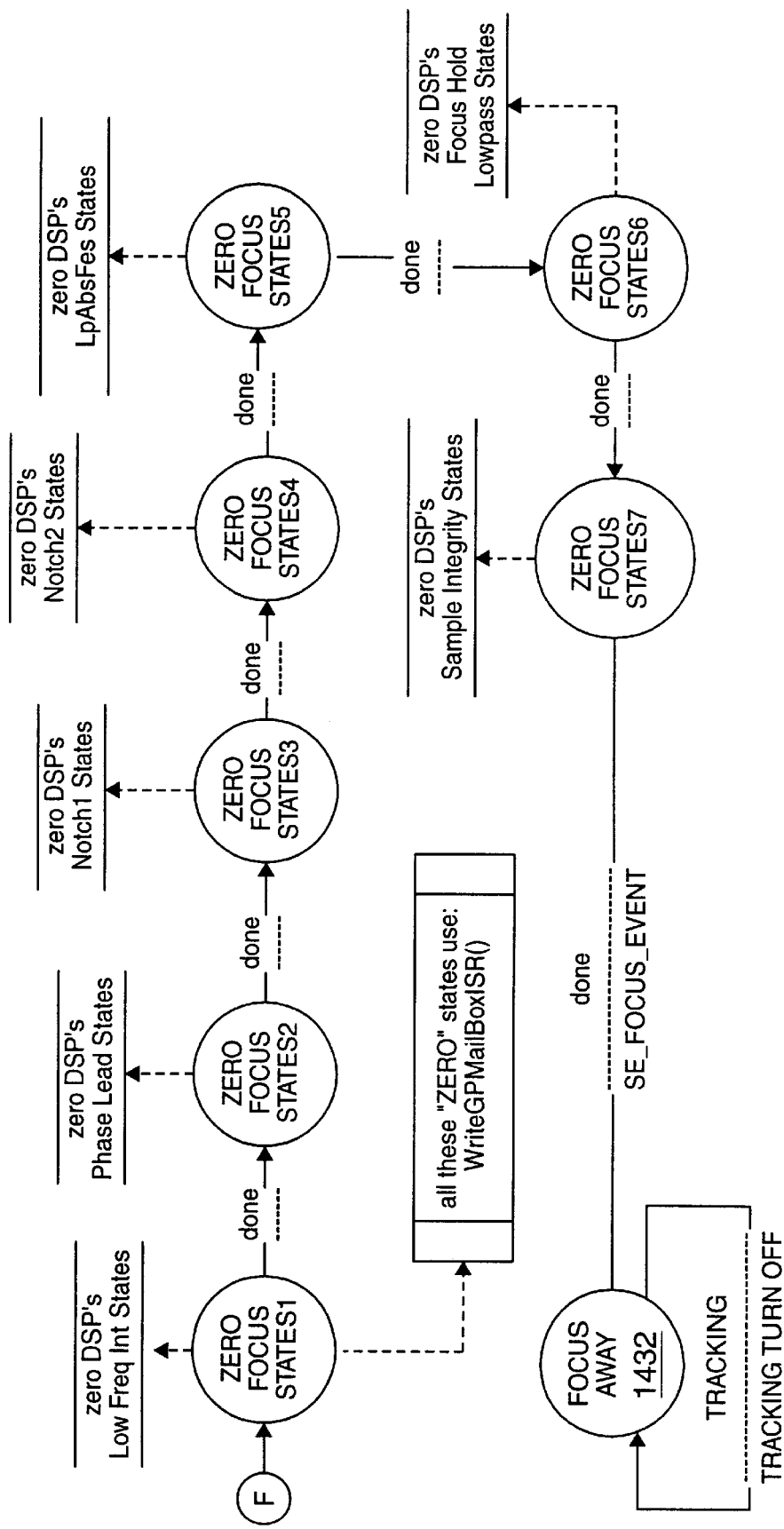
Figure 14B:
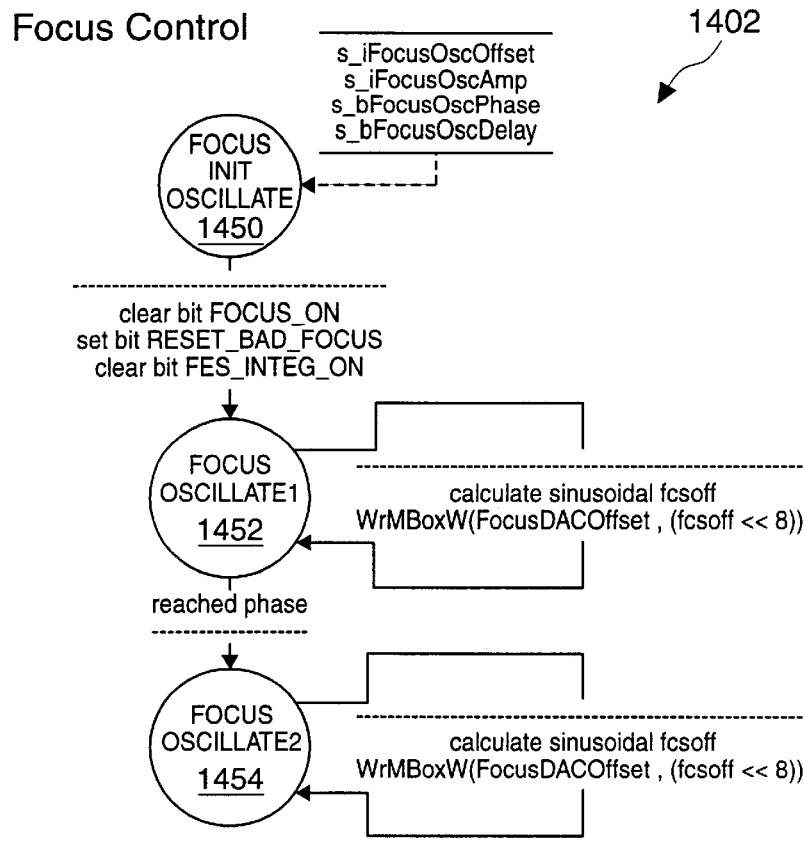
Figure 14C:
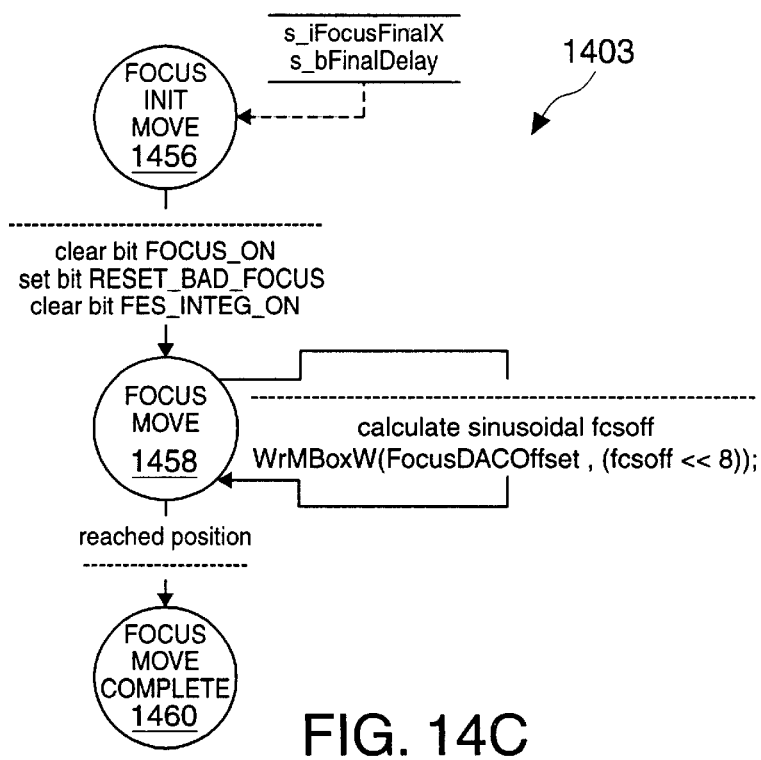

FIGS. 14a, 14b, and 14c show diagrams of aspects of the focus control state machine shown in FIG. 9.

Figures 1, 15:
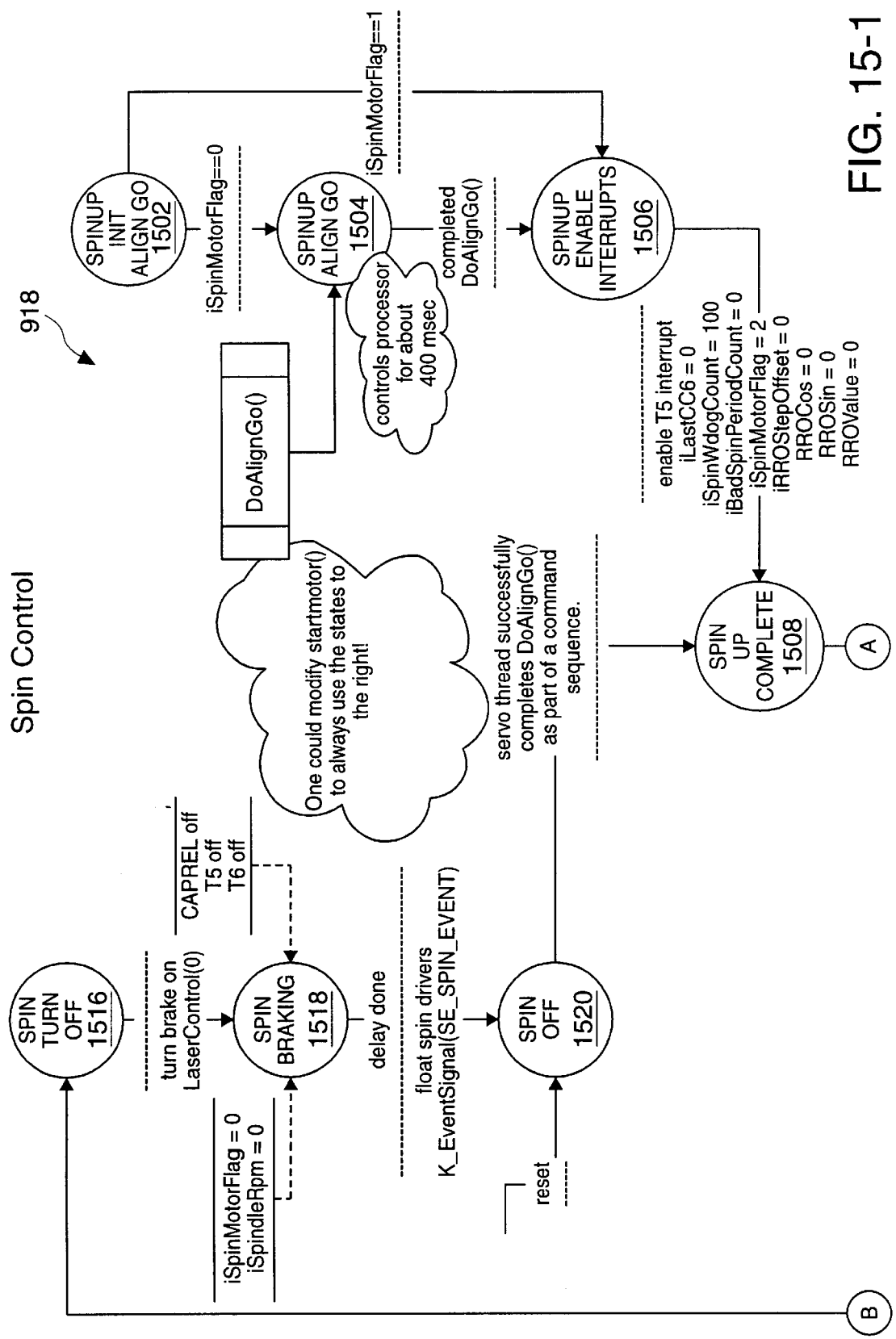
Figures 2, 15:
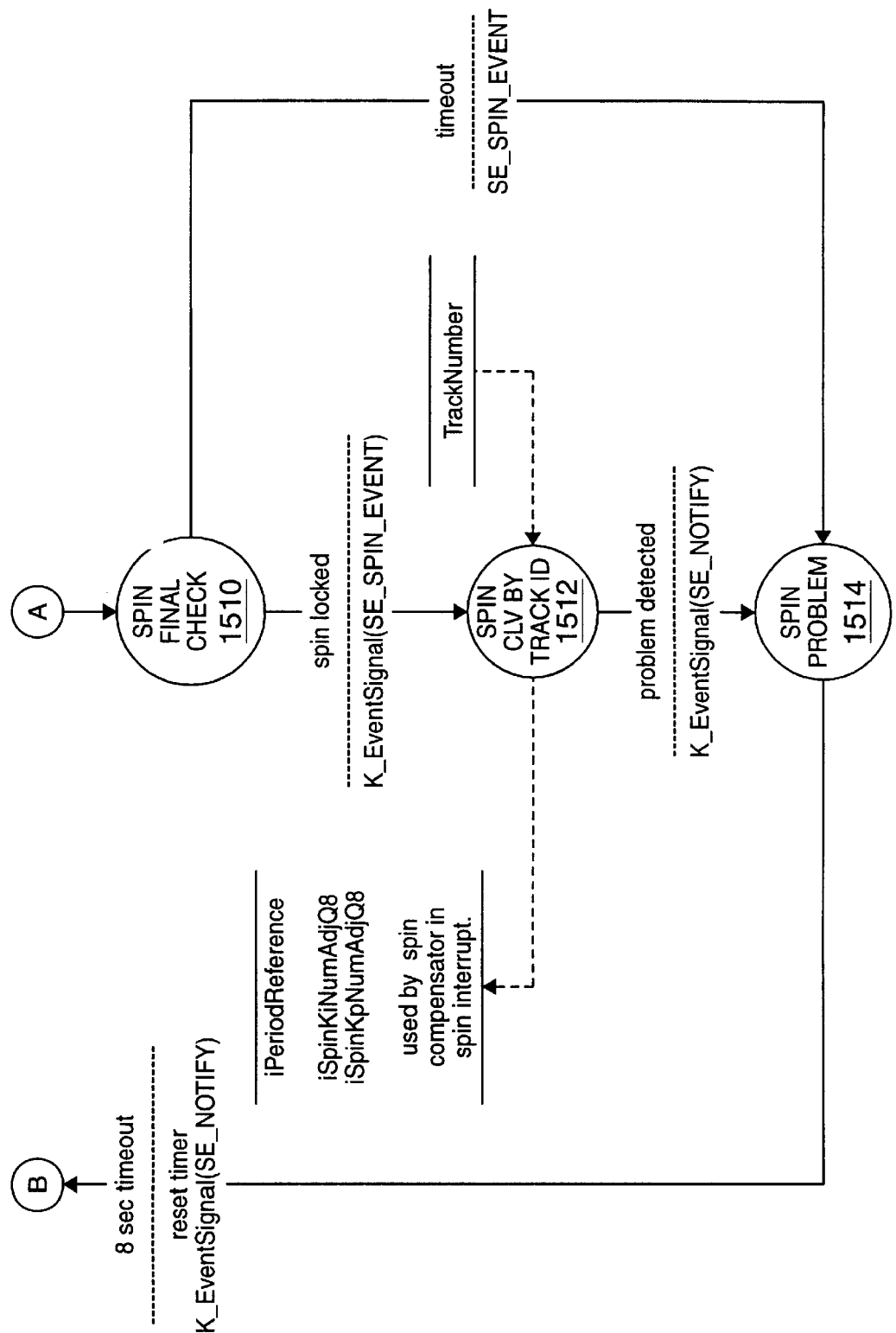

FIG. 15 shows a diagram of an embodiment of the spin control state machine shown in FIG. 9.

Figures 1, 16:
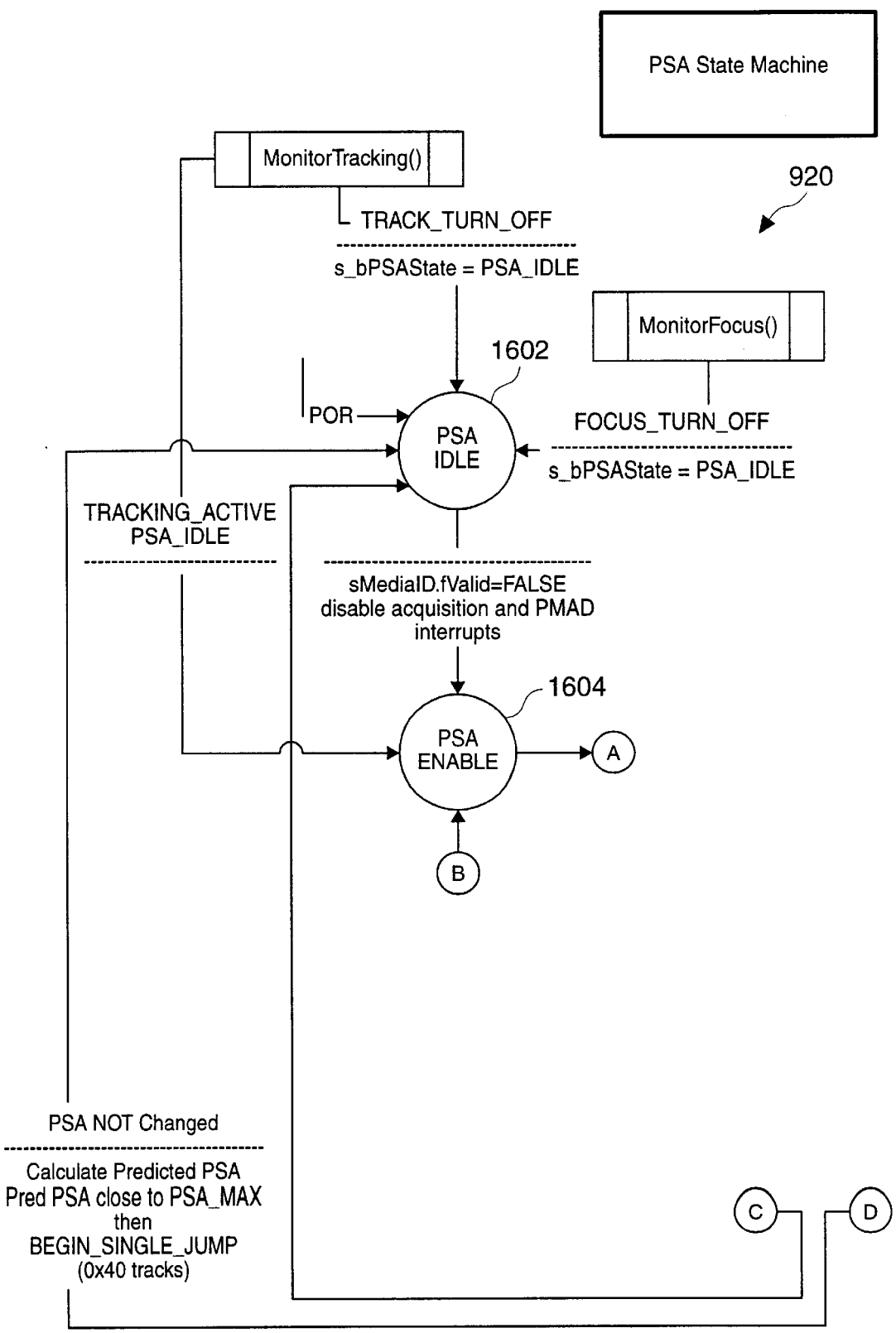
Figures 2, 16:
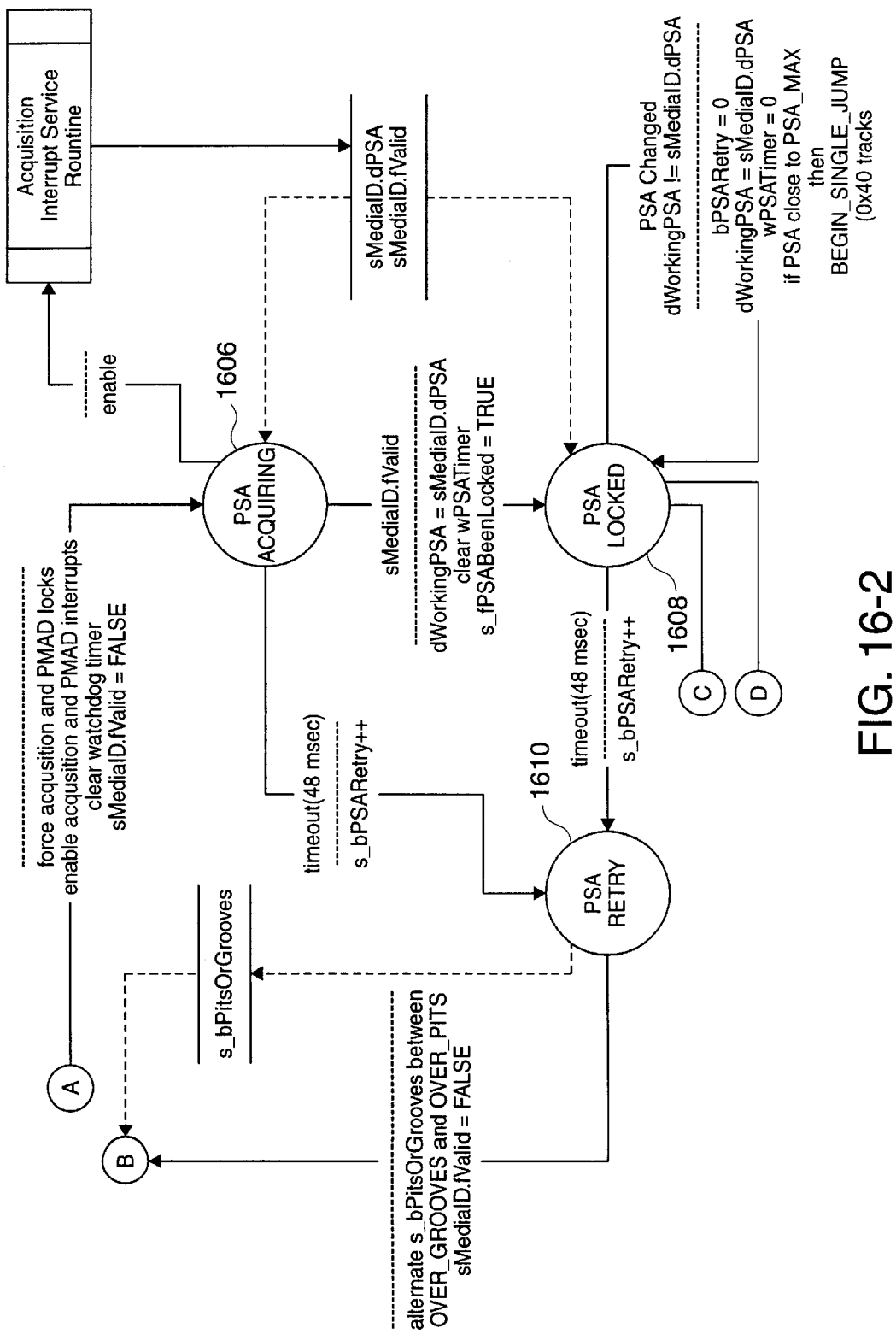

FIG. 16 shows a diagram of an embodiment of the physical sector address state machine shown in FIG. 9.

Figure 17:
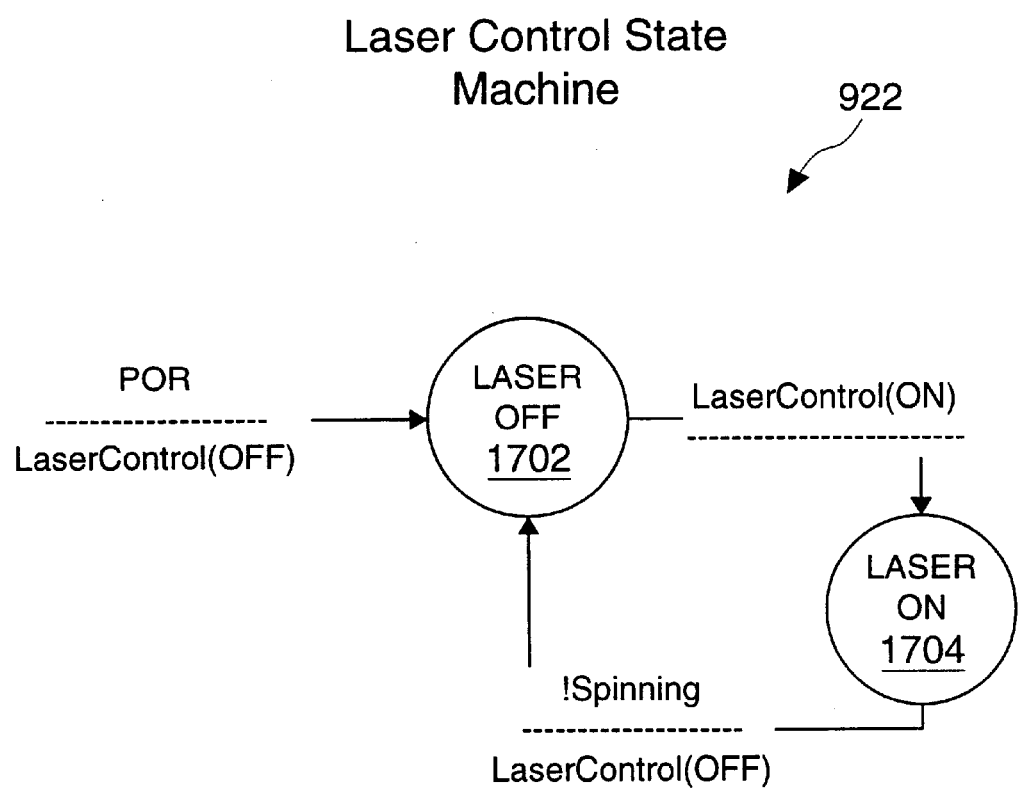

FIG. 17 shows a diagram of an embodiment of the laser control state machine shown in FIG. 9.

Figure 18:
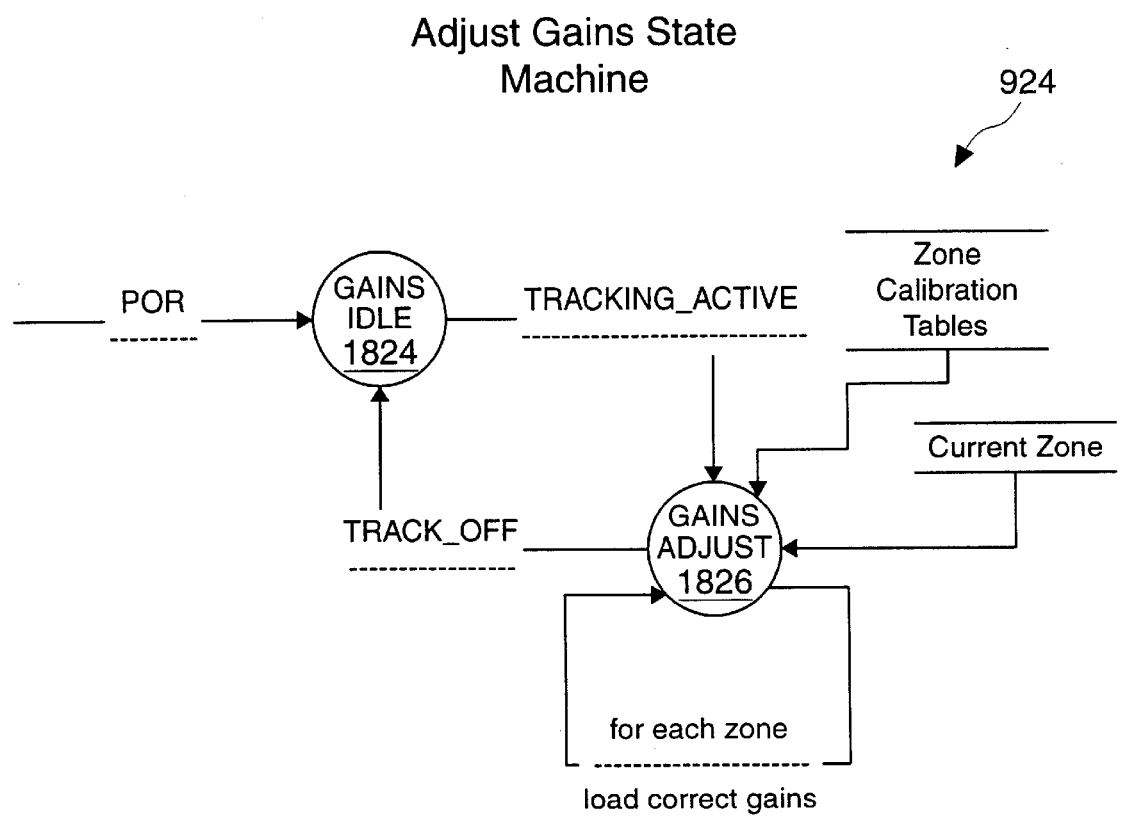

FIG. 18 shows a diagram of an embodiment of the adjust gains state machine shown in FIG. 9.

Figure 19:
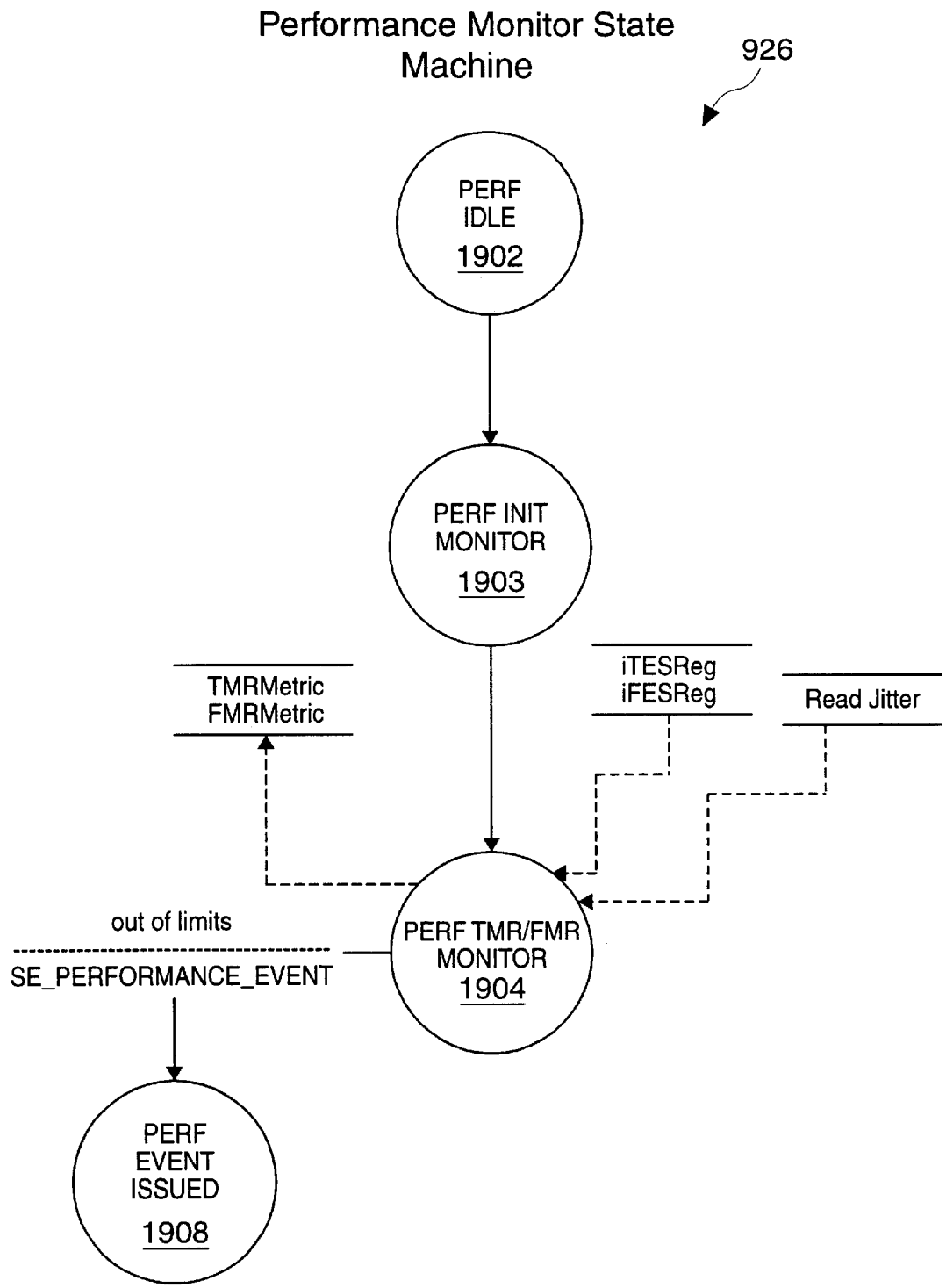

FIG. 19 shows a diagram of an embodiment of the continuous performance monitor state machine shown in FIG. 9.

Figures 1, 4:
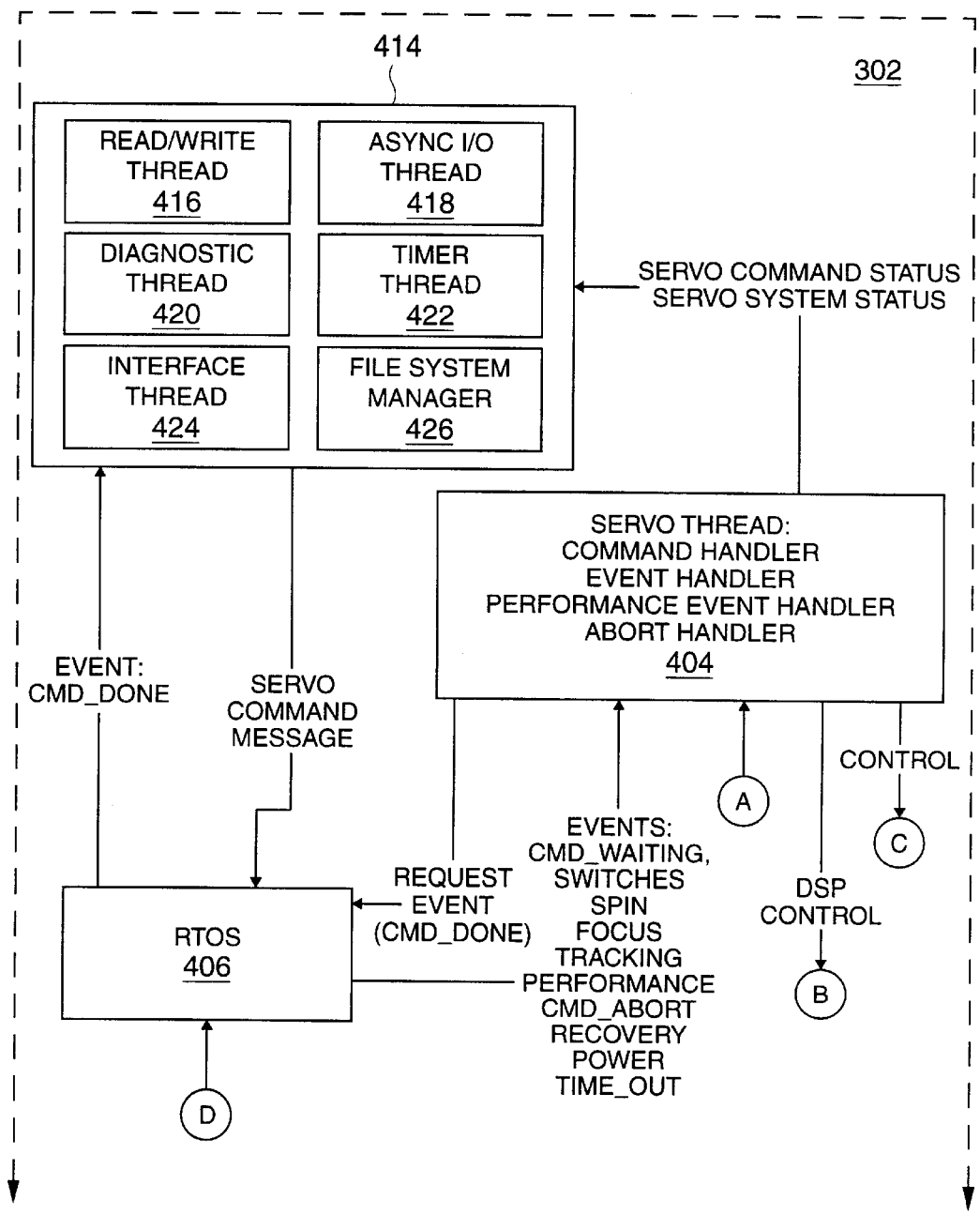
FIG. 4 is a block diagram of components included in the signal processing system shown in FIG. 3.
Figure 20A:
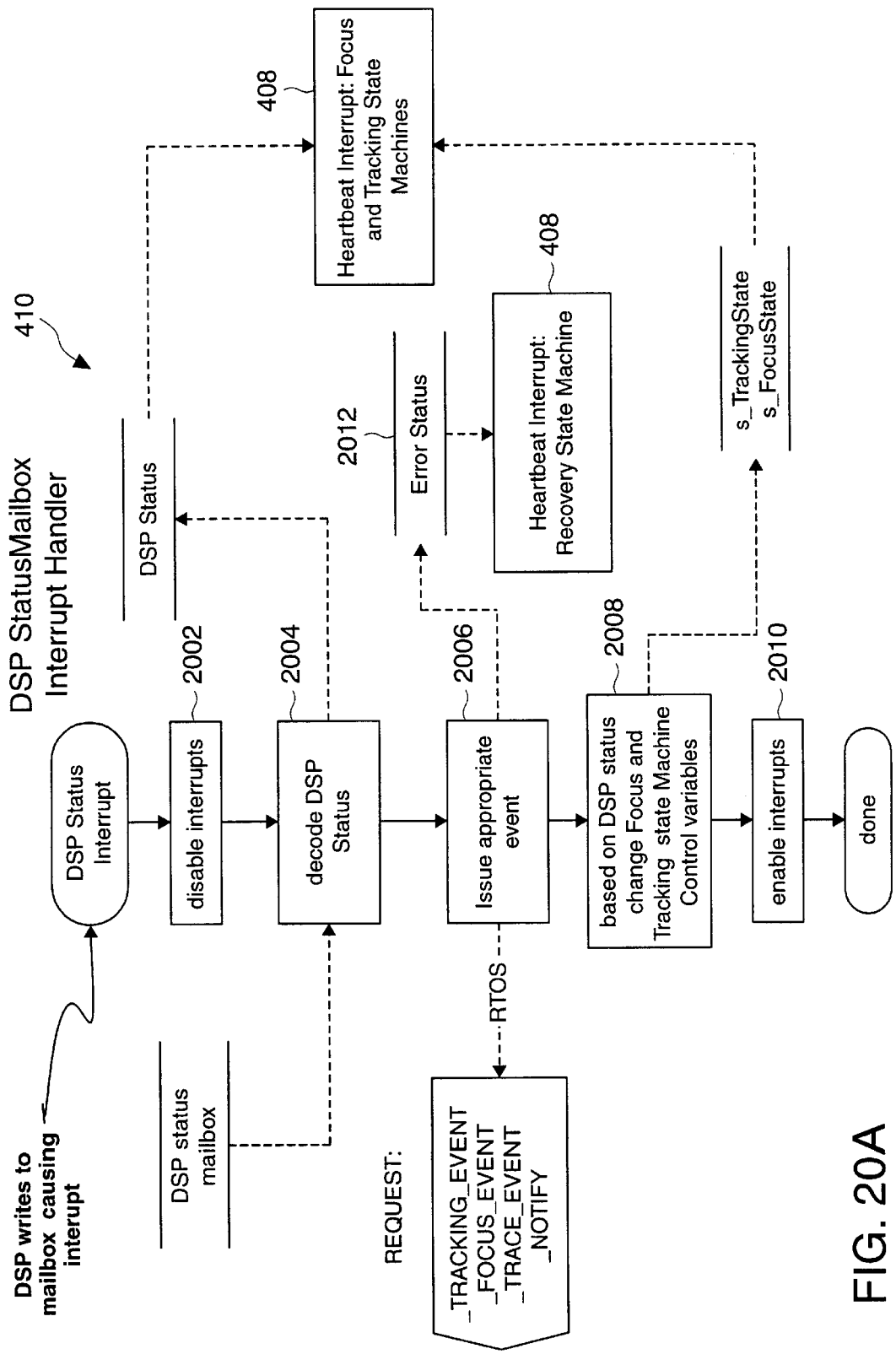

FIG. 20a shows a diagram of logic included in an embodiment of the DSP status mailbox interrupt handler shown in FIG. 4.

Figures 1, 20B:
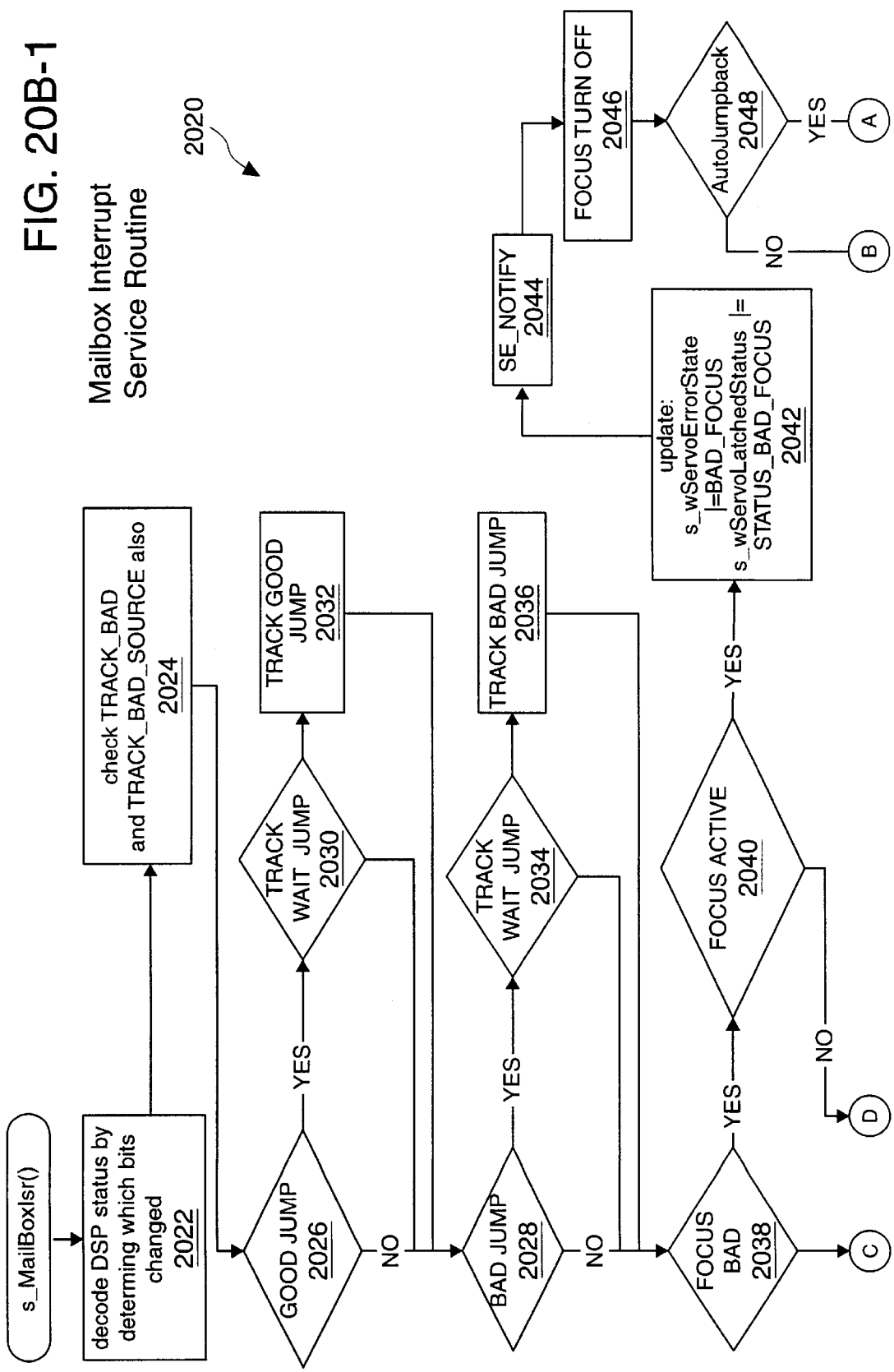
Figures 2, 20B:
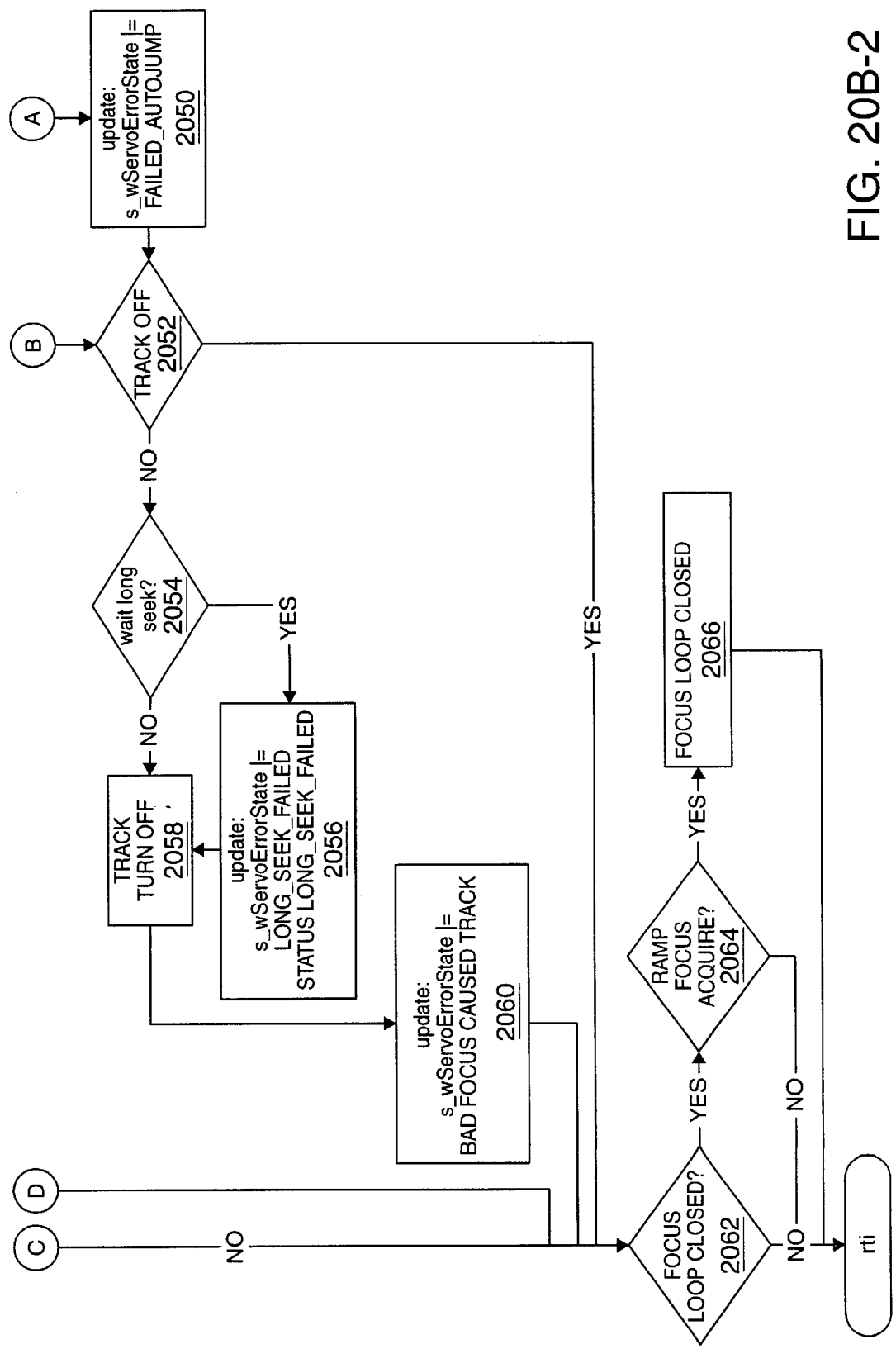

FIG. 20b shows a diagram of logic included in an embodiment of a mailbox interrupt service routine that can be included in the DSP status mailbox interrupt handler shown in FIG. 20a.

Figures 1, 20C:
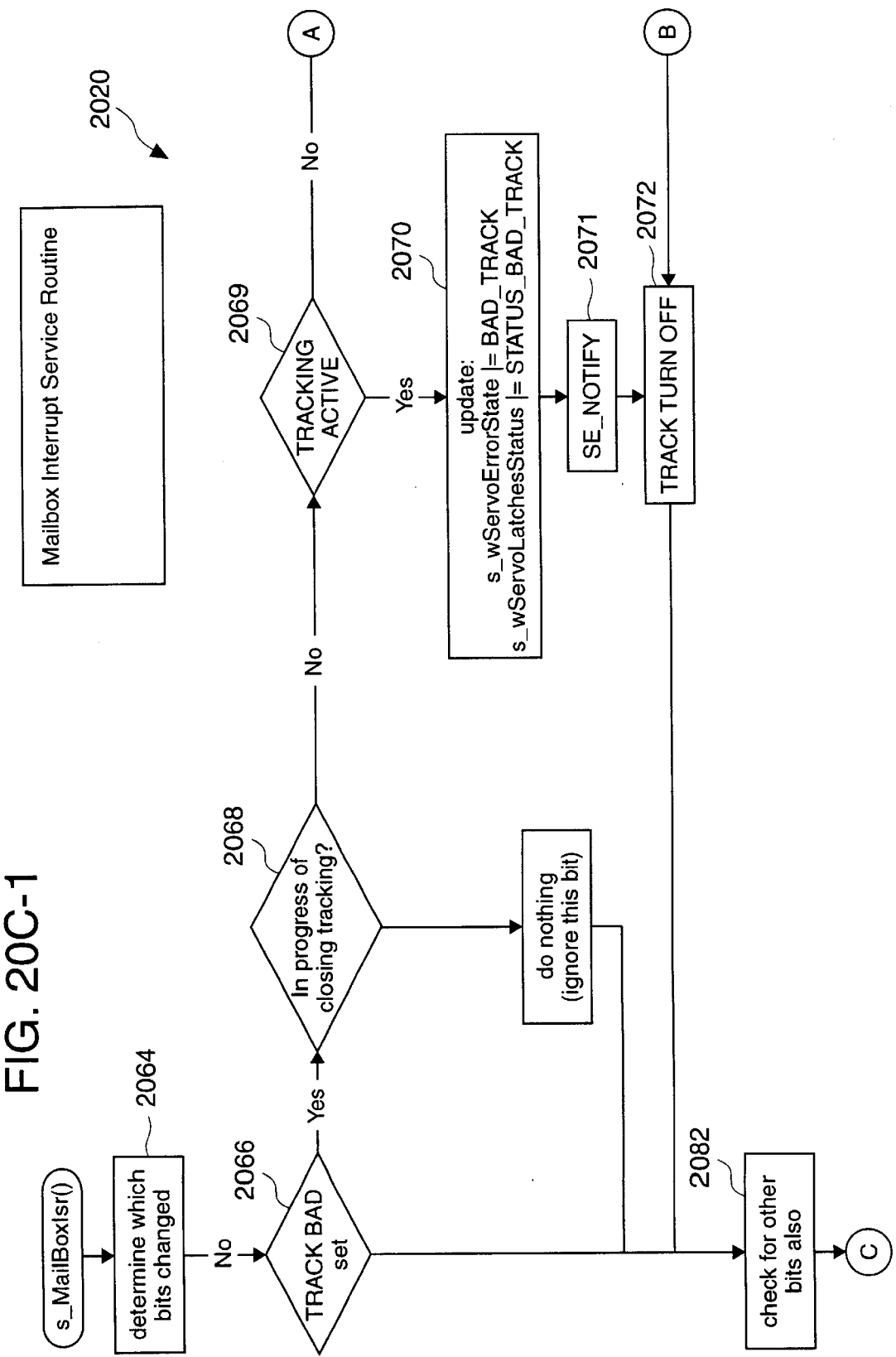
Figures 2, 20C:
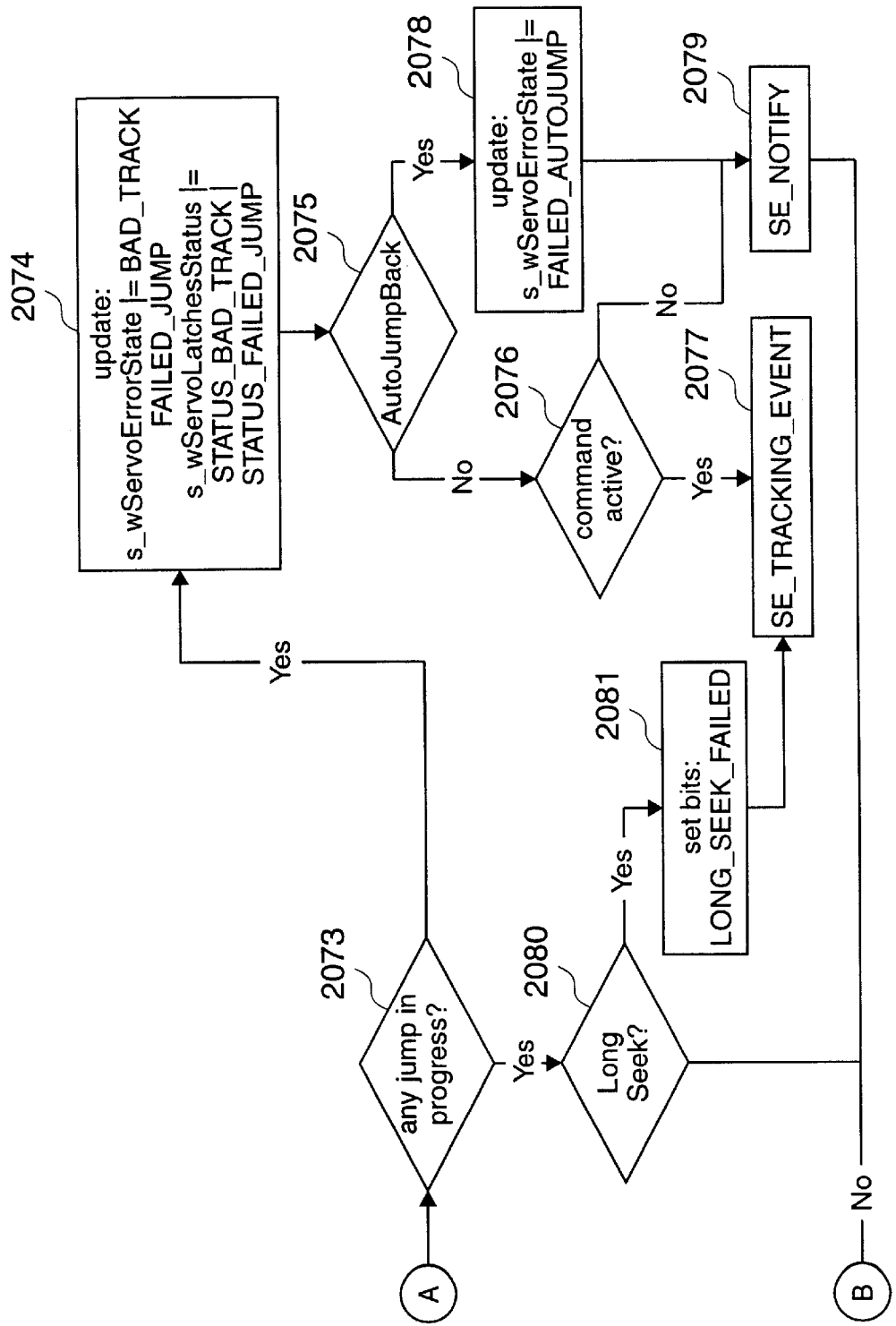
Figures 3, 20C:
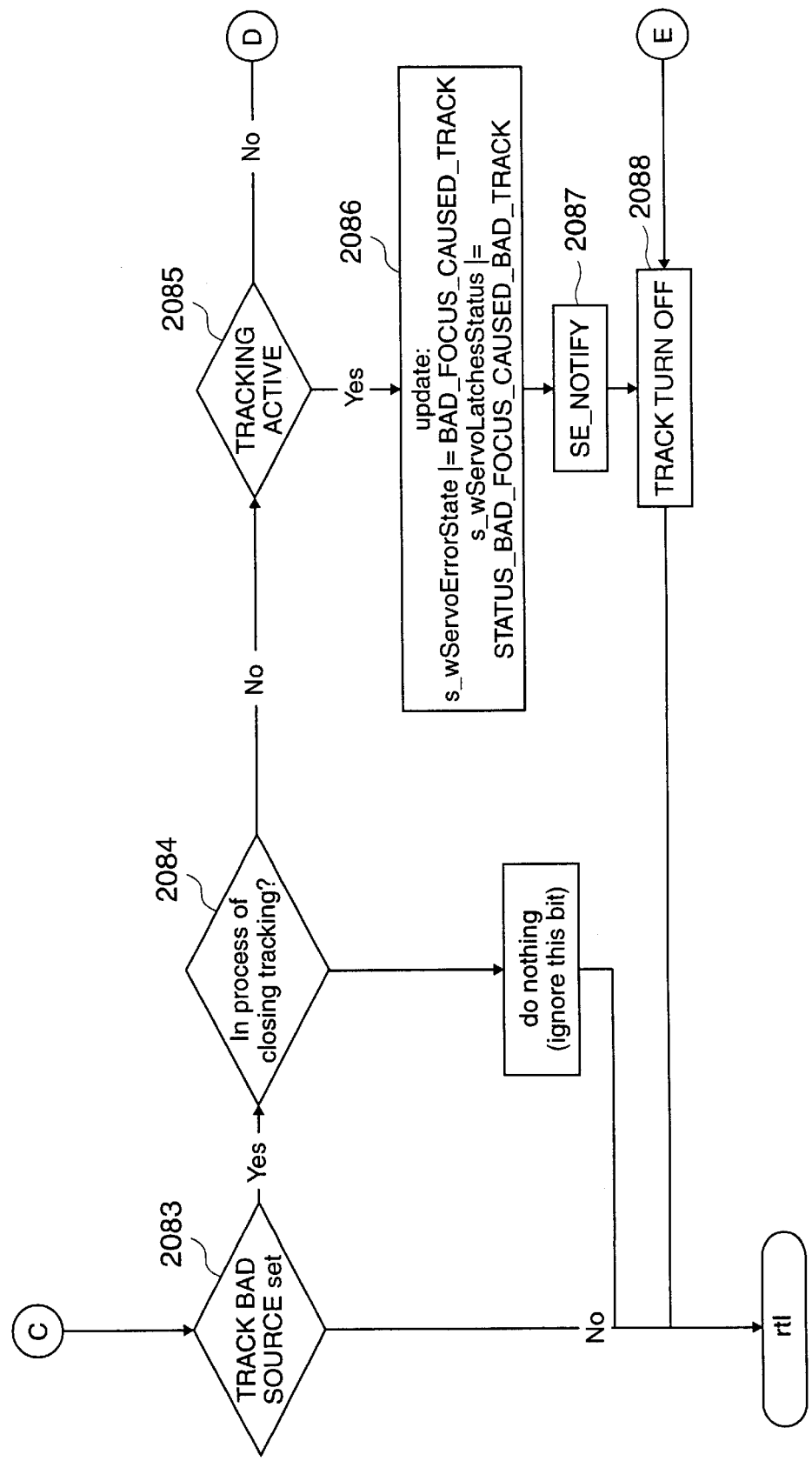
Figures 4, 20C:
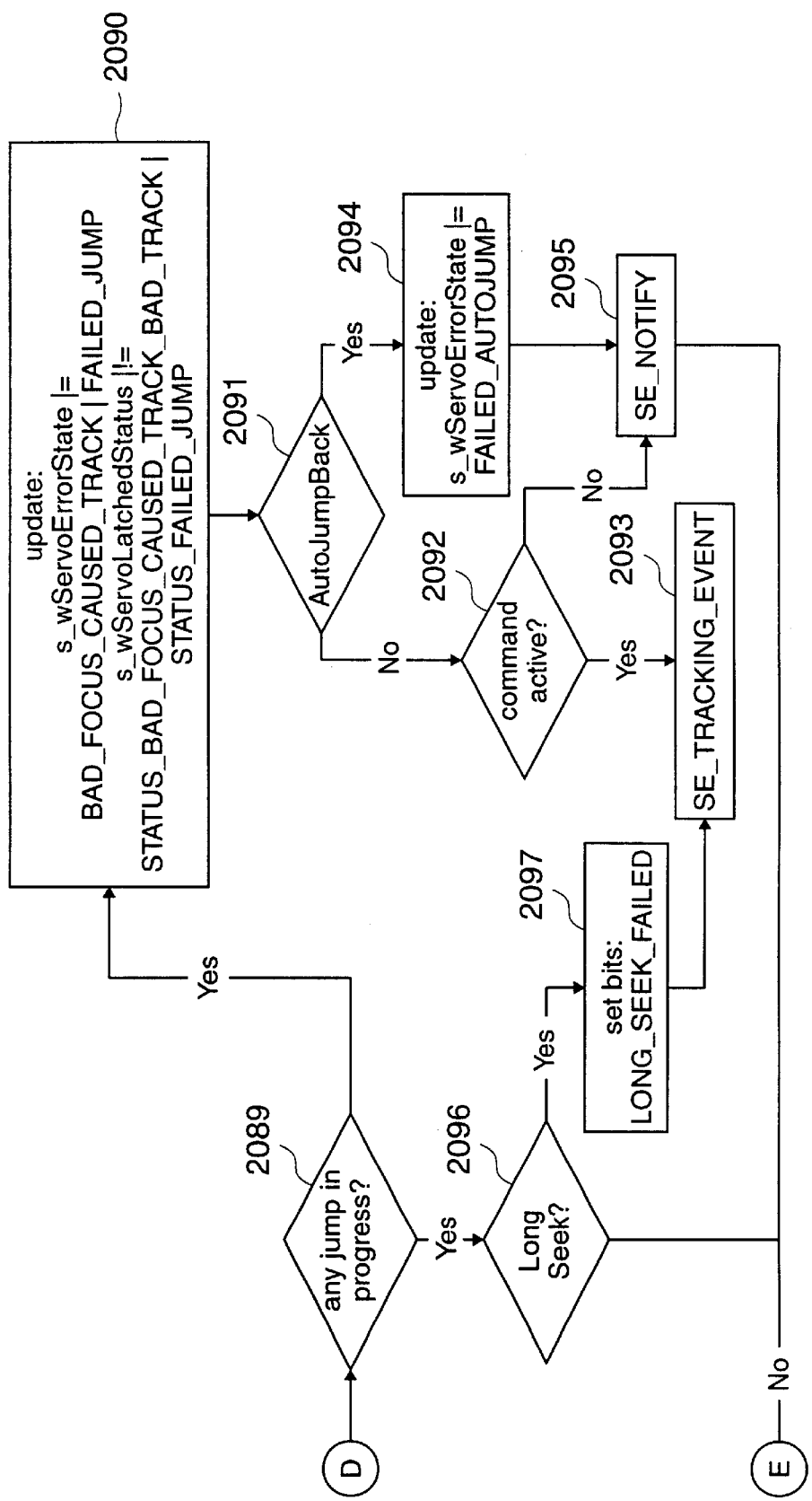

FIG. 20c shows a diagram of additional logic included in an embodiment of a mailbox interrupt service routine that can be included in the DSP status mailbox interrupt handler shown in FIG. 20a.

DETAILED DESCRIPTION

Optical Disk Drive Overview

Figure 1A:
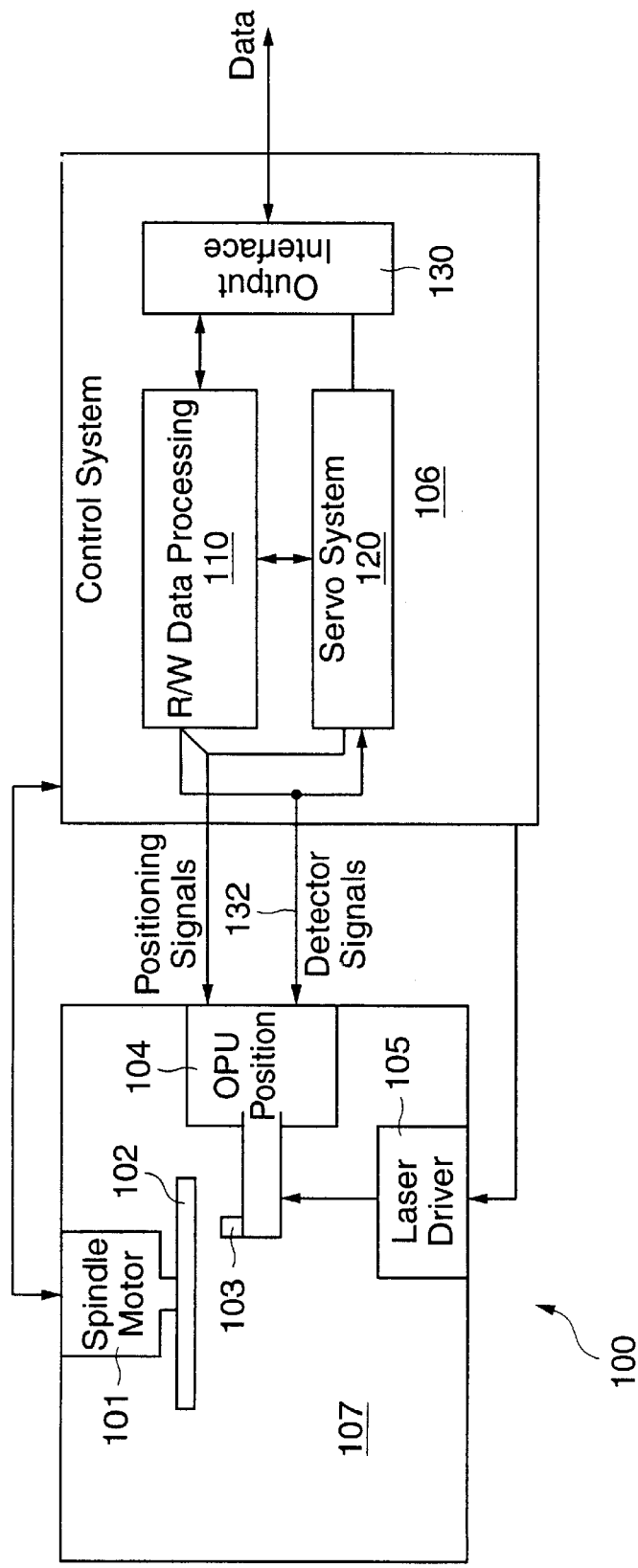
FIG. 1a shows an optical drive with which various embodiments of a disc drive control system in accordance with the present invention may be utilized.

FIG. 1a shows an optical drive 100 in accordance with the present invention. Optical drive 100 includes a spin motor 101 (called spindle driver on FIG. 1) on which an optical media 102 is mounted. Drive 100 further includes an optical pick-up unit (OPU) 103 mechanically controlled by an actuator arm 104. OPU 103 includes a light source electrically controlled by laser driver 105. OPU 103 further includes optical detectors providing signals for controller 106. Controller 106 can control the rotational speed of optical media 102 by controlling spin motor 101, the position and orientation of OPU 103 through actuator arm 104, and the optical power of the light source in OPU 103 by controlling laser driver 105.

Controller 106 includes R/W processing 110, servo system 120, and interface 130. R/W processing 110 controls the reading of data from optical media 102 and the writing of data to optical media 102. R/W processing 110 outputs data to a host (not shown) through interface 130. Servo system 120 controls the speed of spin motor 101, the position of OPU 103, and the laser power in response to signals from R/W processing 110. Further, servo system 120 insures that the operating parameters (e.g., focus, tracking, and spin motor speed) are controlled in order that data can be read from or written to optical media 102.

Optical media 102 can include pre-mastered portions and writeable portions. Premastered portions, for example, can be written at the time of manufacture to include content provided by a content provider. The content, for example, can include audio data, video data, text data, or any other data that can be provided wit optical media 102. The writeable portion of optical media 102 can be written onto by drive 100 to provide data for future utilization of optical media 102. The user, for example, may write notes or other information on the disk. Drive 100, for example, may write calibration data or other operating data to the disk for future operation of drive 100 with optical media 102. An example of optical media 102 is described in U.S. application Ser. No. 09/560,781 for "Miniature Optical Recording Disk", herein incorporated by reference in its entirety. The R/W Data Processing 110 can operate with many different disk formats. One example of a disk format is provided in U.S. application Ser. No. 09/527,982, for "Combination Mastered and Writeable Medium and Use in Electronic Book Internet Appliance," herein incorporated by reference in its entirety. Other examples of disk data formats are provided in U.S. application Ser. No. 09/539,841, "File System Management Method Embedded In A Storage Device;" U.S. application Ser. No. 09/583,448, "Disk Format for Writeable Mastered Media;" U.S. application Ser. No. 09/542,681, "Structure and Method for Storing Data on Optical Disks;" U.S. application Ser, No. 09/542,510 for "Embedded Data Encryption Means;" U.S. application Ser. No. 09/583,133 for "Read Write File System Emulation;" and U.S. application Ser. No. 09/583,452 for "Method Of Decrypting Data Stored On A Storage Device Using an Embedded Encryption/Decryption Means", each of which is hereby incorporated by reference in its entirety.

Drive 100 can be included in any host, for example personal electronic devices. Examples of hosts that may include drive 100 are further described in U.S. Pat. application Ser. No. 09/315,398 for Removable Optical Storage Device and System, herein incorporated by reference in its entirety. In some embodiments, drive 100 can have a relatively small form factor such as about 10.5 mm height, 50 mm width and 40 mm depth.

Figure 1B:
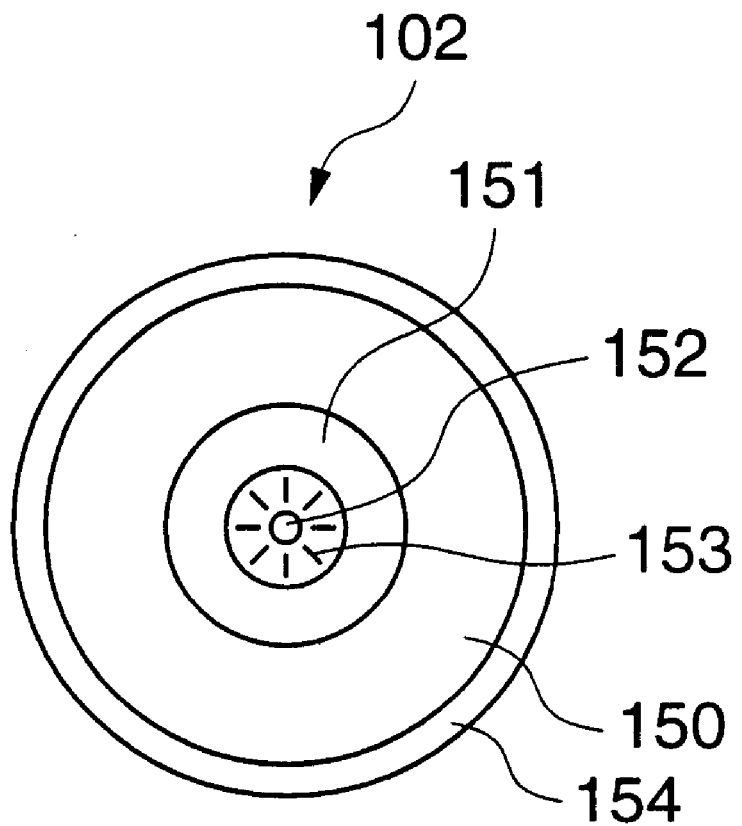
FIG. 1b shows a diagram for an optical media that may be utilized in the disc drive shown in FIG. 1.

FIG. 1b shows an example of optical media 102. Optical media 106 can include any combinations of pre-mastered portions 150 and writeable portions 151. Premastered portions 150, for example, can be written at the time of manufacture to include content provided by a content provider. The content, for example, can include audio data, video data, text data, or any other data that can be provided with optical media 102. Writeable portion 151 of optical media 102 can be written onto by drive 100 to provide data for future utilization of optical media 102. The user, for example, may write notes, keep interactive status (e.g. for games or interactive books) or other information on the disk. Drive 100, for example, may write calibration data or other operating data to the disk for future operations of drive 100 with optical media 102. In some embodiments, optical media 102 includes an inner region 153 close to spindle access 152. A bar code can be written on a portion of an inner region 153. The readable portion of optical media 102 starts at the boundary of region 151 in FIG. 1b. In some embodiments, writeable portion 151 may be at the outer diameter rather than the inner diameter. In some embodiments of optical media 102, an unusable outer region 154 can also be included.

The pre-mastered portions 150 of the optical media 102 can have a different data density compared to the writeable portions 151. Data processors in disc drive 100 can therefore use different clock rates depending on whether the pre-mastered portions 150 or the writeable portions 151 are being accessed. Disc drive 100 must also be able to read and write data at variable density. Further, each time a new cartridge containing the optical media 102 is inserted, drive 100 must determine if different densities are included on the optical media 102, and adjust drive parameters if the data densities are different from the optical media 102 previously used.

Figure 2A:
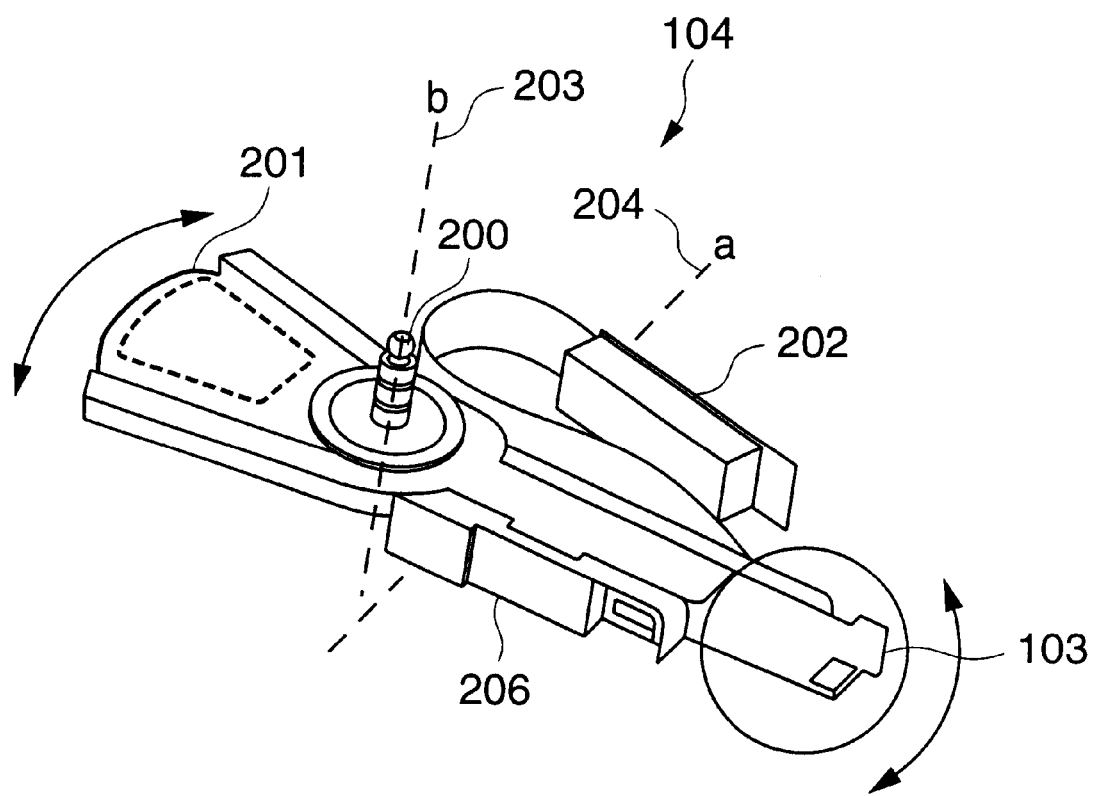
FIG. 2a shows an embodiment of an optical pickup unit mounted on an actuator arm that can be utilized with the optical drive shown in FIG. 1.

FIG. 2a shows an embodiment of actuator arm 104 with OPU 103 mounted on one end. Actuator arm 104 in FIG. 2a includes a pin 200 which provides a rotational pivot about axis 203 for actuator arm 104. Actuator 201, which in some embodiments can be a magnetic coil positioned over a permanent magnet, can be provided with a current to provide a rotational motion about axis 203. Actuator arm 104 further includes a flex axis 204. A motion of OPU 103 substantially perpendicular to the rotational motion about axis 203 can be provided by activating actuator coil 206. In some embodiments, actuators 206 and 201 can be voice coils.

Figure 2B:
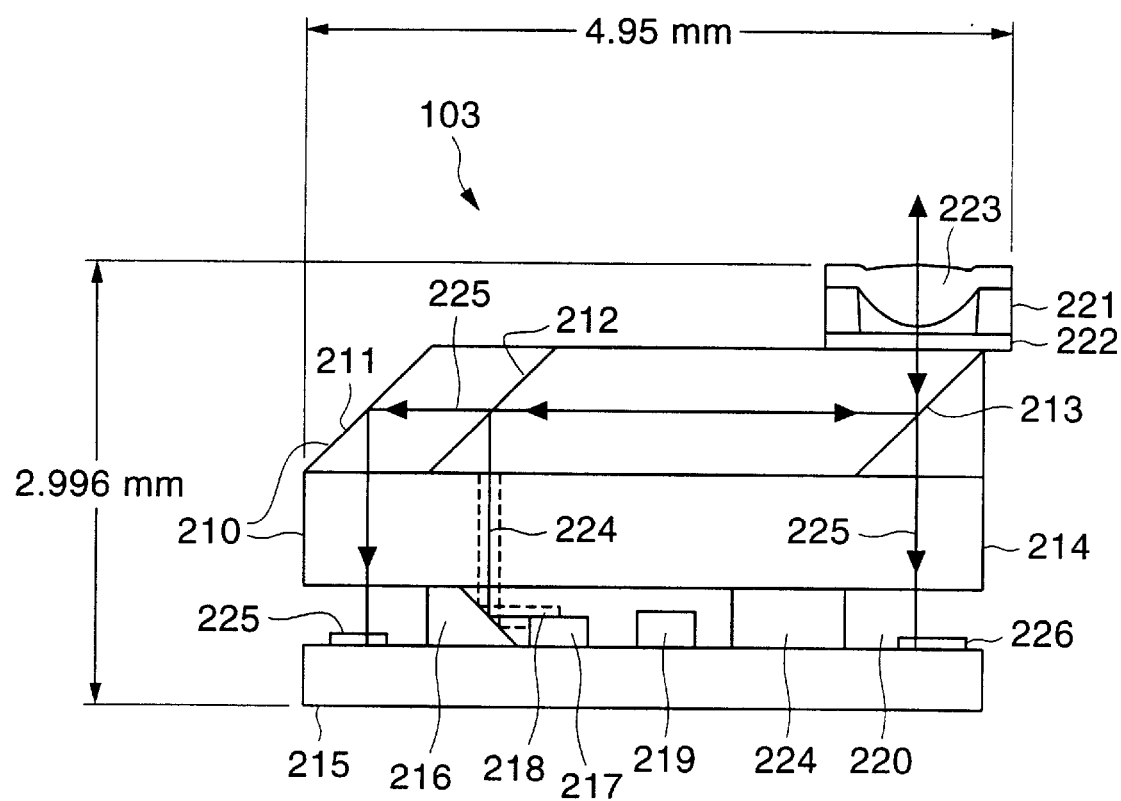
FIG. 2b shows an embodiment of the optical pick-up unit that can be utilized with the optical drive shown in FIG. 1.
Figure 2C:
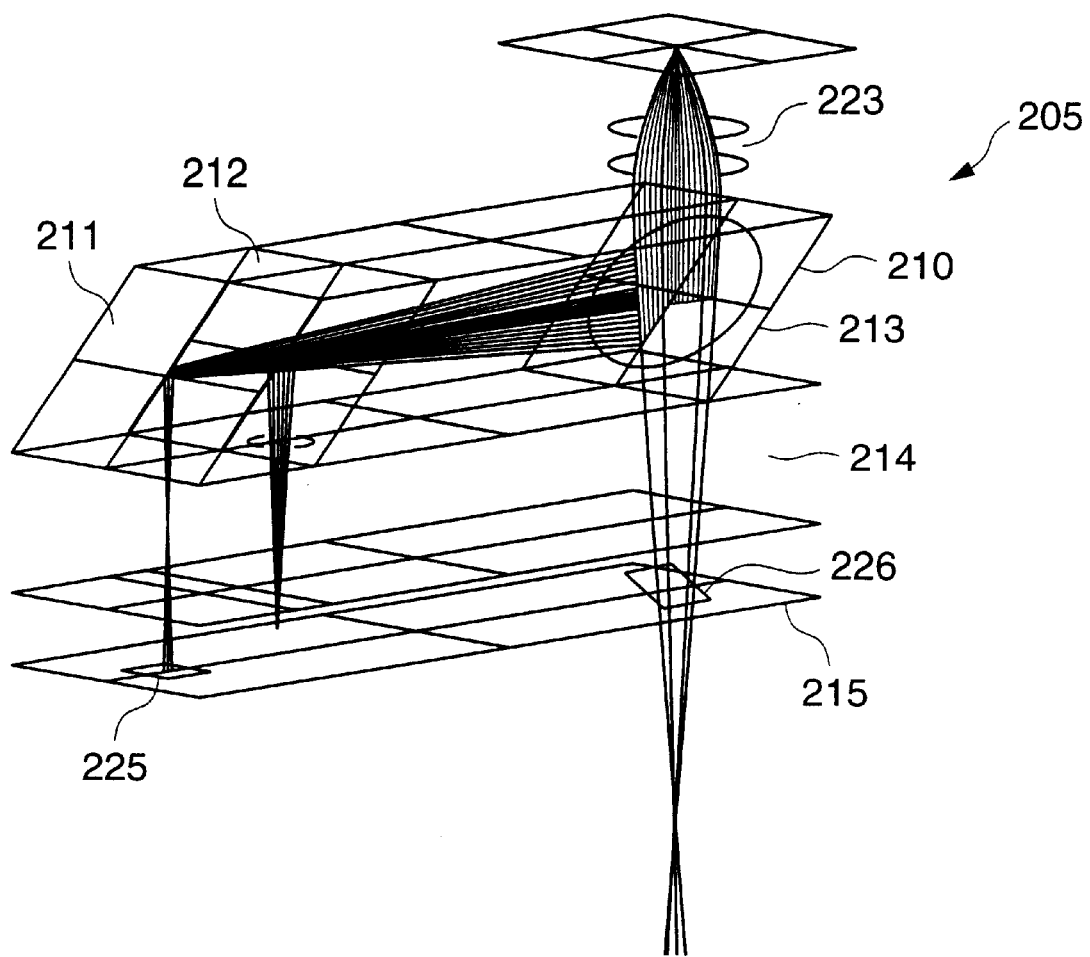
FIG. 2c illustrates the optical path through the optical head of FIG. 2b.

FIGS. 2b and 2c show an embodiment of OPU 103. OPU 103 of FIG. 2b includes a periscope 210 having reflecting surfaces 211, 212, and 213. Periscope 210 is mounted on a transparent optical block 214. Object lens 223 is positioned on spacers 221 and mounted onto quarter wave plate (QWP) 222 which is mounted on periscope 210. Periscope 210 is, in turn, mounted onto turning mirror 216 and spacer 224, which are mounted on a silicon submount 215. A laser 218 is mounted on a laser mount 217 and positioned on silicon submount 215. Further, detectors 225 and 226 are positioned and mounted on silicon substrate 215. In some embodiments, a high frequency oscillator (HFO) 219 can be mounted next to laser 218 on silicon submount 215 to provide modulation for the laser beam output of laser 218.

Laser 218 produces an optical beam 224 which is reflected into transparent block 210 by turning mirror 216. Beam 224 is then reflected by reflection surfaces 212 and 213 into lens 223 and onto optical medium 102 (see FIG. 1). In some embodiments, reflection surfaces 212 and 213 can be polarization dependent and can be tuned to reflect substantially all of the light from laser 218. QWP 222 rotates the polarization of laser beam 224.

The reflected beam 230 from optical medium 102 is collected by lens 223 and focused into periscope 210. A portion (in some embodiments about 50%) of reflected beam 230 passes through reflecting surface 213 and is directed onto optical detector 226. Further, a portion of reflected beam 230 passes through reflecting surface 212 and is reflected onto detector 225 by reflecting surface 211.

Because of the difference in path distance between the positions of detectors 225 and 226, detector 226 is positioned before the focal point of lens 223 and detector 225 is positioned after the focal point of lens 223, as is shown in the optical ray diagram of FIG. 2c.

Figure 2D:
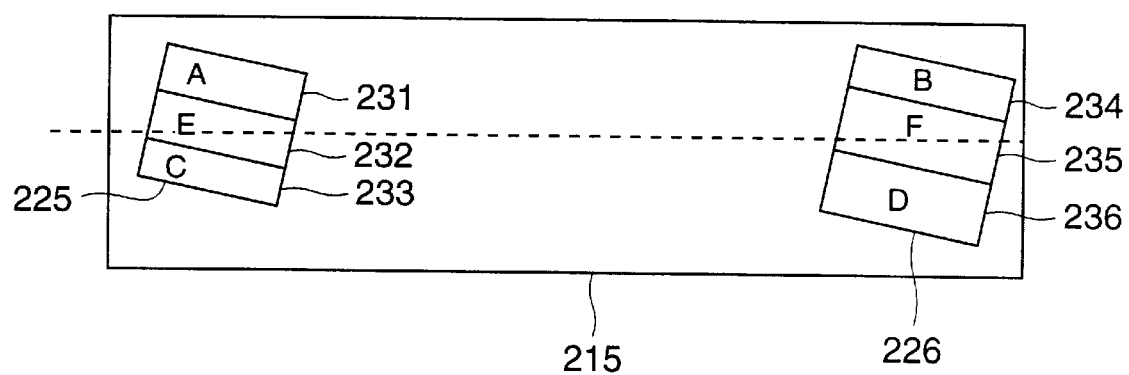
FIG. 2d shows an embodiment of optical detector positioning of the optical pick-up of FIG. 2b.

FIG. 2d shows an embodiment of detectors 225 and 226 in accordance with the present invention. Detector 225 includes an array of optical detectors 231, 232, and 233 positioned on a mount 215. Each individual detector, detectors 231, 232, and 233, is electrically coupled to provide signals A, E and C to controller 106. Detector 226 also includes an array of detectors, detectors 234, 235 and 236, which provide signals B, F, and D, respectively, to controller 106. In some embodiments, center detectors 232 and 235, providing signals E and F, respectively, are arranged to approximately optically align with the tracks of optical media 102 as actuator arm 104 is rotated across optical media 102.

The degree of focus, then, can be determined by measuring the difference between the sum of signals A and C and the center signal E of detector 225 and the difference between the sum of signals B and D and the center signal F of detector 226. A tracking monitor can be provided by monitoring the difference between signals A and C of detector 225 and the difference between signals B and D of detector 226. Embodiments of OPU 103 are further described in application Ser. No. 09/540,657 for "Low Profile Optical Head," herein incorporated by reference in its entirety.

Embodiments of drive 100 (FIG. 1) present a multitude of control system challenges over conventional optical disk drive systems. A conventional optical disk drive system, for example, performs a two-stage tracking operation by moving the optics and focusing lens radially across the disk on a track and performs a two-stage focusing operation by moving a focusing lens relative to the disk. Actuators 201 and 206 of actuator arm 104 provide a single stage of operation which, nonetheless in some embodiments, performs with the same performance as conventional drives with conventional optical media. Further, conventional optical disk drive systems are much larger than some embodiments of drive 100. Some major differences include the actuator positioning of actuator arm 104, which operates in a rotary fashion around spindle 200 for tracking and with a flexure action around axis 204 for focus. Further, the speed of rotation of spindle driver 101 is dependent on the track position of actuator arm 104. Additionally, the characteristics of signals AR, BR, CR, DR, ER, and FR received from OPU 103 differ with respect to whether OPU 103 is positioned over a pre-mastered portion of optical media 102 or a writeable portion of optical media 102. Finally, signals AR, BR, CR, DR, ER, and FR may differ between a read operation and a write operation.

It may generally be expected that moving to a lightweight structural design from the heavier and bulkier conventional designs, such as is illustrated with actuator arm 104, for example, may reduce many problems involving structural resonances. Typically, mechanical resonances scale with size so that the resonant frequency increases when the size is decreased. Further, focus actuation and tracking actuation in actuator arm 104 are more strongly cross-coupled in actuator arm 104, whereas in conventional designs the actuator and tracking actuation is more orthogonal and therefore more decoupled. Further, since all of the optics in drive 100 are concentrated at OPU 103, a larger amount of optical cross-coupling between tracking and focus measurements can be experienced. Therefore, servo system 120 has to push the bandwidth of the servo system as hard as possible so that no mechanical resonances in actuator arm 104 are excited while not responding erroneously to mechanical and optical cross couplings. Furthermore, due to the lowered bandwidth available in drive 100, non-linearities in system response can be more severe. Further, since drive 100 and optical media 102 are smaller and less structurally exact, variations in operation between drives and between various different optical media can complicate control operations on drive 100.

One of the major challenges faced by servo system 120 of control system 106, then, include operating at lower bandwidth with large amounts of cross coupling and nonlinear system responses from operating closer to the bandwidth, and significant variation between optical media and between different optical drives. Additionally, the performance of drive 100 should match or exceed that of conventional CD or DVD drives in terms of track densities and data densities. Additionally, drive 100 needs to maintain compatibility with other similar drives so that optical media 102 can be removed from drive 100 and read or written to by another similar drive.

Most conventional servo systems are analog servos. In an analog environment, the servo system is limited with the constraints of analog calculations. Control system 106, however, can include substantially a digital servo system. A digital servo system, such as servo system 120, has a higher capability in executing solutions to problems of system control. A full digital servo system is limited only by the designer's ability to write code and in the memory storage available in which to store data and code. Embodiments of servo system 120, then, can operate in the harsher control environment presented by disk drive 100 and are capable of higher versatility towards upgrading servo system 120 and for refinement of servo system 120 compared to conventional systems.

Further requirements for drive 100 include error recovery procedures. Embodiments of drive 100 which have a small form factor can be utilized in portable packages and are therefore subject to severe mechanical shocks and temperature changes, all of which affect the ability to extract data (e.g., music data) from optical media 102 reliably or, in some cases, write reliably to optical media 102. Overall error recovery and control system 106 is discussed below, while tracking, focus, seek, and calibration processes are discussed in the application entitled "Tracking, Focus, and Seek Functions with Calibration Processes in a Servo System for an Optical Disk Drive".

Control System Signal Processing Overview

Figure 3:
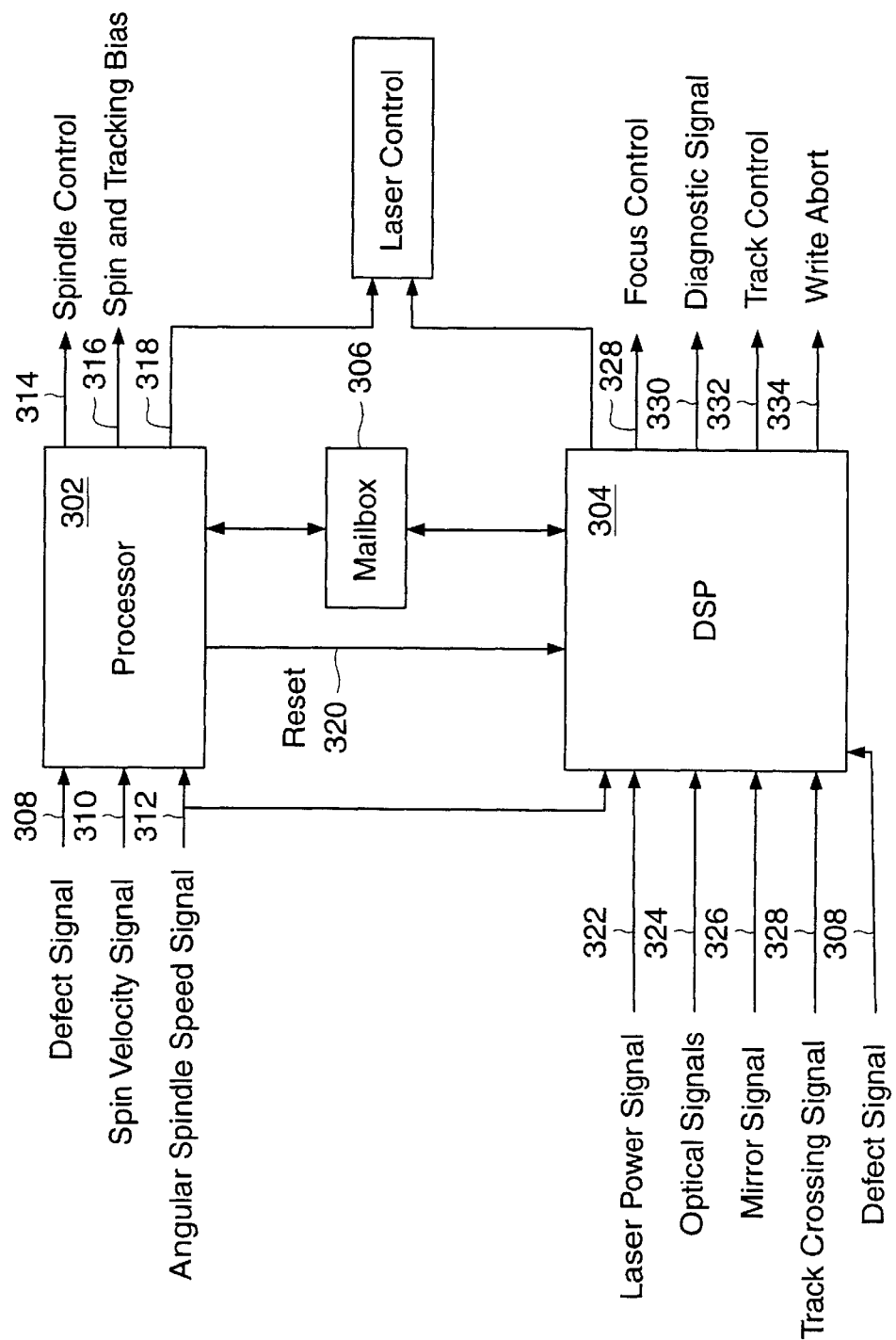
FIG. 3 is a block diagram of components for processing signals in a disc drive control system in accordance with the present invention.

Referring now to FIG. 3, a block diagram of components included in a system for processing signals in a disc drive control system is shown including processor 302, digital signal processor (DSP) 304, and mailbox 306. Processor 302 performs diagnostic and other non-time critical functions, while DSP 304 performs functions that are time critical. Processor 302 and DSP 304 can be co-located on the same chip and, in one embodiment, can communicate via mailbox 306. In other embodiments, processor 302 and DSP 304 can communicate via other suitable means such as a data bus, serial interface, or shared, dual-ported memory. ST Microelectronics model number 34-00003-03 is an example of a microprocessor chip that is suitable for use as processor 302 and DSP 304.

DSP 304 can be slaved to processor 302, which performs overall control functions along with calibration and error recovery functions. DSP 304 includes instructions for controlling the focus and tracking at a very high sample speed, and it also generates high order compensation signals. Processor 302 takes over control when errors are detected and components in the servo system 120 (FIG. 1a) need to be adjusted or operation is to be discontinued. Processor 302 issues commands to DSP 304 via mailbox 306, and DSP 304 uses mailbox 306 to provide information to processor 302 regarding how well it is performing the requested functions.

In one embodiment, processor 302 receives defect signal 308, spin velocity signal 310, and angular spin speed signal 312, and outputs spin control signal 314, spin and tracking bias signal 316, and laser control signal 318. Processor 302 also outputs reset signal 320 to reinitialize DSP 304. DSP 304 receives angular spin speed signal 312, laser power signal 322, optical signals 324, mirror signal 326, track crossing signal 328, and defect signal 308. Output signals from DSP 304 include focus control signal 328, diagnostic signal 330, track control signal 332, and write abort signal 334.

In one embodiment, mailbox 306 utilizes interrupts to interface with DSP 304 and processor 302. In one implementation, a fixed number of mailbox interrupts are available, and each mail box interrupt can be assigned to communicate a certain message. In other implementations, the message communicated by a mailbox interrupt can vary, and a variable number of mailbox interrupts can be available. (In another implementation, an interrupt can be generated by the DSP 304 whenever it writes to one of its mailbox registers.) FIGS. 3a through 3g show examples of mailbox messages that can be communicated between processor 302 and DSP 304 via mailbox 306.

FIG. 3a shows examples of messages in processor write/ DSP read mailbox 340 with sixteen slots for outgoing messages from processor 302 to DSP 304. In one embodiment, these registers can be read or written by the processor 302, but they can only be read by the DSP 304. The first three mailbox messages are DSP control registers, as defined in FIGS. 3b through 3d. Each of the three control registers include sixteen bits that can be set or cleared to control focus, track, and seek functions, to provide signal and trace addresses, compensation parameters, and on/off switches for read/write components such as the laser. Examples of other messages in mailbox 340 include acceleration parameters, offset and shift values for focus and track gain parameters, sensor threshold detection values, and crosstalk compensation.

FIG. 3e shows examples of messages in processor read/ DSP write mailbox 342 with sixteen slots for messages from DSP 304 to processor 302. The messages are used to convey information regarding focus, track, and seek errors. In one embodiment, these registers can be read or written by the DSP 304 but they can only be read by the processor 302. Write mailbox 342 includes one or more status registers with bits that can be set to convey the status of focus, track, and seek operations as shown, for example, in FIGS. 3f and 3g.

Note that other messages and registers can be included in addition to, or instead of, the messages and registers shown in FIGS. 3a through 3g.

Referring now to FIG. 4, a diagram of one embodiment of code components included in processor 302 is shown. The code components represent sets of instructions that can be implemented in software, firmware, hardware, or a combination of software, firmware and hardware, as known in the art. In one embodiment, the components can include servo thread 404, real-time operating system (RTOS) 406, heartbeat interrupt 408, DSP status mailbox interrupt handler 410, spin control interrupts 412, and utility threads 414 that include read/write thread 416, asynchronous input/output (async I/O) thread 418, diagnostic thread 420, timer thread 422, interface thread 424, and file system manager 426.

Heartbeat interrupt 408 executes periodically at a variable rate, for example, a rate of 20 Hz during sleep mode to a rate of 0.5 KHz during exercise mode. The rates to be used for different modes can be determined based on the processing load, the frequencies associated with the servo, and the processing capacity of processor 302. The heartbeat interrupt 408 includes: a focus state machine to control the performance of the focus servo such as closing and opening focus; a tracking state machine to control the performance of the tracking servo such as turning tracking on/off and seeking; a spin state machine to control the performance of the spin servo such as turning spin on and off; a physical sector addresses (PSA) state machine to manage the reading of physical sector addresses; a performance monitoring state machine to request a performance event or adjust drive parameters if poor performance is detected; a power management state machine to transition between the various power states of the drive; a monitor laser state machine to coordinate the laser power with drive mode of operation; an adjust gains state machine to load the best focus and tracking gains based on the position of the actuator arm 104; and a load/eject state machine to manage the loading and unloading of a cartridge containing optical media 102.

DSP 304 issues messages that can include data and/or DSP status information to mailbox 306. DSP status mailbox interrupt handler 410 receives DSP status information and can request a notify event or a tracking event to RTOS 406, as required. The data and status information from mailbox 306 can be accessed by servo thread 404 and heartbeat interrupt 408.

The command handler in servo thread 404 initiates actions for performing different types of commands, including data transfer commands associated with reading from and writing to media 102 (FIG. 1a), and diagnostic commands for verifying the functionality of drive 100 (FIG. 1a) during engineering development, as well as during operation by a user. FIGS. 4a through 4p show examples of data transfer and diagnostic commands that can be implemented in servo system 120 (FIG. 1a). Diagnostic commands can be included to control spin speed, test and calibrate various components, open and close track and focus, turn various components on and off, set gain, offset, and compensation parameters, and error recovery. Data transfer commands can be included to seek, spin up, spin down, load/eject a media cartridge, and calibrate servo system 120. The data transfer and diagnostic commands can include one or more parameters, as shown in FIGS. 4a through 4p. Note that other commands can be included in addition, or instead of, the commands shown in FIGS. 4a through 4p.

The event handler in servo thread 404 facilitates communication between code components in processor 302. In one embodiment, real-time operating system (RTOS) 406 issues servo events to the event handler. One servo event is the notify event which can be issued to RTOS 406 by a servo periodic heart beat interrupt 408 or the DSP status mailbox interrupt handler 410. A notify event issued by the DSP status mailbox interrupt handler 410 indicates that although no command is currently active, an error has been detected that requires attention. A notify event can be issued by the heartbeat interrupt 408 to indicate whether a command could be completed.

As an example of how notify event requests issued by DSP status mailbox interrupt handler 410 can be handled, assume drive 100 (FIG. 1a) is tracking and focus is closed when a shock, such as knocking drive 100, causes loss of focus. The DSP 304 includes code to compensate for tracking and focus errors, and to determine whether focus or tracking have been lost. When the DSP 304 detects lost focus, one or more DSP status registers, such as Bit 5 in the DSP status register shown in FIG. 3f, in mailbox 306 are set accordingly. The mailbox 306 sends the DSP status message to DSP status mailbox interrupt handler 410, which issues a request for a notify event to RTOS 406. The RTOS 406 issues a notify event to alert the servo thread 404. The event handler in servo thread 404 then issues one or more commands to heartbeat interrupt 408 and mailbox 306 to take appropriate action, such as attempting to re-close focus.

RTOS 406 can issue a command waiting event to indicate that a command has been issued to servo thread 404 to perform a drive function, such as spinning up the drive 100 (FIG. 1a). Another event is a switches event to indicate that the cartridge containing optical media 102 (FIG. 1a) is being inserted or ejected from drive 100. RTOS 406 can also issue spin, focus, and tracking events to servo thread 404 in response to requests for spin, focus, and tracking events issued by their respective state machines in heartbeat interrupt component 408. Such event requests are typically issued in response to completing, or failing to complete, a command.

As an example of how a spin, focus or tracking event can be handled, assume one of the utility threads 414 issues a servo command message to the RTOS 406, and the RTOS 406 issues a command waiting event to the servo thread 404. The command handler in servo thread 404 subsequently issues a control command to the heartbeat interrupt 408. When the heartbeat interrupt 408 completes the command, it requests an event corresponding to the command, such as a spin, focus, or tracking event, from RTOS 406. The RTOS 406 generates the requested event and sends it to the servo thread 404. A servo command status is then sent from servo thread 404 to the corresponding utility thread 414.

Heartbeat interrupt 408 also includes a recovery state machine. In one implementation, the recovery state machine advantageously enables commands to be resumed where they left off after a problem has been detected and corrected. For example, if a problem with closing focus is detected while a read command is being processed, the recovery state machine saves the current state of the drive 100 (FIG. 1a), corrects the focus problem, clears error indications, and restores the state of drive 100 to resume the read command where it left off.

In one embodiment, the functions performed by utility threads 414 include the following: Spin Control Interrupts 412 measure the current spindle speed, determine the correct spindle speed based on current track position, and calculate the control signals to maintain a constant speed or to change spindle speeds; Read/Write Thread 416 manages the reading of data from the disk and the writing of data to the disk; Async I/O Thread 418 is utilized primarily in engineering testing to manage the transfer of data from a user data input device, such as a keyboard, over an interface to the drive 100; Diagnostic Thread 420 executes diagnostic commands, which are used primarily during engineering testing; Timer Thread 422 provides timing utilities used by the other threads; Interface Thread 424 manages the communication and data transfer between the drive and the host; and File System 426 manages the organization of data on the optical disc 102 (FIG. 1a).

Servo Thread

Figure 5:
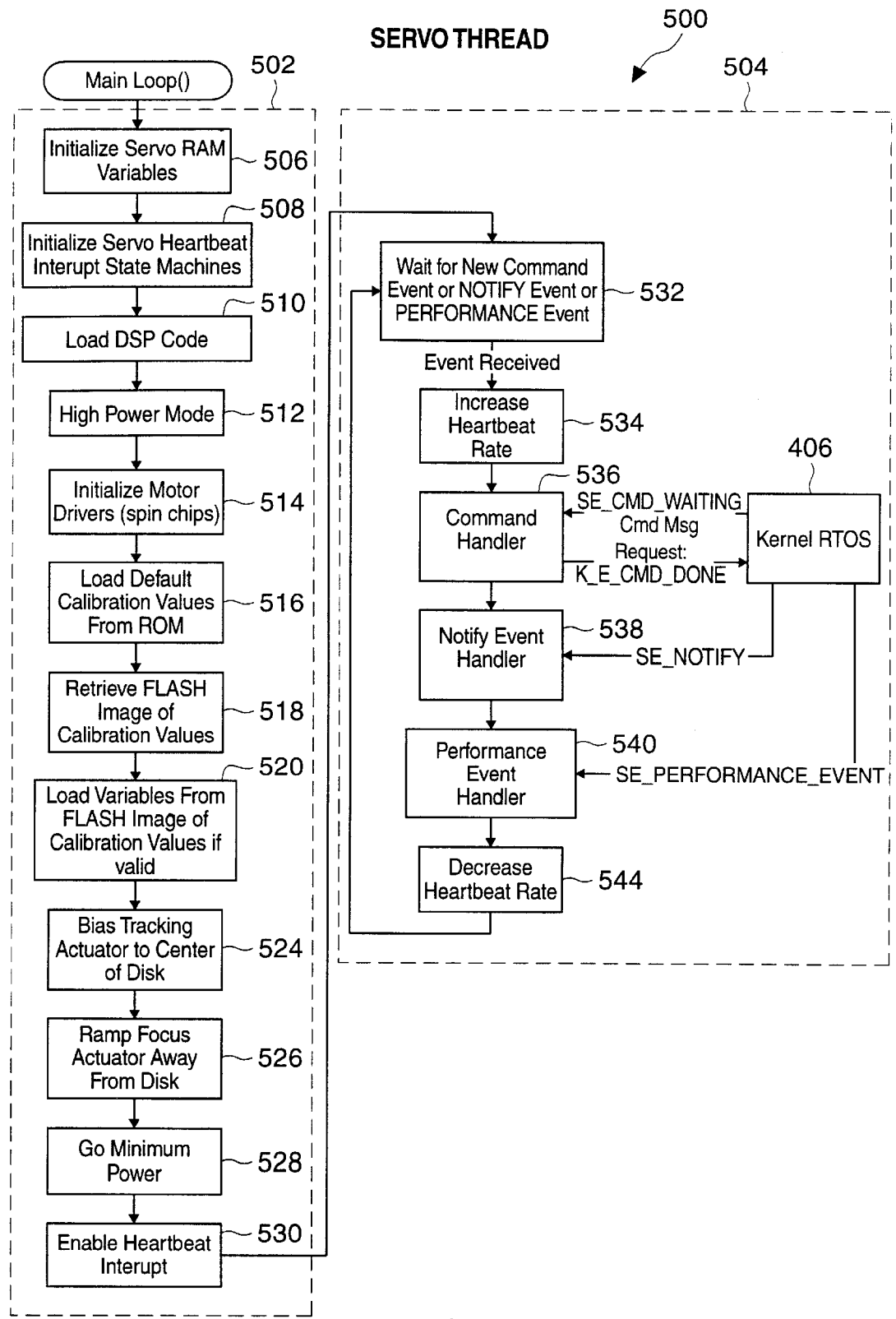
FIG. 5 shows a block diagram of an embodiment of the servo thread shown in FIG. 4.

Referring now to FIGS. 3, 4, and 5, an embodiment of main loop 500 in servo thread 404 is shown including an initialization path 502 and a continuous path 504. Initialization path 502 includes process 506 to initialize servo random access memory (RAM) variables, and process 508 to initialize the frame rate of the heartbeat interrupt 408 based on a clock (not shown) in processor 302.

Processor 302 can include different power modes such as sleep mode (low power consumption), high power mode, and operating mode. In one implementation, processor 302 loads program code into DSP 304 every time power is turned on in process 510 and then enters high power mode in process 512. In other embodiments, program code in DSP 304 can be preloaded, and/or implemented in firmware or in hardware circuitry, eliminating the need for process 510.

Initialization path 502 can also include process 514 to initialize processing components associated with a spin motor driver for spin motor 101 in servo system 120 (FIG. 1a) as further described in The Spin Motor Servo System disclosures.

Initialization path 502 can also include processes 516, 518, and 520 to retrieve and load calibration values. Two or more different sets of calibration values may be available, including values that were set during manufacture, values that were in use before the last power down, as well as updated values that are generated during power up. Alternatives for determining which set, or combination of sets, of calibration values to use are described in The Servo System Calibration disclosures.

Initialization path 502 can also include processes 524 and 526 to initialize the actuator arm 104 (FIG. 1a) to the center of the optical media 102 (FIG. 1a) and move the OPU 103 (FIG. 1a) to a position away from media 102. Process 528 places servo system 120 (FIG. 1a) in a minimum power mode to conserve power while drive 100 is in idle mode. Process 530 enables heartbeat interrupt 408 and transfers control to continuous path 504.

In one embodiment, process 532 in continuous path 504 stays idle until a new event is received, such as a command event, a notify event due to an error that has been detected, or a performance event due to a problem with performing a command. In one implementation, process 532 can release processor 302 for use by other processing tasks until an event is received.

When process 532 does receive an event, process 534 can increase the heartbeat rate. For example, if process 532 was waiting with a slow "resting" heartbeat rate of 20 Hz, the "exercise" heartbeat rate can be increased to 0.5 KHz. Depending on whether a command event, a notify event, or a performance event was received, the RTOS 406 can issue the event to servo thread 404 (FIG. 4), which subsequently invokes the corresponding handler, i.e., command handler 536, event handler 538, or performance event handler 540.

Once the actions associated with the event have been executed, process 544 reduces the heartbeat rate and suspends execution of main loop 504 by returning control to process 532 until another event is received. Servo thread 404 can release processor 302 when it is waiting for a command or event, thereby preserving bandwidth of processor 302 for use by other components in drive 100 (FIG. 1a).

Command Handler

Figure 6A:
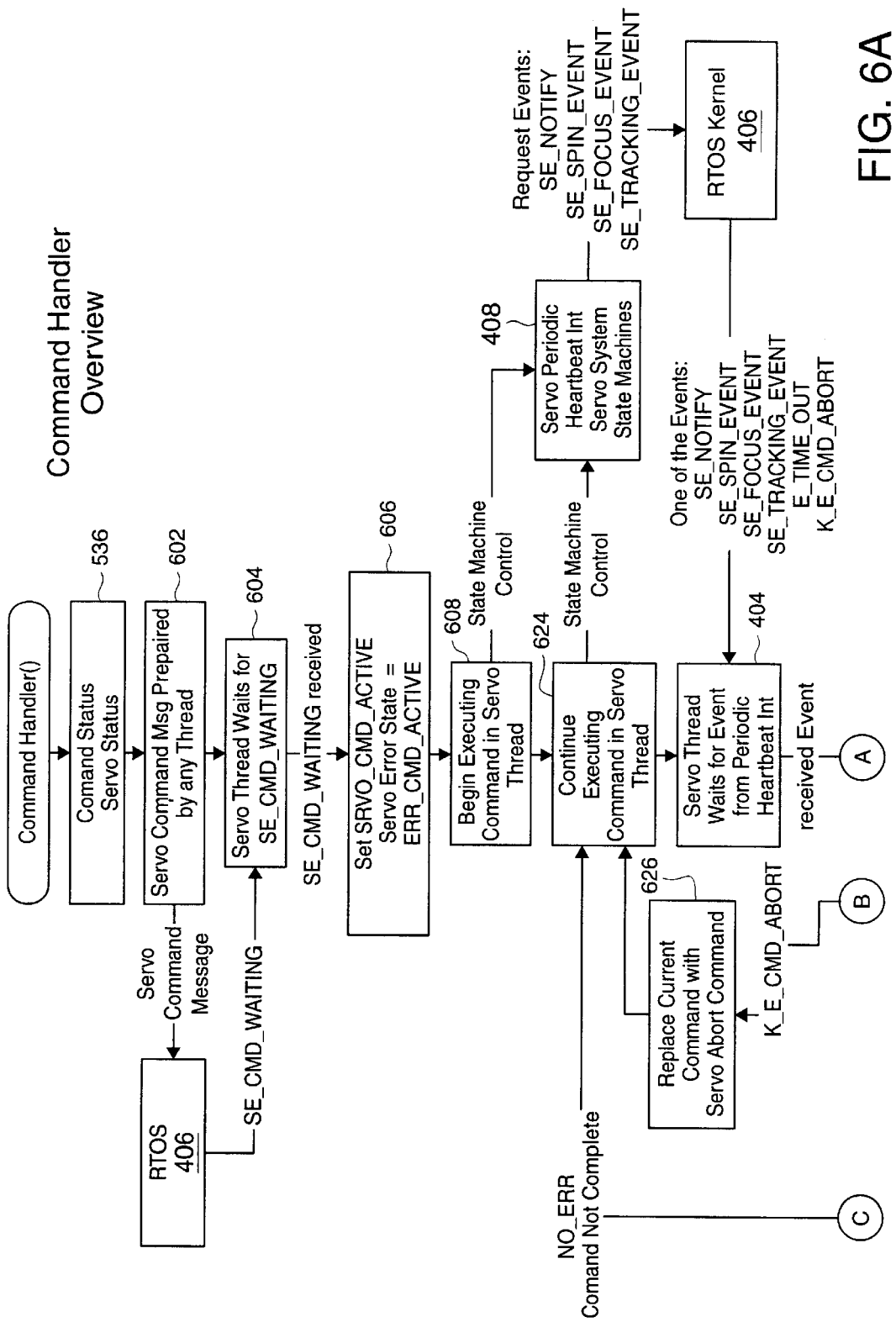
FIG. 6 shows a block diagram of an embodiment of the command handler shown in FIG. 5.
Figure 6B:
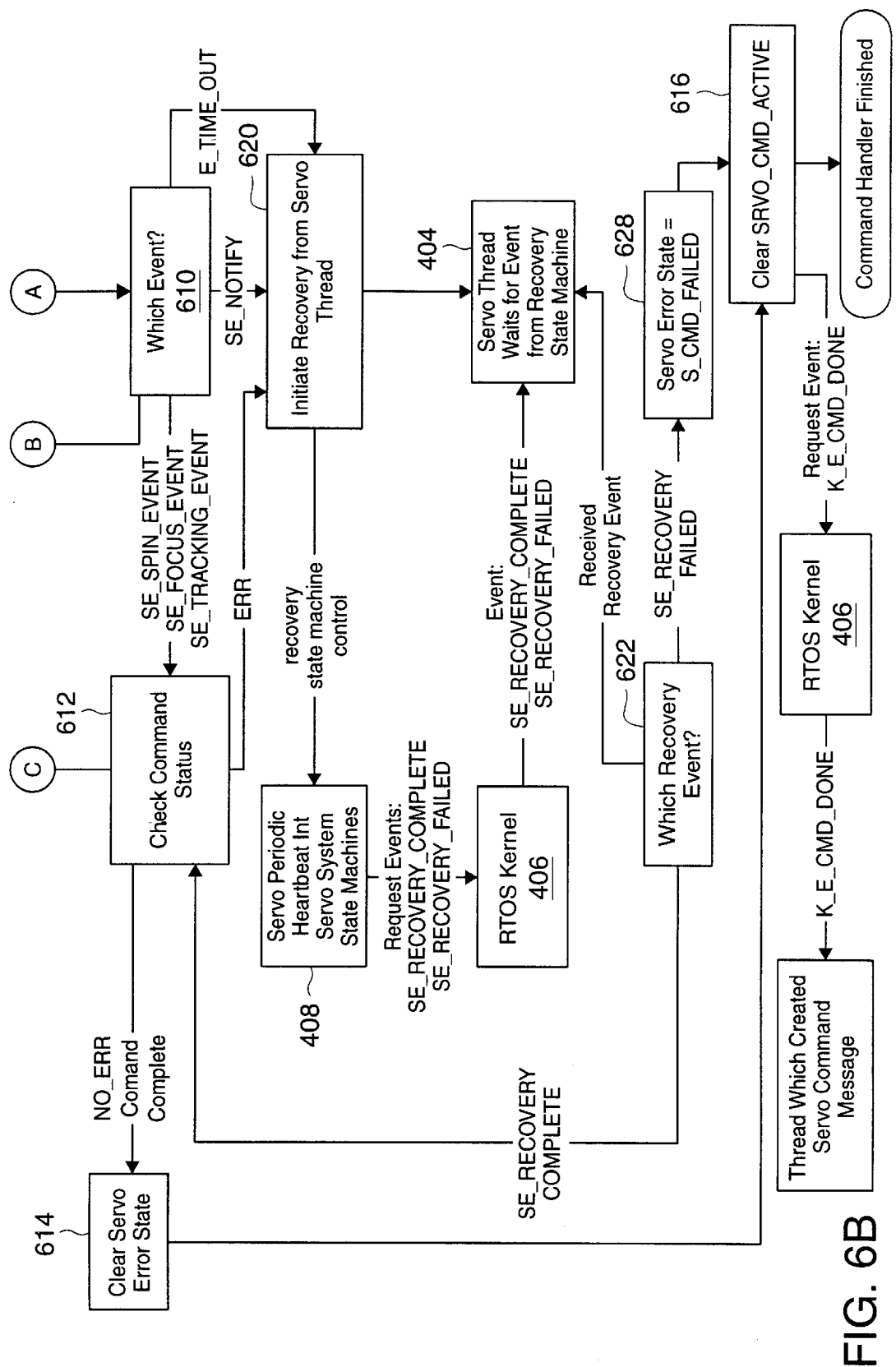

FIG. 6 shows an example of processes that can be included in one embodiment of command handler 536. Referring to FIGS. 4 and 6, during each pass of command handler 536, a command status and servo system status message is sent to utility threads 414. The utility threads 414 determine the actions to be performed, and transmit servo command messages to RTOS 406 as required, as indicated by process 602. RTOS 406 issues a command waiting event to servo thread 404, which waits for the event in process 604. When the command waiting event is received, process 606 sets a servo command active and a servo error state flag to indicate that a command is being processed.

The first pass through command handler 536, process 608 begins executing the command in servo thread 404 by issuing a state machine control message to the state machines in heartbeat interrupt 408. Heartbeat interrupt 408 issues an event request to RTOS 406, and servo thread 404 waits for the event from RTOS 406. Command handler 536 then determines which event was received in process 610. If the event was a spin, focus, or tracking event, process 612 checks the command status. If the command was completed with no errors, processes 614 and 616 clear the servo error state flag and the servo command active flag, respectively, and a command done event is requested from RTOS 406. RTOS 406 issues the command done event to the utility thread 414 that issued the command message.

Referring again to process 610, if a notify or a time-out event is received while a command is being processed, process 620 initiates recovery for the notify event by transferring control to the recovery state machine in heartbeat interrupt 408. The functions performed by the recovery state machine are described hereinbelow. The recovery state machine issues event requests to communicate whether the recovery attempt is complete, or whether it failed to RTOS 406.

RTOS 406 issues a recovery event indicating whether recovery completed or failed to servo thread 404. Servo thread 404 waits for either a recovery complete or recovery failed event and then transfers control to process 622. If recovery completed, process 622 transmits the recovery complete message to process 612. If the command was not completed after recovery, process 612 transfers control to process 624, which continues executing the command that was being processed when the notify event was received. Referring back to process 622, if the recovery process failed, process 628 sets the servo error state to indicate that the command failed, and process 616 clears the servo command active flag before control is transferred out of command handler 536.

Figures 2, 4:
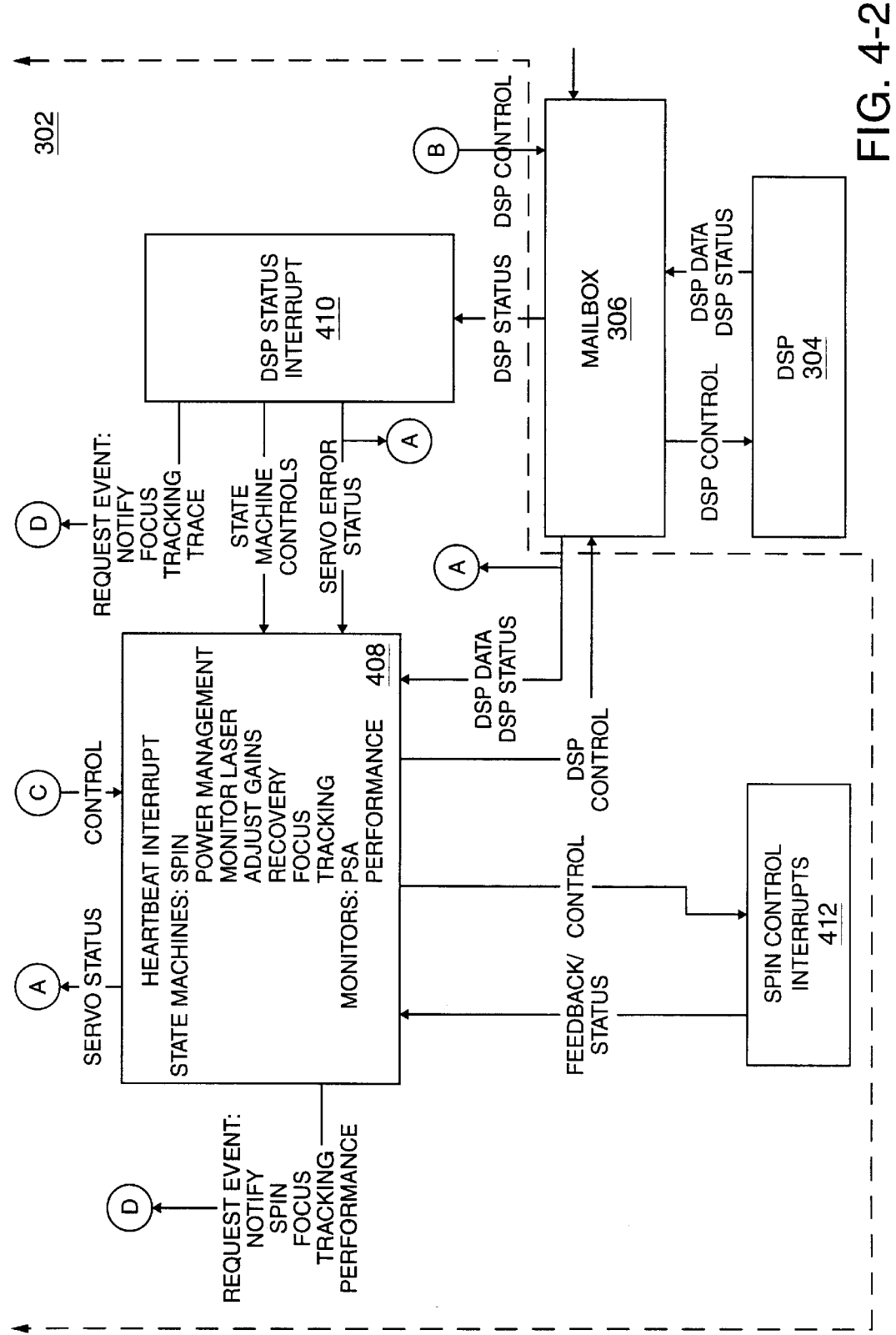

Referring again to process 610, if a command abort event is received, process 626 replaces the command currently being processed with an abort command, and transfers control to process 624. The abort command executes in the servo thread 404. One of the first actions performed is to turn the tracking servo off. Servo thread 404 changes the state of the tracking state machine executing in the heartbeat interrupt 408 and then waits for a tracking event. The tracking state machine completes a sequence of operations to open the tracking servo loop, as further discussed hereinbelow. When the tracking servo loop opens, the tracking state machine requests the RTOS 406 to issue a tracking event. The RTOS generates the tracking event, which is received by the abort command executing in the servo thread 404. After the tracking loop opens, the servo thread 404, heartbeat interrupt 408 and RTOS 406 coordinate efforts, in a fashion similar to that used to open the tracking loop, to open the focus loop. Once the focus loop opens, the laser 218 (FIG. 2) is shut off. Next, the servo thread 404, heartbeat interrupt 408, and RTOS 406 again coordinate efforts to open the spin loop.

Event Handler

Figure 7A:
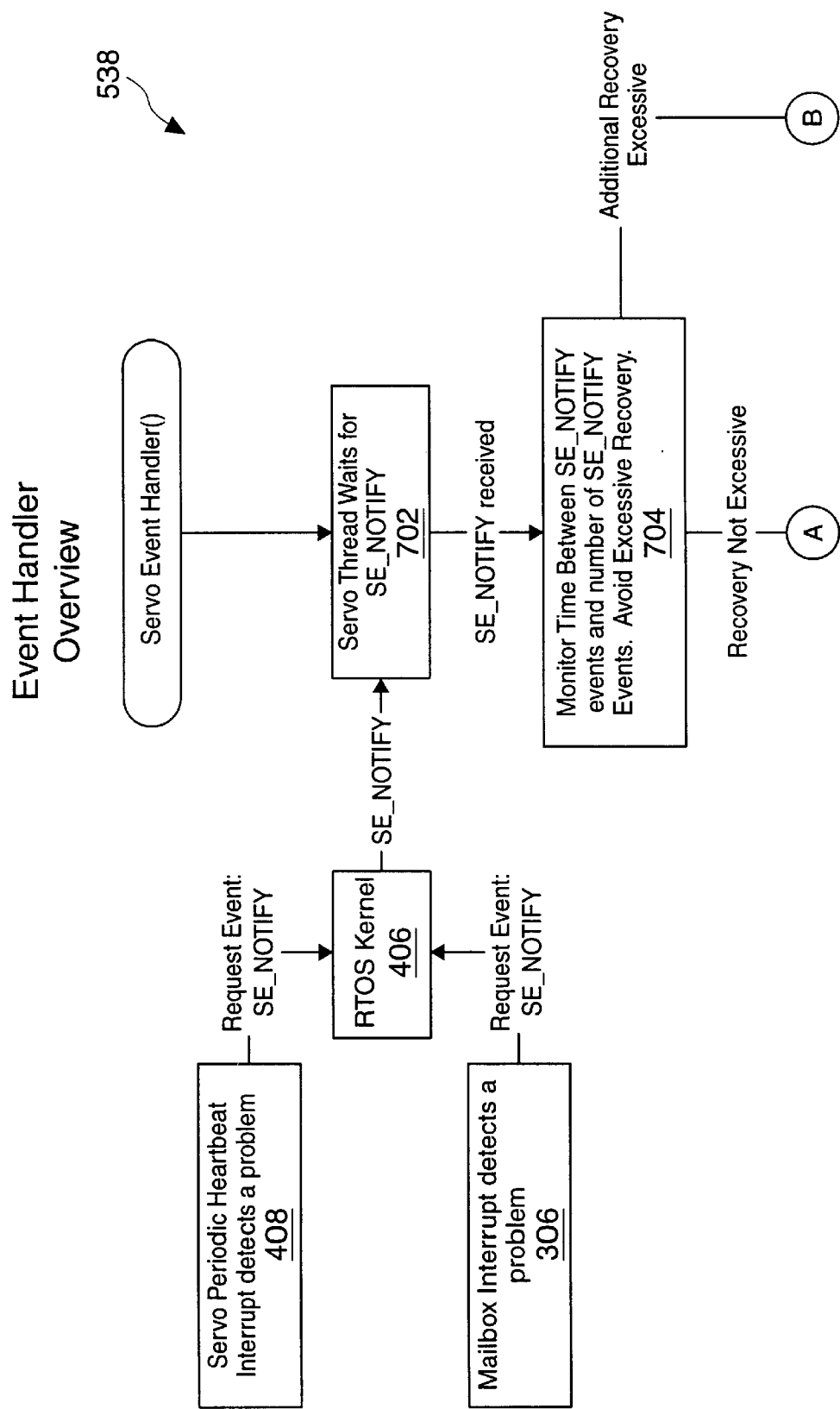
FIG. 7 shows a block diagram of an embodiment of the event handler shown in FIG. 5.
Figure 7B:
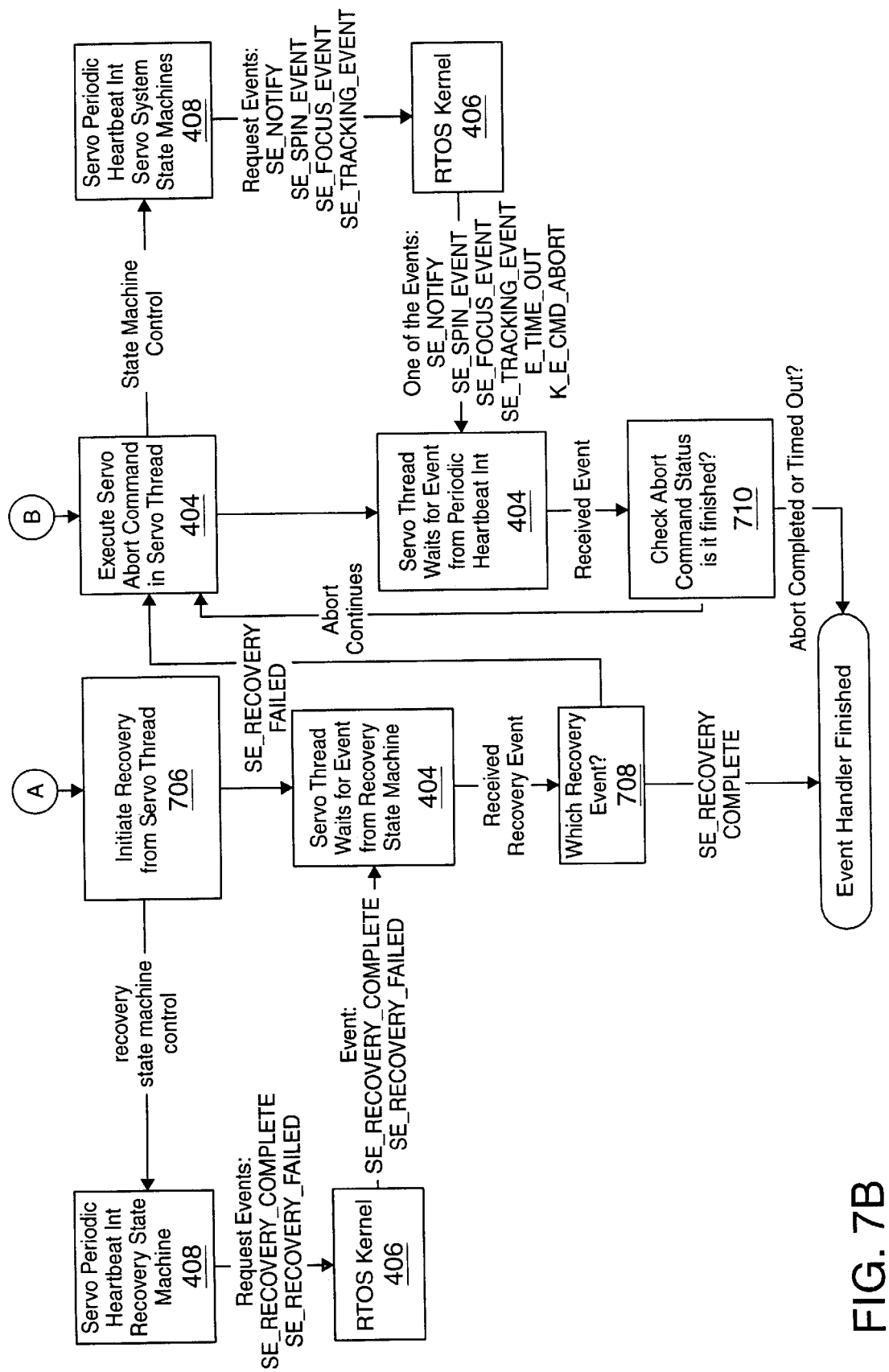

FIG. 7 shows an embodiment of event handler 538 that is executed by servo thread 404 when a notify event is received in process 702. In one embodiment, requests for notify events are issued by heartbeat interrupt 408 and mailbox interrupt 306 when a problem or error is detected. RTOS 406 then issues the notify event to servo thread 404. In one embodiment, process 704 monitors the time between the notify events and the number of notify events in order to avoid excessive recovery. The parameters for determining when a recovery attempts become excessive can be set based on a number of different criteria, such as number of recovery attempts within a predetermined time period. For example, five recovery attempts within five seconds can be considered excessive in one embodiment, while other parameters and values can be used in other embodiments.

If the recovery is not excessive, process 706 initiates recovery for the notify event by transferring control to the recovery state machine in heartbeat interrupt 408. The functions performed by the recovery state machine are described hereinbelow. The recovery state machine issues event requests to communicate whether the recovery attempt is complete, or whether it failed, to RTOS 406.

RTOS 406 issues a notify event indicating whether recovery completed or failed to servo thread 404. Process 708 directs control based on which event is received. If recovery completed, the event handler is finished, and process 708 returns control to servo thread 404. If the recovery attempt failed, process 708 transfers control to servo thread 404, which processes an abort command. Note that the abort command in servo thread 404 can also be executed if additional recovery would be excessive. In one embodiment, servo thread 404 issues a state machine control message to heartbeat interrupt 408. Heartbeat interrupt 408 requests the first of a series events, such as a notify event, to RTOS 406. RTOS 406 issues the requested event to servo thread 404, and process 710 determines whether the abort command processing is complete.

In one embodiment, processing an abort command includes heartbeat interrupt 408 issuing a series of event requests including the notify event request described above, a spin event request, a focus event request, and a tracking event request. The event requests are issued by the state machines in heartbeat interrupt 408 when they finish tasks associated with the abort command, such as turning off track, focus, and spin. The event requests can also be issued by DSP status mailbox interrupt handler 410 when the DSP 304 detects a problem with the operation of drive 100. Other event requests, such as turning off power to the laser 218 (FIG. 2b), can also be implemented. These event requests can be issued sequentially, or one or more events can be issued simultaneously, depending on the capability of RTOS 406 to process event requests in parallel or as a batch. For each event request, RTOS 406 issues a corresponding event to servo thread 404. As each event, or group of events is received, process 710 determines whether the abort command processing is complete, or whether the time allowed to process the abort command has been exceeded. When the abort command processing is complete, or the abort command times out before it is complete, the event handler 538 is finished, and control returns to servo thread 404.

Performance Event Handler

Figure 8:
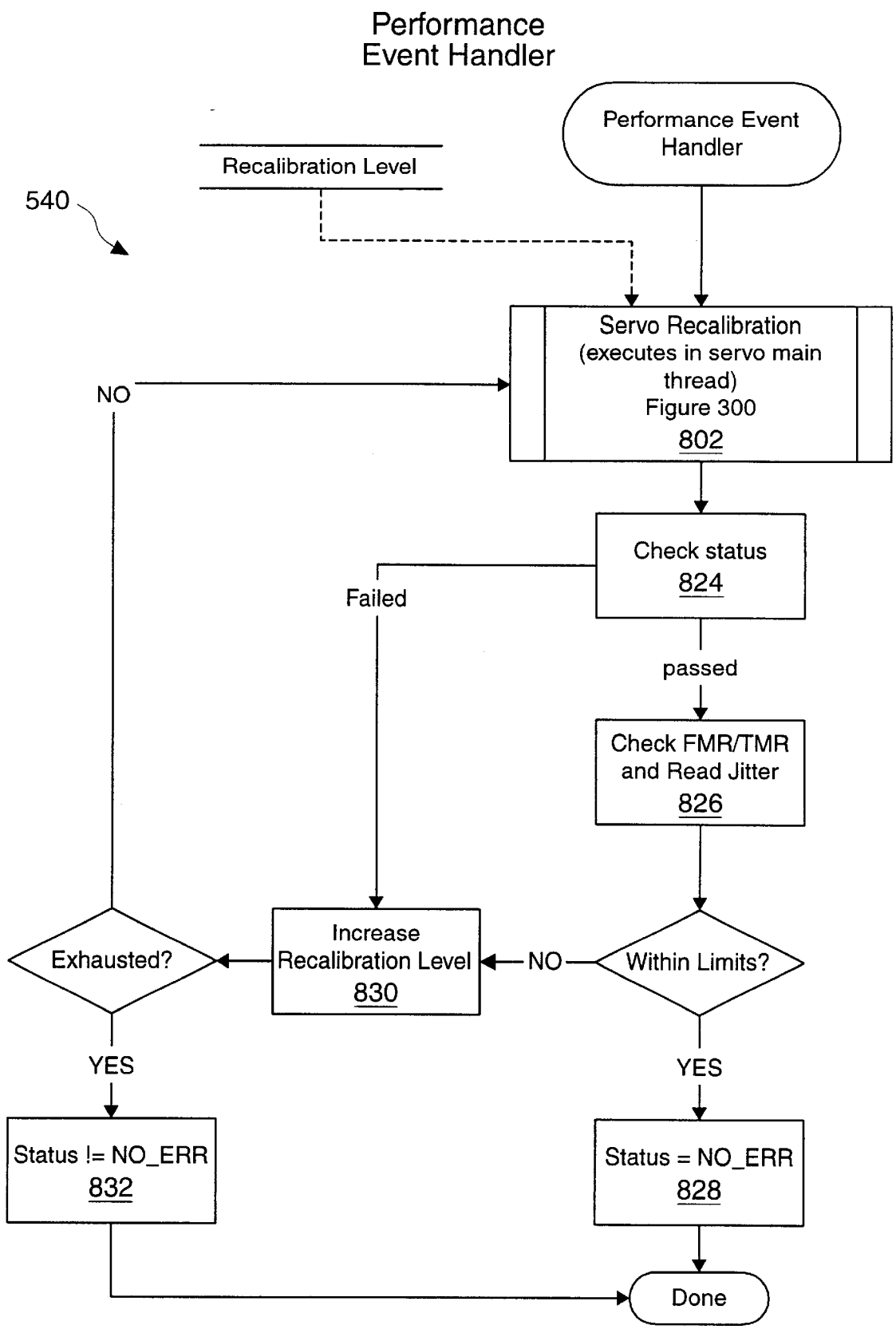
FIG. 8 shows a block diagram of an embodiment of the performance event handler shown in FIG. 5.

FIG. 8 shows an embodiment of performance event handler 540 which is invoked when a performance event is sent to servo thread 404 (FIG. 4). A performance event occurs when one of the state machines in heartbeat interrupt 408 (FIG. 4) detect a problem or error that may be corrected by recalibrating drive 100 (FIG. 1a). For example, if drive 100 (FIG. 1a) was initially powered on and calibrated indoors in an environment with a warm ambient temperature, and then used outside in a cold ambient temperature, the calibration values being used may not be optimal for the colder environment. Several different levels of recalibration processes can be performed depending on the severity of the error, ranging from relatively low level of effort, to more complex processes requiring greater effort.

Figure 8A:
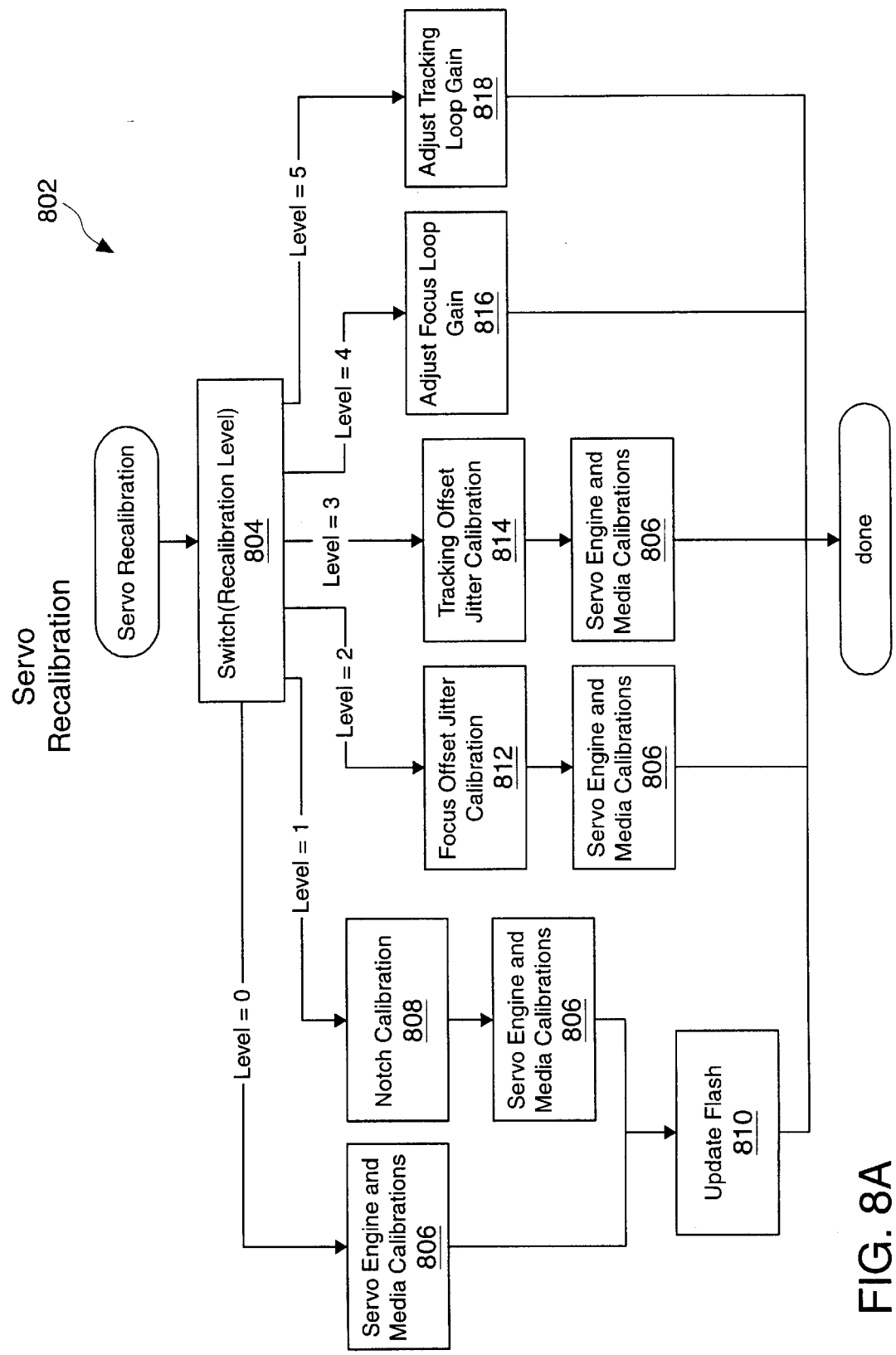
FIG. 8a shows a block diagram of an embodiment of the servo recalibration process as shown in FIG. 8.

FIG. 8a shows one implementation of servo recalibration process 802 that includes 6 different recalibration levels. Increased effort is undertaken to correct the detected error at each increasing recalibration level. The recalibration processes are further described in The Servo System Calibration disclosures. Switch 804 branches to the current recalibration level. Level 0 performs servo engine and media calibration processes 806. If the error was not sufficiently corrected at level 0, level 1 performs notch calibration process 808 and then performs servo engine and media calibration processes 806 using the new values for the notch filter. Update flash process 810 is performed at the end of both level 0 and level 1 recalibration to update current calibration values, or add another set of calibrations values that may be factored in with another set of calibration values.

Level 2 recalibration includes performing focus offset jitter calibration process 812 to correct focus problems, followed by servo engine and media calibration processes 806. Level 3 performs tracking offset jitter calibration process 814 to correct tracking errors, followed by servo engine and media calibration processes 806. Level 4 performs adjust focus loop gain process 816, and level 5 performs adjust tracking loop gain process 818. Levels 4 and 5 can include adjusting the gain to achieve a particular crossover frequency. In one implementation, the loop gain is measured by injecting a fixed frequency and amplitude input signal into the closed loop and measuring the amplitude of the loop's response at the same frequency. The ratio of the loop's response over the injected amplitude is the loop gain. This technique of adjusting loop gain can affect the stability margins of drive 100 (FIG. 1a).

The servo engine calibration values include all values required to calibrate drive 100. The media calibration values are a subset of the servo engine calibration values, which include only those parameters which vary as different pieces of media are inserted into the drive. The calibrated values include: OPU 103 (FIG. 1a) offsets and gains, focus closed threshold, focus sensor gain and offset, tracking sensor gain and offset, focus loop gain, tracking loop gain, notch locations, sensor crosstalk gain, focus sensor linearization, and tracking sensor linearization. The media calibrations include: focus sensor gain and offset, and tracking sensor gain and offset.

In one embodiment, the loop gain is measured by injecting a fixed frequency and amplitude input signal into the closed loop and measuring the amplitude of the loop's response at the same frequency. A digital summer is created in the DSP 304 to sum the input sinewave signal with the output of a compensator. The output of the digital summer is converted from a digital to an analog signal. The ratio of the output of the compensator over the output of the digital summer is the total open loop gain. This ratio should be 1.0 if the frequency of the disturbance is at the desired crossover frequency and the gains are correct, as further described in The Servo System Calibration disclosures.

Referring again to FIG. 8, process 824 checks the value of a status indicator returned by servo recalibration process 802. If the calibration was successful, then process 826 monitors whether focus misregistration (FMR), track misregistration (TMR), and read jitter are within predetermined limits. If FMR, TMR, and read jitter are within limits, then a status variable is set to indicate "no errors" in process 828 and control is returned to servo thread 404 (FIG. 4). If FMR, TMR, and read jitter are not within limits, or if process 824 returns a failed status, then process 830 adjusts the recalibration level to increase the effort to correct the problem. If all of the levels available have not been attempted, then control transfers to process 802 to perform the next level of recalibration. If all of the recalibration levels available have been attempted, then the status variable is set to indicate that an error is still present in process 832 and control transfers back to servo thread 404.

Heartbeat Interrupt

Referring now to FIG. 9, a flow diagram of processes that can be included in heartbeat interrupt 408 is shown. In the embodiment shown, the time between heartbeat interrupts 408 is a variable that can be set and passed to heartbeat interrupt 408 according to a particular application or implementation of drive 100 (FIG. 1a). In other embodiments, the time allowed can be fixed to a particular value. Process 902 disables further interrupts so that the interrupt last received from servo thread 404 (FIG. 4) can be processed. The interrupt counter is updated by a delta time value to create a timing clock used by the state machines that are implemented in the heartbeat interrupt 408. The delta time value can be set to any increment desired, such as a value that corresponds to the rate of the heartbeat, in process 903. Process 904 reads the DSP status register, such as shown in FIG. 3f, to determine the status of the DSP 304 (FIG. 3).

In one embodiment, heartbeat interrupt 408 invokes a set of state machines that manage various time-critical functions in heartbeat interrupt 408. The embodiment shown in FIG. 9 includes power mode state machine 910, recovery manager 912, tracking/seeking control state machine 914, focus control state machine 916, spin control state machine 918, monitor PSA state machine 920, laser control state machine 922, adjust gains state machine 924, performance monitor state machine 926, and monitor load/eject process 928. These processes are executed once every pass through heartbeat interrupt 408. Process 930 exits the current interrupt and re-enables interrupts once the processes in the heartbeat interrupt 408 are complete.

In other implementations, other processes can be included to perform functions in addition to, or instead of, the processes shown in FIG. 9. Further, one or more of the processes can be executed at different frame rates relative to other processes.

Monitor Power Mode

Figure 10A:
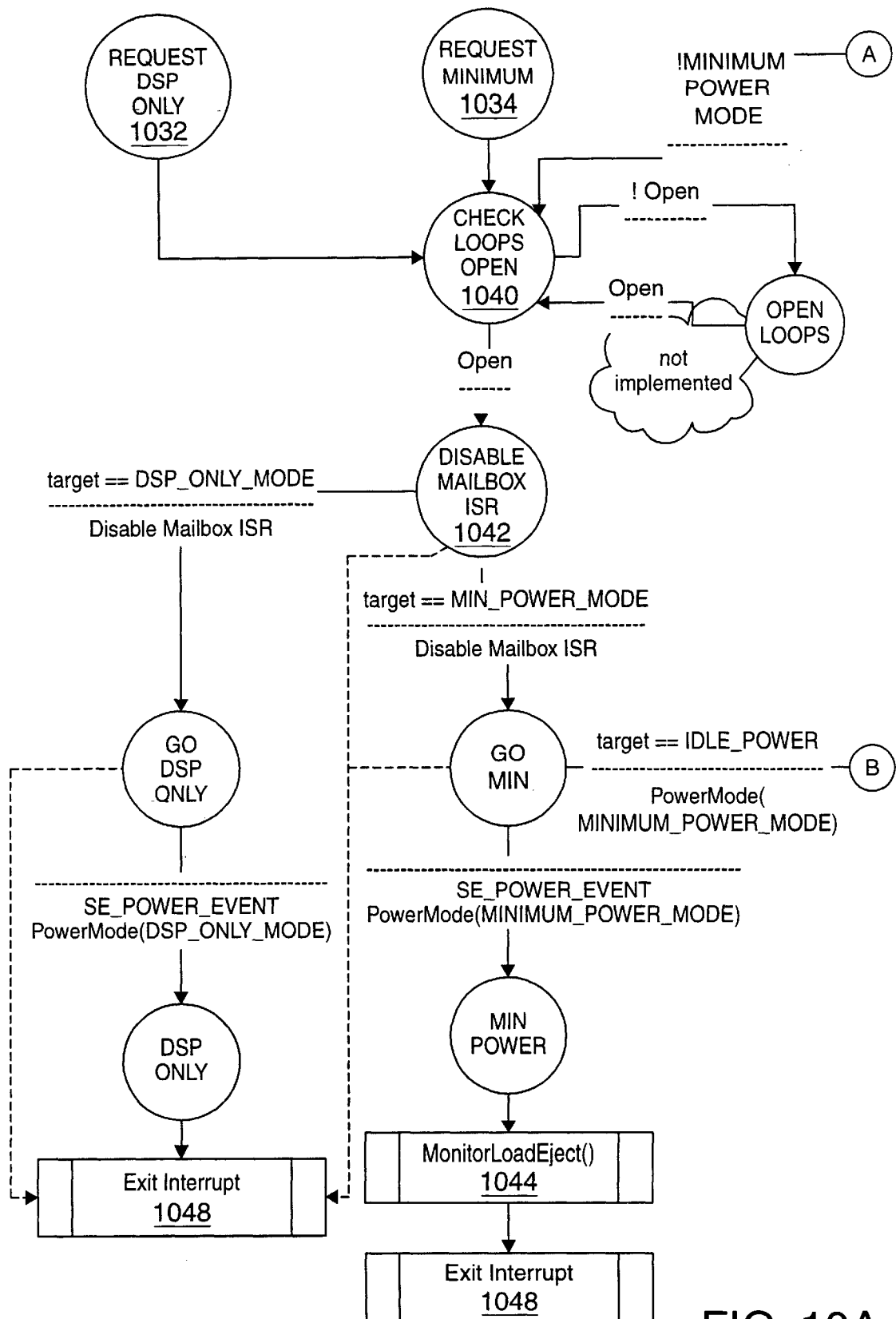
FIG. 10 shows a block diagram of an embodiment of the power mode control state machine shown in FIG. 9.
Figure 10B:
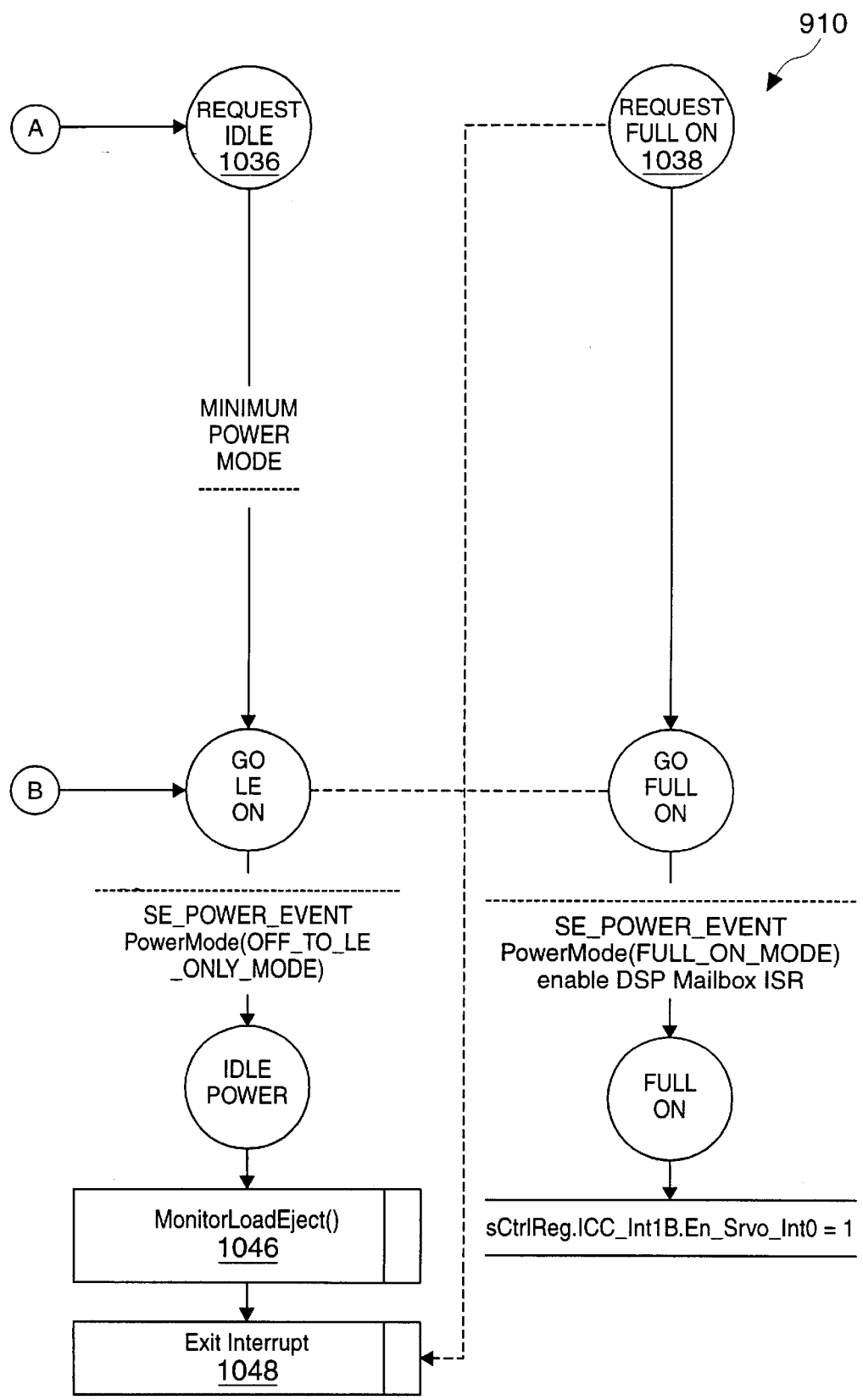

Processor 302 (FIG. 3) can function in different power modes such as sleep mode (low power consumption), high power mode, and operating mode. FIG. 10 shows one example of a state machine representing processes performed by power mode state machine 910 that includes a request digital signal processor (DSP) only mode 1032, a request minimum power mode 1034, a request idle power mode 1036, and a request full power mode 1038.

In the request DSP only mode 1032 and request minimum power mode 1034, process 1040 determines whether any loops are open or closed. A request to change power modes can originate from the servo thread 404, the heartbeat interrupt 408 or any of the utility threads 414. Ideally, a power mode other than high power mode would not be requested while the servo tracking, focus or spindle loops are closed. Process 1040 determines whether any servo loops are closed and coordinates opening the loops before continuing to the requested power mode. Once all loops are open, process 1042 disables the mailbox interrupt service routine, which is further described hereinbelow in the discussion of FIG. 21.

The power mode is then set to DSP only in the request DSP only mode 1032, and to minimum power in the request minimum power mode 1034. Note that process 1044 continues to monitor load/eject switches in the minimum power mode 1034. Process 1048 function which is called at the end of any interrupt. When the power mode reaches DSP_ONLY, MIN_POWER or IDLE_POWER, there is no need to execute all the state machines in the heartbeat interrupt 408. To bypass the execution of these state machines, we use the K_OS_Intrp_Exit function to end the heartbeat interrupt after executing the Monitor Power Mode state machine.

When the power state is minimum power (MIN POWER) mode, the power state can transition to the idle mode. In the MIN POWER mode, the drive 100 detects if a cartridge is present to be loaded or if a cartridge eject has been requested. The power mode transitions to the idle mode to perform the load or eject operation. The monitor load/eject process 928 initiates the REQUEST IDLE process 1036. Process 1046 continues to monitor load/eject switches in the idle power mode.

When full power is requested, the request full power mode 1038 re-enables the mailbox interrupt routine and sets the power to full on.

Recovery

FIG. 11 shows an overview flow diagram of functions performed by one embodiment of recovery manager 912 that can be implemented to recover from problems with focus, tracking, or spin. The current drive state is stored in process 1104 based on parameters supplied by servo thread 404, heartbeat interrupt 408, and DSP status mailbox interrupt handler 410. This allows the state of the drive 100 (FIG. 1a) to be restored to resume processing any commands at the point where they were interrupted when the problem was detected.

Process 1106 classifies the problem as a spin, focus, or tracking problem based on error status information supplied by servo thread 404, heartbeat interrupt 408, and DSP status mailbox interrupt handler 410. Once the problem is classified, process 1108 finalizes the state to be restored, which may include determining the command that was interrupted, and storing the information where it can be accessed to restore the interrupted command.

Process 1110 performs clean up before attempting to recover from the problem or error detected in process 1114. The steps performed during the cleanup process can vary depending on the state of the drive 100 (FIG. 1a) when the error was detected. Such clean up can include, for example, managing laser power so that data is not written in an unintended location on the optical media 102 (FIG. 1a).

When an "off disk" condition is detected, process 1112 biases the tracking actuator arm 104 (FIG. 1a) back on to the optical media 102. If the actuator arm 104 does move back on to the optical media 102, then process 1114 restores the previous drive state that was interrupted when the error was detected.

If process 1114 cannot recover from the tracking, focus or spin error, then failed recovery cleanup process 1116 is invoked to perform "cleanup" tasks, such as turning track and/or focus off, depending on the problem. Process 1118 requests a RECOVERY_FAILED event from the RTOS 406 (FIG. 4) to indicate that recovery was attempted, but not achieved.

If recovery was successful, process 1114 issues a notice that the drive state was restored to process 1120, which then clears error bits in mailboxes 306 (FIG. 4) and requests a RECOVERY_COMPLETE event from the RTOS 406.

Figures 2, 11A:
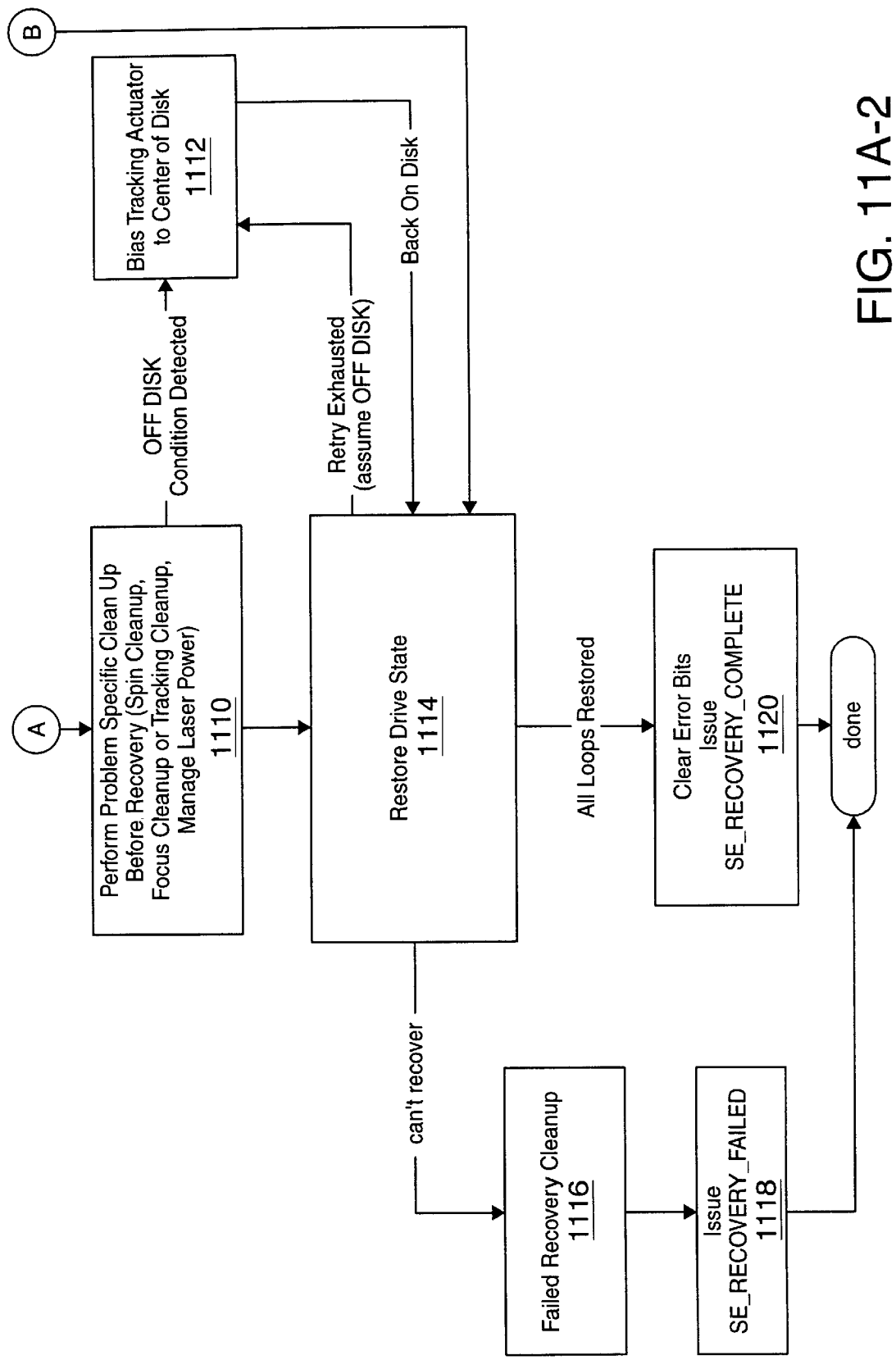
FIG. 11a shows a diagram of an embodiment of a recovery state machine for the recovery manager shown in FIG. 11.
Figures 3, 11A:
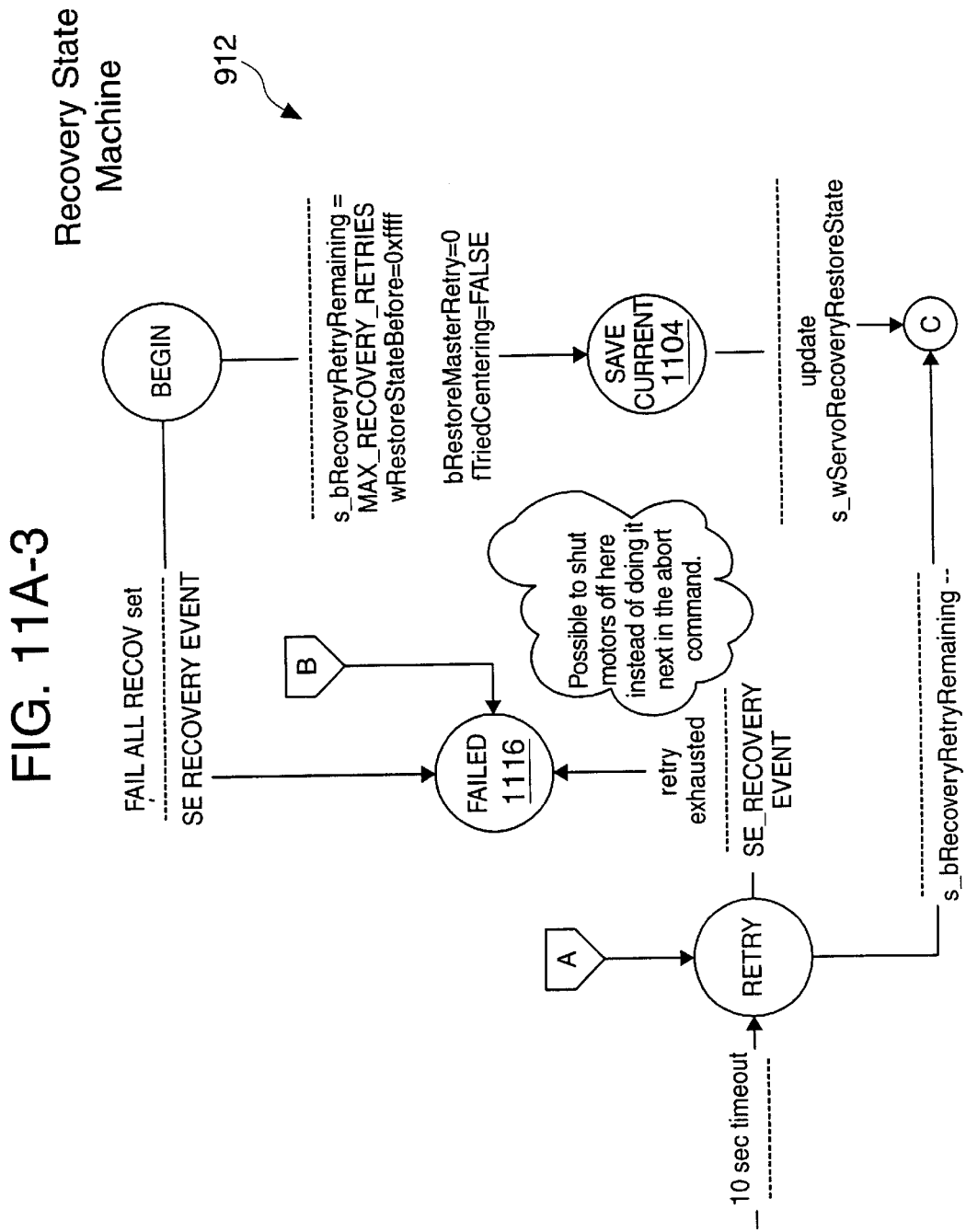
Figures 4, 11A:
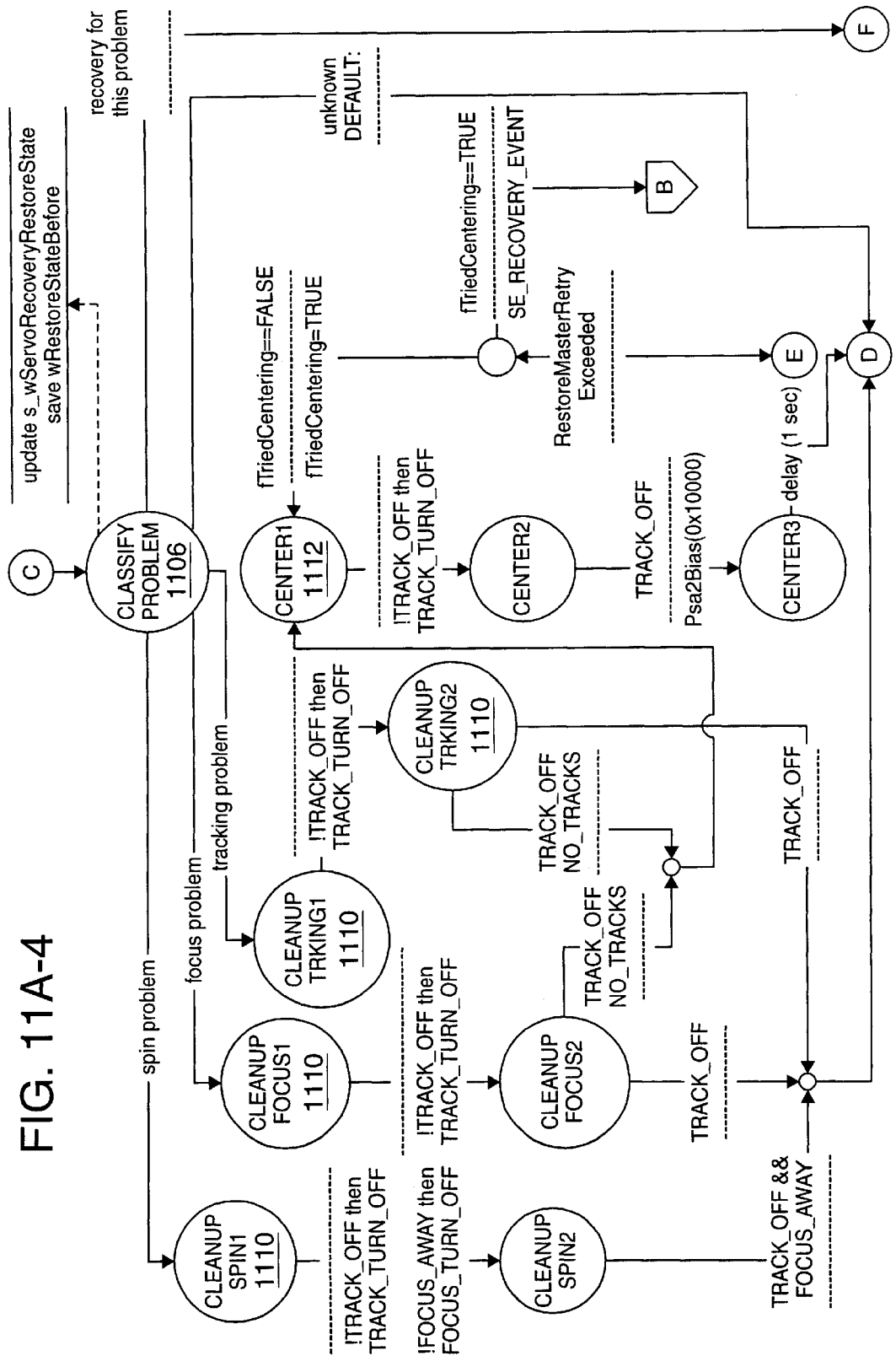
Figures 5, 11A:
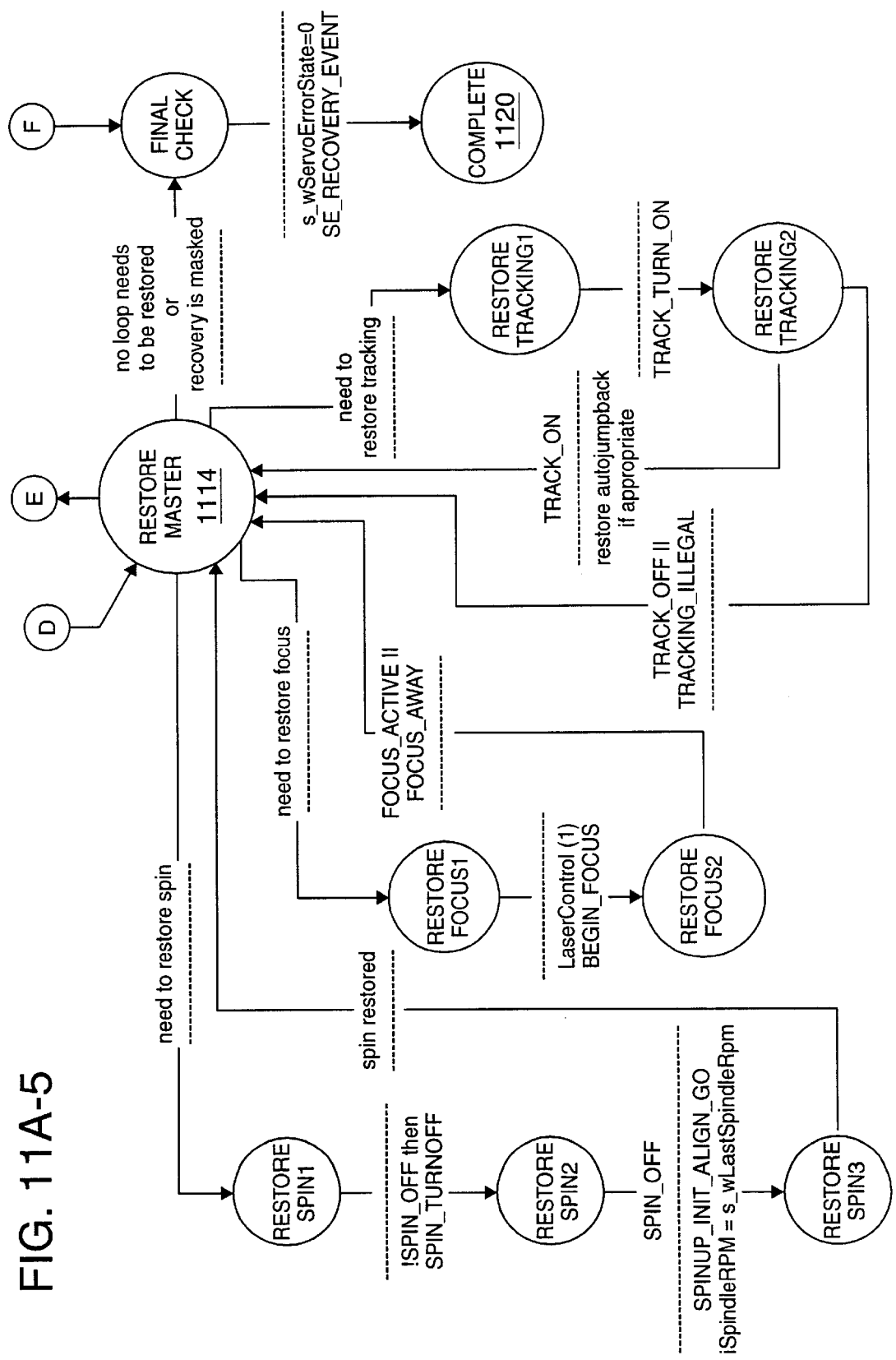

FIG. 11a shows a recovery state machine 912' that corresponds to recovery manager 912. FIG. 11a shows states 1104'–1120' that correspond to processes 1104–1120 in FIG. 11. The criteria shown above dashed lines in FIG. 11a indicate the conditions required to transition to the next state, and the information below the dashed lines indicate the action taken upon transition.

In one embodiment, the following servo error states can be indicated by track, focus, and spin control processes:

Off Disk
Failed Auto Jump
Long Seek Failed
Failed Jump
Calibration Failure
Bad Spin
Bad Track
Bad Focus Caused Track
Bad Focus
Error Failed
Got Notify Event
Timed Out
Aborted In one embodiment, the following recovery restore states can be saved:

Continue long seeks
Continue jumps
Reposition Current Track
Enable Auto Jumpback
Track On
Repeatable Run-Out (RRO) On
Constant Linear Velocity (CLV) Data
Spin On
Focus On

Off Disk Detection

Optical media 102 for drive 100 (FIG. 1a) can be very small and it can be difficult to prevent the OPU 103 from moving off the formatted area of the optical media 102, such as at the innermost or outermost diameter, where there are no tracks. FIGS. 12a–12c show an example of an off disk detection process 1200 for detecting an off disk condition. FIG. 12a shows a diagram of an embodiment of an off format detection manager that is executed as part of the classify problem state 1106' in FIG. 11a.

In FIG. 12a, process 1202 includes detecting track crossings when attempting to close tracking. If the DSP 304 (FIG. 3) does not detect tracking good or tracking bad within a predetermined time period, for example, 500 milliseconds, in process 1204, an off-disk indication is set in process 1206. If the DSP 304 does detect a tracking good condition, process 1210 monitors the tracking control effort (TCE) to determine whether an off disk condition exists.

FIG. 12b shows a diagram of components utilized to perform off format detection for the off format detection manager shown in FIG. 12a. FIG. 12b shows the relationship between the TCE signal and other components in drive 100, specifically, DSP tracking servo 1220 outputs the TCE signal as a feedback signal to tracking/seeking state machine 914, as well as to off disk detection process 1224. The TCE signal is based on the track error signal. The TCE signal can be processed to indicate the level of effort being expended to achieve tracking. A method for generating the TCE signal is further disclosed in The Tracking and Seeking Servo System disclosures.

FIG. 12c shows a diagram of logic to perform off format detection for the off format detection manager shown in FIG. 12a by determining whether the TCE signal indicates an off disk condition. Process 1230 calculates the absolute value of the TCE signal. Process 1232 includes inputting the absolute value of the TCE signal to a filter, such as a low pass filter, to remove high frequency noise. In one embodiment, the cutoff frequency of the low pass filter is 10.6 Hertz, however other cutoff frequencies can be implemented according to the dynamics and frequencies associated with drive 100.

Monitor Tracking/Seeking Servo

FIGS. 13a–13c show an embodiment of tracking/seeking control state machine 914 represented by control state diagrams 1300, 1302, 1304 for monitoring and controlling track functions for drive 100 (FIG. 1a). FIG. 13a pertains to turning track on and off, FIG. 13b pertains to track jumps, and auto jumpback, and FIG. 3c pertains to long seeks.

Referring now to FIG. 13a, when a tracking turn on servo command is received while tracking acquisition state machine 1300 is in the tracking idle state 1306, tracking acquisition state machine 1300 transitions to tracking turn on state 1308. If focus is not on, then tracking acquisition state machine 1300 enters tracking illegal state 1310. If the drive has flash memory which contains valid calibration values for operating over both premastered media and writeable media, the gain measure states 1380 and 1382 are used to determine whether the OPU 103 is currently over the premastered or the grooved areas, and to select the values appropriate for the area of the media.

Before transitioning from track turn on state 1308 to gain measure state 1380, a nominal TES gain and offset are programmed and the DSP 304 (FIG. 3) is configured to measure the peak to peak amplitude of the TES signal. Gain measure state 1380 enables the DSP 304 to begin to measure the TES peak to peak amplitude and then transitions to gain measure state 1382. Gain measure state 1382 allows the DSP 304 a predetermined time period, such as 25 milliseconds, to complete the TES peak to peak amplitude measurement. When the measurement is complete, a decision regarding media area type is made based on the resultant amplitude. A relatively small amplitude indicates that the OPU 103 is currently over premastered media and the values appropriate for premastered media are loaded. A relatively large amplitude indicates that the OPU 103 is currently over an area of writeable media and the values appropriate for writeable media are loaded. Also in gain measure state 1382, the WRITEABLEMEDIA bit (FIG. 3d) of DSP Control Register 3 (FIG. 3a) is set or cleared to tell the DSP 304 what type, or area, of media the OPU 103 is over, as further described in The Tracking and Seeking Servo System disclosures. The tracking acquisition state machine 1300 then transitions from state gain measure state 1382 to enable tracking state 1384.

Referring back to track turn on state 1308, if the drive 100 does not have valid calibration values stored in flash memory, then the gain measure states 1380 and 1382 are not used. Instead, the tracking state machine 1300 transitions directly from track turn on state 1308 to enable tracking state 1384. In enable tracking state 1384, a tracking acquisition process in DSP 304 is invoked as further described in The Tracking and Seeking Servo System disclosures, and tracking wait acquisition state 1312 becomes active for a predetermined time delay period. When the delay period expires, a tracking integrator is enabled in the tracking acquisition process, and tracking wait integrator state 1314 becomes active for a predetermined delay period. When the delay period expires, the state transitions to the tracking wait track error signal (TES) integrity state 1316 for another delay period before entering the tracking status state 1318.

If the tracking status is track_OK, the state transitions to and remains in tracking active state 1320 until a problem with tracking is detected, at which point the state transitions to tracking turn off state 1322. The state then transitions through a series of tracking zero states 1323–1324 to reset control flags and clear variables in the DSP 304 (FIG. 3) associated with tracking before entering tracking off state 1332.

While in the tracking active state 1320, a command to jump a single track or multiple tracks on optical media 102 (FIG. 1*a*) can be issued. Track jumps can be implemented in a number of different ways including jumping two or more at one time, jumping one track each revolution of the optical media 102, and jumping a specified multiple of tracks every specified number of revolutions of optical media 102. The jumps can be in the forward or reverse directions.

In one embodiment, laser power can be reduced to a low power mode from a high power mode while in the tracking active state 1320 during track seeking functions. The laser power mode can also be reduced to the low power mode upon transition to the tracking turn off state 1322.

FIG. 13*b* shows an example of a state chart that can be implemented to control track jumps. When a single track jump command is received, the state transitions from tracking active state 1320 to begin single jump1 state 1332, where variables are set to indicate that it is not safe to read from or write to optical media 102 at this time. The state then transitions to begin single jump2 state 1334, which issues a single track seek control command to DSP 304. When an auto jumpback command is received, the state transitions from tracking active state 1320 to begin auto jumpback state 1333, where variables can be set including parameters to indicate the jump type, the number of tracks to jump, the delay between track jumps, the number of revolutions (spin edge count) between jumps, the revolution counter (spin edge counter), and that it is not safe to read from or write to optical media 102 at this time. The state then transitions to sync auto jumpback state 1335, which initializes pertinent parameters and issues a single track seek control command to DSP 304 once the pertinent spindle index occurs. If the PSA state is not in PSA idle state 1602 (FIG. 16), then the PSA state is set to idle before entering the sync auto jumpback state 1335. The PSA states are further described hereinbelow in the discussion of FIG. 16.

An adjust bias function 1337 can be performed to provide the low frequency tracking control effort (TCE) and to allow the DSP 304 to handle the high frequency TCE.

The state then transitions to track wait jump state 1336 after requesting the DSP 304 to start a single track seek, the reset jump indicator is cleared, the indicators JUMP_P1_TRACK (to indicate a jump toward the inside diameter of the media 102) and JUMP_M1_TRACK (to indicate a jump toward the outside diameter of the media 102) are set, the track count is set, the spin edge counter is cleared, and the spin edge count is set to the track jump count. The state remains in track wait jump state 1336 until the DSP 304 returns a status indicator of whether or not the seek, also referred to as track jump(s), was successful.

Some status indicators that are included in the embodiment shown in FIG. 13*b* include: bad track status, which causes a notify and tracking event to be issued and transitions to track turn off state 1322; bad jump, which causes a transition to track bad jump state 1340; and good track status, which causes a transition to track good jump 1342. Note that a state change in the mailbox 306 can also cause a transition to track bad jump state 1340 or track good jump state 1342, as further explained hereinbelow in the discussion of an embodiment of the mailbox interrupt service routine in FIG. 20*b*.

The state transitions to track count jumps state 1344 after corresponding parameters are cleared and/or set from track bad jump state 1340 or track good jump state 1342. If more tracks are to be jumped, the state transitions to track jump settle state 1346, where the transition to the track wait jump state 1336 is delayed for a specified time period to allow the actuator arm 104 (FIG. 1*a*) time to settle before the next jump. If no more tracks are to be jumped and the auto jump back indicator is false, the state transitions back to tracking active state 1320. If no more tracks are to be jumped and the auto jump back indicator is true, the state transitions back to sync auto jumpback state 1335.

Referring now to FIG. 13*c*, an embodiment of a state machine 1304 for controlling long seeks in response to receiving a seek command is shown beginning with start long seek state 1350. Parameters Jump_Cnt_LoB, Jump_Cnt_MidB and Jump_Cnt_HiB represent the low, middle, and high bytes of the 24 bits used by the DSP 304 to determine the number of tracks to seek. The adjust bias seek function 1351 can be performed to generate a bias value for the tracking actuator arm to provide the low frequency tracking control effort (TCE) and to allow the DSP 304 to handle the high frequency TCE. The bias before seek function 1353 can be performed to store the current tracking actuator arm bias value before a new value for this parameter is generated in the adjust bias seek function 1351. The stored value can be used when transitioning between states 1352 and 1354.

Parameters such as a seek on flag, a track integrator on flag, a track integrator reset flag, a physical sector address (PSA) idle flag, and the laser low power mode can be initialized before transitioning to long seek gain adjust state 1358. In the long seek gain adjust state 1358, the calibrated parameters appropriate for the type of media 102 expected at the end of the seek are loaded. For example, if the OPU 103 is expected to land on writeable media at the end of the seek, the calibration parameters appropriate for writeable media are loaded in long seek gain adjust state 1358. If the OPU 103 is expected to land on premastered media at the end of the seek, the calibration parameters appropriate for premastered media are loaded in long seek adjust state 1358.

The tracking control state machine 1304 then transitions to wait long seek state 1352. If the time allotted for a seek expires before the seek is completed, or the DSP 304 has set the BAD_SEEK bit (FIG. 3*g*) of the DSP Status Register, the state transitions to failed long seek state 1354. If the seek is completed, the state transitions to the long seek clear state 1356, where additional parameters can be cleared or re-initialized before transitioning to tracking wait integrator state 1314.

FIG. 13c also shows an example of a head load state machine 1390. The purpose of the head load state machine 1390 is to position the OPU 103 over the area of the optical media 102 containing tracks to acquire tracking. The head load state machine 1390 can be used when the drive 100 is in any physical orientation or in the presence of shock and/or vibration. Orientation and/or shock and vibration could cause OPU 103 to be positioned off the portion of the optical media 102 containing tracks.

Head load state machine 1390 can commence in a begin head load only state 1360 or in a begin head load state 1362. If the head load state machine 1390 begins in begin head load only state 1360, then the head load state machine 1390 will complete without beginning the tracking acquisition state machine 1300. This is accomplished by setting the fHeadLoadOnly flag to TRUE in begin head load only state 1360. If head load state machine 1390 begins in the begin head load state 1362, then the head load state machine 1390 will complete and then initiate the tracking acquisition state machine 1300. If the begin head load state machine 1362 detects that the focus servo loop is not closed, or the tracking loop is closed, the state transitions track turn off state 1322 where the process of shutting tracking off is initiated. In the begin head load state 1362, if the focus servo is closed and the tracking servo is open, a bias voltage is applied to position the tracking actuator against an inside diameter (ID) crash stop in drive 100. The begin head load state 1362 also sets the spindle speed to a predetermined speed, such as 2930 RPM, and programs the DSP 304 to sample and report the TES signal. Begin head load state 1362 then transitions to headload1 state 1366.

The headload1 state 1366 delays a predetermined time period, such as 30 milliseconds, to allow the tracking actuator time to settle against the ID crash stop and to give the DSP 304 time to complete the first measurement. The state then transitions to headload2 state 1368 in which more TES samples are collected. When a total predetermined number of samples are collected, the state transitions to headload3 state 1370 in which the TES samples are used to determine if the OPU 103 is over the portion of the media 102 that includes tracks. If the OPU 103 is over the track portion, the TES has a sinusoidal shape and many of the sampled points will be away from the average value of the sine wave closer to the peak values. When off the track portion of the OPU 103, the TES signal is not sinusoidal and is roughly centered about an average value except where some feature exists in the media. Consequently, if the OPU 103 is not over the track portion, most of the sampled points will be relatively close to the average value of the collected TES samples. This difference in the scatter of the TES samples is used in the headload3 state 1370 to determine whether the OPU 103 is over the media 102. If headload3 state 1370 determines that the OPU 103 is not over the media 102, the tracking bias is reduced, thus reducing the force pushing the tracking actuator against the ID crash stop and a transition is made back to headload1 state 1362.

This process involving states 1366, 1368 and 1370 is repeated until state 1370 determines that the OPU 103 is over the track portion or until the bias forcing the tracking actuator against the ID crash stop has been reduced past a predetermined point that determines the head load state machine 1390 has failed. If the head load state machine 1390 has failed, a transition is made from state 1370 to track turn off state 1322. If headload3 state 1370 determines that the OPU 103 has been positioned over the track portion, the tracking bias is increased one additional step, in this embodiment 0x200 counts, and the state transitions to headload4 state 1372. If the fHeadLoadOnly flag is TRUE after a predetermined delay, such as 100 milliseconds, then a tracking event is requested of the RTOS 406 and the state transitions to head load complete state 1376. If the fHeadLoadOnly flag is found to be FALSE after a predetermined time delay, for example, 100 milliseconds, then a transition is made directly to the track turn on state 1308.

Monitor Focus Servo

FIGS. 14a–14c show an embodiment of focus control state machines 1400, 1402, 1403, represented collectively by the focus control state machine 916 shown in FIG. 9, for monitoring and controlling focus functions for drive 100 (FIG. 1a). FIG. 14a pertains to acquiring focus, and turning focus on and off, and FIGS. 14b and 14c pertain to determining a focus offset for ramping the actuator arm 104 (FIG. 1a) away from the optical media 102 (FIG. 1a).

Referring now to FIG. 14a, when a focus servo command is received while focus control state machine 1400 is in the focus idle state 1406, focus control state machine 1400 transitions to begin focus state 1408. If the actuator arm 104 (FIG. 1a) is not ramped away from optical media 102 (FIG. 1a) then the state transitions through begin ramp away state 1408 to focus ramp away state 1410. Control transitions between states 1410 and 1412 until the profile to ramp the actuator away from the disk has been completed.

Once the actuator arm 104 ramps away to the determined position, the state transitions to begin focus acquire state 1414 if focus is to be turned on. The begin focus acquire state 1414 transitions to ramp focus acquire state 1416 where it provides a focus DAC value to ramp the focus actuator arm 104 towards the optical media until the DSP 304 returns a status indicating whether or not focus closed. If the DSP 304 closed focus, then focus control state machine 1400 transitions through focus loop closed state 1418, focus enable integrator state 1420, and focus enable focus error signal (FES) integrity state 1422, before entering focus active state 1424.

If the DSP 304 issues a focus_OK status after a predetermined delay period, then the state further transitions to focus active state 1428. If the DSP issues a focus_bad status and focus is not closed, then the state transitions to focus push retry state 1426 and then to begin focus state 1408 to re-attempt to acquire focus.

A method for acquiring and enabling focus that corresponds to states 1414 through 1428, and FIG. 14b, that can be utilized in DSP 304 is described in The Tracking and Seeking Servo System disclosures.

Focus control state machine 1400 can transition to focus turn off state 1430 under the following conditions: (1) current state is the ramp focus acquire state 1416 and the maximum ramp position was reached; (2) current state is focus push retry state 1426 and best push away value is greater than or equal to nominal/4; or (3) a focus problem develops while in focus active state 1428. The focus turn off state 1430 transitions to the begin ramp away state 1408 and focus ramp away state 1410. The "best push away value" represents the control effort used when positioning the actuator arm 104 away from the optical media 102. A nominal push away value can be used except in the retry efforts managed by focus push state 1426. In some situations, the actuator arm 104 can become stuck when the push away value is too large. If attempts at closing focus are unsuccessful, focus push retry state 1426 is entered using nominal/2 as the best push away value. If attempts at closing focus are still unsuccessful, a value of nominal/4 is used as the best push away value.

Referring to focus ramp away state 1410, if focus is to be turned off, then the state transitions through a series of zero focus states to clear focus parameters in DSP 304 before issuing a focus event and entering focus away state 1432. Otherwise, if focus is not to be turned off, the state transitions to begin focus acquire state 1414.

FIGS. 14*b* and 14*c* show embodiments of the focus control state machines 1402, 1403 which can be used during calibration and engineering testing. States 1450 through 1454 in FIG. 14*b* are used to move the actuator arm 104 towards and away from the disk in a continuous sinusoidal motion. States 1456 through 1460 in FIG. 14*c* follow a sinusoidal profile to move the actuator arm 104 from one position to another position.

Monitor Spin Servo

FIG. 15 shows an example of a spin control state machine 918 that can be implemented in heartbeat interrupt 408 (FIG. 4) to monitor the spin motor 101 (FIG. 1*a*) for optical media 102. Spin control state machine 918 can be implemented along with the methods for controlling the spin motor 101 as disclosed in The Spin Motor Servo System disclosures. During the start-up phase, spin control state machine 918 enters spinup initialization align state 1502 and spinup align state 1504 in which a rotor shaft in spin motor 101 is moved to a known state or position to ensure that spin motor 101 is rotated in the proper direction.

When alignment is completed, the state transitions to spinup enable interrupts state 1506 to initialize various parameters. The state then transitions to spin up complete state 1508 and to spin final check state 1510 to determine if the desired speed has been attained before an allotted spinup time period expires. If the spin motor 101 is spinning at the desired speed, the state transitions to spin constant linear velocity (CLV) by track ID (also referred to as track number) state 1512, where it remains until a spin problem is detected.

If the spin motor 101 did not spin up to the desired speed before the spinup time period expired, a spin event is issued, and the state transitions to spin problem state 1514. Similarly, if a spin problem is detected while in the spin CLV by track ID state 1512, a notify event issues, and the state transitions to spin problem state 1514.

The spin problem state 1514 transitions to the spin turn off state 1516, and then to spin braking state 1518, where it remains for a specified time period to stop the optical media 102 from spinning. A spin event is issued when the optical media 102 has stopped spinning, and the state then transitions to and remains in spin off state 1520 until a new command to spin the media is received.

Monitor PSA

FIG. 16 shows an embodiment of a physical sector address (PSA) state machine 920 in accordance with the present invention. One unique aspect of optical media 102 is that it can include a pitted PSA master area that cannot be overwritten, and a grooved writeable area that can be overwritten. PSA state machine 920 therefore can determine the position of the actuator arm 104 (FIG. 1*a*) in relation to the grooved and pitted areas whenever tracking is Active. It is not possible to read PSAs during seeks or when tracking is not active.

If track or focus are off, PSA state machine 920 is put into the PSA idle state 1602 where no attempts to read PSAs are made. If the drive is both focused and tracking, the PSA state machine 920 will try to reach PSA locked state 1608 where PSAs are successfully read. Each time the tracking/seeking state machine 914 (FIG. 9) reaches the TRACKING ACTIVE state 1320 (FIG. 13*a*), it will check if the PSA state is in PSA IDLE state 1602. If so, the state transitions from PSA idle state 1602 to PSA enable state 1604. Upon transitioning from PSA idle state 1602 to PSA enable state 1604, the acquisition interrupts are disabled and flags are set to indicate that PSAs are not being read. Upon transitioning from PSA enable state 1604 to PSA acquiring state 1606, PSA acquisition is enabled. If the PSAs can be read, the PSA state machine 920 transitions to PSA locked state 1608. If the ability to read is not detected within a predetermined time period, such as 48 milliseconds, the PSA state machine 920 transitions to PSA RETRY state 1610. PSA RETRY state 1610 toggles between settings appropriate for pits and settings appropriate for grooves. Once the settings have been changed, the PSA state machine 920 begins the acquisition process again at PSA enable state 1604.

While in PSA locked state 1608, the most recently read PSA is monitored. If a new PSA is not read before the timeout period expires, the state transitions to the PSA retry state 1610. Each time a new PSA is read, the value is compared to PSA_MAX to determine if the actuator arm 104 is close to the last track on the optical media 102. PSA_MAX corresponds to the last usable track on the optical media 102. If the actuator arm 104 is determined to be close to the last track, then a predetermined number of single track jumps, such as 40 single track jumps, are commanded to move the tracking actuator arm 104 away from the edge of the optical media 102. Alternatively, a multi-track seek function can be used to move the tracking actuator arm 104 instead of multiple single track jumps. The PSA IDLE state 1602 is then commanded. Each time the PSA locked state 1608 does not have a new PSA, it predicts the current PSA. The predicted PSA is compared to PSA_MAX to determine if the actuator arm 104 is close to the last track on the optical media 102. If the actuator arm 104 is determined to be close to the last track, then a number of single track jumps are performed before transitioning to the PSA idle state 1602.

Monitor Laser

FIG. 17 shows an embodiment of a laser control state machine 922 in accordance with the present invention. The state remains in laser off state 1702 when a laser control variable indicates that power to the laser in OPU 103 (FIG. 1) is off. The state transitions to laser on state 1704 when power to the laser is turned on. When the optical media 102 stops spinning, the state transitions back to laser off state 1702, and a laser control variable is set to OFF. In one implementation, a spin override variable can be used to allow the laser to be turned off even if the optical media 102 is still spinning.

Adjust Gains

FIG. 18 shows an example of adjust gains state machine 924 in accordance with the present invention. Adjust gains state machine 924 begins in gains idle state 1824, and transitions to gains adjust state 1826 when tracking is active. The gains are adjusted based on the current zone on optical media 102 (FIG. 1*a*) being accessed. In one implementation, optical media 102 can include sixteen different zones, and a zone calibration tables can exist for each zone. The gains corresponding to the particular zone being accessed are loaded while the state remains in the gains adjust state 1826. The state remains in the gains adjust state 1826 until tracking is turned off. A method for generating the zone calibrations tables that can be utilized with adjust gains state machine 924 is disclosed in The Servo System Calibration disclosures.

Monitor Performance

FIG. 19 shows an embodiment of a continuous performance monitor state machine 926 in accordance with the present invention. In one implementation, performance monitor state machine 926 includes idle state 1902, monitor initialization (init) state 1903, monitor focus misregistration (FMR)/ track misregistration (TMR) state 1904, and monitor performance events state 1908. The state transitions from idle state 1902 to monitor initialize state 1903 at the start of initialization, such as when drive 100 is powered on.

If focus and track are active, the state transitions to monitor FMR/TMR state 1904. The track and focus error signals (TES and FES) are used to generate FMR and TMR signals. If the FMR and/or TMR signals and/or read jitter values are out of predefined limits, then the state transitions to performance event issued state 1908 to issue performance events based on whether there is a problem with FMR, TMR, and/or read jitter.

Mailbox Interrupts

FIG. 20a shows a flowchart of an embodiment of DSP status interrupt logic 2000 that can be included in DSP status mailbox interrupt handler 410 (FIG. 4) in accordance with the present invention.

When the DSP status interrupt occurs, process 2002 disables further notification of interrupts from mailbox 306 (FIG. 4) to allow time to process the current DSP status interrupt. Process 2004 decodes the DSP status register to decode the message being sent by the DSP 304 (FIG. 4). Examples of messages which can be sent by the DSP 304 are shown in FIGS. 3f and 3g. In one embodiment, the messages are implemented as status bit settings in one or more DSP control registers. Process 2004 determines which of the status bits in the DSP control register(s) have changed. Examples of bit settings to convey various messages in the DSP control register(s) are shown in FIGS. 3b, 3c, and 3d. Specific actions are taken in processes 2006 and 2008 based on which status bit the DSP 304 has set. When the DSP status indicates a problem with the operation of drive 100 (FIG. 1a), process 2006 issues a request for a notify event, and a tracking, focus, or trace event, as required depending on the error condition, to RTOS 406 (FIG. 4). If the message decoded by process 2004 indicates an error condition, then process 2012 records the servo error state that is used by heartbeat interrupt 408. Process 2008 changes focus and tracking state machine variables based on the DSP status. At the end of the DSP status interrupt logic 2000, process 2010 re-enables the mailbox interrupt 306 so the DSP 304 can continue to send messages to the processor 302.

Referring now to FIGS. 20a, 20b, and 20c, FIGS. 20b and 20c show an example of logic included in processes 2004–2008, which is also referred to as the mailbox interrupt service routine (ISR) 2020. In FIG. 20b, process 2022 decodes DSP status by determining which bits in the DSP status registers have changed from the previous pass through the mailbox ISR 2020. Process 2024 then checks the TRACK_BAD and TRACK_BAD_SOURCE status variables. The status of the tracking jumps is then tested by determining whether GOOD JUMP or BAD JUMP indicators are set in processes 2026 and 2028. If one or both of the GOOD JUMP indicators is set, process 2030 determines if the tracking state is the track wait jump state 1336 (FIG. 13b). If the tracking state is the track wait jump state 1336, then process 2032 changes the tracking state to the track good jump state 1342 (FIG. 13b). If the BAD JUMP indicator is set, process 2034 determines if the tracking state is the track wait jump state 1336 (FIG. 13b). If the tracking state is the track wait jump state 1336, then process 2036 changes the tracking state to the track bad jump state 1340 (FIG. 13b).

Process 2038 determines whether the FOCUS_BAD indicator is set. If so, process 2040 determines if the focus state is in the focus active state 1428 (FIG. 14a). If so, then process 2042 updates the servo error state indicator to indicate bad focus, process 2044 requests a notify event from RTOS 406, process 2046 sets the focus state to focus turn off state 1430, and process 2048 determines whether auto jump back is enabled. If auto jump back is enabled, process 2050 update the servo error status to indicate a failure during autojump, otherwise, process 2052 determines whether the tracking state is in the track off state 1332 (FIG. 13a).

If the tracking state is not in the track off state 1332, then process 2054 determines whether the tracking state is in the wait long seek state 1352 (FIG. 13c). If so, process 2056 updates the servo error status to indicate a failure during long seek. Process 2058 then sets the tracking state to the track turn off state 1322, whether or not the tracking state was the wait long seek state 1352 in process 2054. Process 2060 updates the servo error status to indicate that the tracking problem was caused by loss of focus.

Process 2062 determines whether the focus state is in the focus loop closed state 1418 (FIG. 14a). If so, then process 2064 determines whether the DSP status indicates that ramp focus has been acquired. If so, then process 2066 sets the focus state to the focus loop closed state 1418.

In FIG. 20c, process 2064 decodes DSP status by determining which bits in the DSP status registers have changed from the previous pass through the mailbox ISR 2020. Process 2066 then checks the TRACK_BAD status variable. If TRACK_BAD is set, process 2068 determines if the tracking state is in the process of closing tracking. If not, process 2069 determines whether tracking is active. If tracking is active, then process 2070 updates the servo error state to BAD_TRACK, process 2071 requests a notify event from RTOS 406, and process 2072 sets the track state to the track turn off state.

Referring again to process 2069, if tracking is not active, process 2073 determines whether a jump (seek) is in progress. If a jump is in progress, process 2074 updates the servo error state to BAD_TRACK, FAILED_JUMP. Process 2075 then determines whether the tracking state is in the auto jump back state. If not, then process 2076 determines whether a command is active. If so, process 2077 issues a tracking event. If process 2076 determines that a command is not active, then process 2079 issues a notify event.

Referring again to process 2075, if the tracking state is in the auto jump back state, then process 2078 updates the servo error state to FAILED_AUTOJUMP, and process 2079 issues a notify event.

Referring again to process 2073, if a jump is not in progress, process 2080 determines whether a long seek is in progress. If so, then the DSP status is set to indicate LONG_SEEK_FAILED in process 2081 and process 2077 issues a tracking event.

Process 2072 sets the track state to the track turn off state after processes 2077 and 2079 are finished, or if process 2080 determined that the track state was not the long seek state.

Process 2082 then determines if any other bits in the DSP status registers have changed from the previous pass through the mailbox ISR 2020. Process 2083 checks the TRACK_BAD_SOURCE status variable is set. If TRACK_BAD_SOURCE is set, process 2084 determines if the tracking state is in the process of closing tracking. If not, process 2085 determines whether tracking is active. If tracking is active, then process 2086 updates the servo error state to BAD_FOCUS_CAUSED_BAD_TRACK, process 2087 requests a notify event from RTOS 406, and process 2088 sets the track state to the track turn off state.

Referring again to process 2085, if tracking is not active, process 2089 determines whether a jump (seek) is in progress. If a jump is in progress, process 2090 updates the servo error state to BAD_TRACK FAILED_JUMP. Process 2091 then determines whether the tracking state is in the auto jump back state. If not, then process 2092 determines whether a command is active. If so, process 2093 issues a tracking event. If process 2092 determines that a command is not active, then process 2095 issues a notify event.

Referring again to process 2091, if the tracking state is in the auto jump back state, then process 2094 updates the servo error state to FAILED_AUTOJUMP, and process 2095 issues a notify event.

Referring again to process 2089, if a jump is not in progress, process 2096 determines whether a long seek is in progress. If so, then the DSP status is set to indicate LONG_SEEK_FAILED in process 2097 and process 2093 issues a tracking event.

Process 2088 sets the track state to the track turn off state after processes 2093 and 2095 are finished, or if process 2096 determined that the track state was not the long seek state.

The various embodiments and implementations of the servo control system described herein thus address the combination of servo system design challenges. The servo control system architecture includes unique methods of sharing a general purpose processor between the servo system and the other drive systems, unique methods of using a dedicated high speed processor for time critical servo functions, unique methods for communicating between the dedicated servo processor and the shared general purpose processor, unique methods of distributing the servo processing between the general purpose processor and the dedicated servo processor, and unique methods of distributing the servo processing within the general purpose processor between a main loop servo thread process and a background periodic heartbeat interrupt process.

The architecture addresses problems with performing operations on media having a small form factor, such as the need for periodic recalibration, compensation for the flexible focus and tracking actuators, nonlinear and crosscoupled tracking and focus position sensors, dynamic crosscoupling between the multiple servo loops, need for low power to conserve battery life, removable and interchangeable media, need to handle media defects exacerbated by the first surface recording, presence of both premastered and user writeable areas on the same disk, need to operate in wide range of conditions including any physical orientation, wide range of temperatures and humidity, and the presence of shock and vibration.

Embodiments of the present invention can be implemented to function on one or more computer processors, however those skilled in the art will appreciate that certain aspects of various embodiments can be distributed as a program product in a variety of forms, and that the present invention applies equally regardless of the particular type of signal bearing media used to actually carry out the distribution. Examples of signal bearing media include: writeable type media such as floppy disks and CD-ROM, transmission type media such as digital and analog communications links, as well as media storage and distribution systems developed in the future.

The foregoing detailed description has set forth various embodiments of the present invention via the use of block diagrams, flowcharts, and examples. It will be understood by those within the art that each block diagram component, flowchart step, and operations and/or components illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the spirit and scope of the invention as set forth in the following claims.

APPENDIX A

See attached CD-ROM Copy 1 and Copy 2

APPENDIX B

| DATE CREATED | TIME | BYTES | FILENAME |
| --- | --- | --- | --- |
| Aug. 09, 2001 | 05:50 p | 17,301 | Defin_h.txt |
| Aug. 10, 2001 | 02:13 p | 85,660 | dservo_c.txt |
| Aug. 09, 2001 | 05:47 p | 33,958 | dspmem_h.txt |
| Aug. 09, 2001 | 05:45 p | 292,400 | dspp_c.txt |
| Aug. 09, 2001 | 05:44 p | 292,400 | dsp_p_c.txt |
| Aug. 09, 2001 | 05:47 p | 4,287 | engpar_h.txt |
| Aug. 09, 2001 | 05:43 p | 7,688 | Focu_h.txt |
| Aug. 09, 2001 | 05:48 p | 3,764 | indus_h.txt |
| Aug. 09, 2001 | 05:49 p | 69,191 | rpmtbl_h.txt |
| Aug. 09, 2001 | 05:47 p | 96,378 | scmd_c.txt |
| Aug. 09, 2001 | 05:49 p | 7,414 | SineTb_h.txt |
| Aug. 09, 2001 | 05:46 p | 8,819 | sintrp_c.txt |
| Aug. 09, 2001 | 05:45 p | 327,430 | smain_c.txt |
| Aug. 09, 2001 | 05:50 p | 27,961 | smain_h.txt |
| Aug. 09, 2001 | 05:48 p | 97,596 | sspin_c.txt |
| Aug. 09, 2001 | 05:46 p | 189,471 | stint_c.txt |
| Aug. 09, 2001 | 05:45 p | 57,381 | stools_c.txt |
| Aug. 09, 2001 | 05:51 p | 2,185 | stools_h.txt |
| Aug. 09, 2001 | 05:51 p | 302,470 | sutil_c.txt |
| Aug. 09, 2001 | 05:51 p | 30,265 | sxtrn_h.txt |
| Aug. 09, 2001 | 05:51 p | 11,063 | TrackC_h.txt |
| Aug. 09, 2001 | 05:45 p | 25,479 | XYram_h.txt |

We claim:

1. A system for recovering from performance errors in an optical disc drive for optical media with a pitted premastered area that cannot be overwritten and a grooved user-writeable area that can be overwritten, comprising:
   instructions operable to detect a problem with at least one of: focus control, tracking control, or spin control when accessing the optical media;
   instructions operable to save the current state of the disc drive;
   instructions operable to attempt to recover from the problem; and
   instructions operable to restore the current state of the disc drive after recovering from the problem.

2. The system, as set forth in claim 1, further comprising:
   instructions operable to classify the problem as a spin, focus, or tracking control problem.

3. The system, as set forth in claim 1, further comprising: instructions operable to control the disc drive to a state from which recovery can be attempted.

4. The system, as set forth in claim 1, further comprising: instructions operable to determine whether the recovery attempt was successful.

5. The system, as set forth in claim 1, further comprising: instructions operable to turn off tracking and focus when a problem with spin control is detected.

6. The system, as set forth in claim 1, further comprising: instructions operable to turn off tracking when a problem with focus control is detected.

7. The system, as set forth in claim 1, further comprising: instructions operable to turn off tracking when a problem with tracking control is detected.

8. The system, as set forth in claim 1, further comprising: instructions operable to determine whether a tracking actuator arm is positioned off a formatted portion of an optical disc.

9. The system, as set forth in claim 8, further comprising: instructions operable to position the tracking actuator arm to a predetermined location when the tracking actuator arm is positioned off the formatted portion of the optical disc.

10. The system, as set forth in claim 1, further comprising: instructions operable to determine whether the attempt to recover from the problem is excessive.

11. A method for recovering from performance errors in an optical disc drive for optical media with a pitted premastered area that cannot be overwritten and a grooved user-writeable area that can be overwritten, comprising:

detecting a problem with at least one of: focus control, tracking control, or spin control when accessing the optical media;

saving the current state of the disc drive;

attempting to recover from the problem; and restoring the current state of the disc drive after recovering from the problem.

12. The method, as set forth in claim 11, further comprising:

classifying the problem as a spin, focus, or tracking control problem.

13. The method, as set forth in claim 11, further comprising:

controlling the disc drive to a state from which recovery can be attempted.

14. The method, as set forth in claim 11, further comprising:

determining whether the recovery attempt was successful.

15. The method, as set forth in claim 11, further comprising:

turning off tracking and focus when a problem with spin control is detected.

16. The method, as set forth in claim 11, further comprising:

turning off tracking when a problem with focus control is detected.

17. The method, as set forth in claim 11, further comprising:

turning off tracking when a problem with tracking control is detected.

18. The method, as set forth in claim 11, further comprising:

determining whether a tracking actuator arm is positioned off a formatted portion of an optical disc.

19. The method, as set forth in claim 18, further comprising:

positioning the tracking actuator arm to a predetermined location when the tracking actuator arm is positioned off the formatted portion of the optical disc.

20. The method, as set forth in claim 11, further comprising:

determining whether the attempt to recover from the problem is excessive.

21. An apparatus for recovering from performance errors in an optical disc drive for optical media with a pitted premastered area that cannot be overwritten and a grooved user-writeable area that can be overwritten, comprising:

means for detecting a problem with at least one of: focus control, tracking control, or spin control when accessing the optical media;

means for saving the current state of the disc drive;

means for attempting to recover from the problem; and means for restoring the current state of the disc drive after recovering from the problem.

22. The apparatus, as set forth in claim 21, further comprising:

means for classifying the problem as a spin, focus, or tracking control problem.

23. The apparatus, as set forth in claim 21, further comprising:

means for controlling the disc drive to a state from which recovery can be attempted.

24. The apparatus, as set forth in claim 21, further comprising:

means for determining whether the recovery attempt was successful.

25. The apparatus, as set forth in claim 21, further comprising:

means for turning off tracking and focus when a problem with spin control is detected.

26. The apparatus, as set forth in claim 21, further comprising:

means for turn off tracking when a problem with focus control is detected.

27. The apparatus, as set forth in claim 21, further comprising:

means for turning off tracking when a problem with tracking control is detected.

28. The apparatus, as set forth in claim 21, further comprising:

means for determining whether a tracking actuator arm is positioned off a formatted portion of an optical disc.

29. The apparatus, as set forth in claim 28, further comprising:

means for positioning the tracking actuator arm to a predetermined location when the tracking actuator arm is positioned off the formatted portion of the optical disc.

30. The apparatus, as set forth in claim 21, further comprising:

means for determining whether the attempt to recover from the problem is excessive.

31. A computer program product comprising: instructions to implement the method of claim 11.

32. A carrier wave data signal comprising: instructions to implement the method of claim 11.

* * * * *